US007002553B2

(12) United States Patent
Shkolnikov

(10) Patent No.: US 7,002,553 B2
(45) Date of Patent: *Feb. 21, 2006

(54) ACTIVE KEYBOARD SYSTEM FOR HANDHELD ELECTRONIC DEVICES

(76) Inventor: Mark Shkolnikov, 2883 Franklin Oaks Dr., Oak Hill, VA (US) 20171

( * ) Notice: Subject to any disclaimer, the term of this patent is extended or adjusted under 35 U.S.C. 154(b) by 0 days.

This patent is subject to a terminal disclaimer.

(21) Appl. No.: 10/895,967

(22) Filed: Jul. 22, 2004

(65) Prior Publication Data

US 2004/0263479 A1 Dec. 30, 2004

Related U.S. Application Data

(63) Continuation-in-part of application No. 10/320,529, filed on Dec. 17, 2002, now Pat. No. 6,947,028.

(60) Provisional application No. 60/342,382, filed on Dec. 27, 2001.

(51) Int. Cl.
G09G 5/08 (2006.01)
(52) U.S. Cl. .................... 345/169; 345/158
(58) Field of Classification Search ............ 345/156, 345/157, 158, 162, 168, 169, 172, 173, 159; 715/455, 738, 739, 823, 839, 840
See application file for complete search history.

(56) References Cited

U.S. PATENT DOCUMENTS

| 4,891,777 | A |   | 1/1990  | Lapeyre ................ 708/130 |
|-----------|---|---|---------|----------------------------------|
| 5,128,672 | A | * | 7/1992  | Kaehler ................. 341/23 |
| 5,187,480 | A |   | 2/1993  | Thomas et al. ........... 341/22 |
| 5,332,322 | A |   | 7/1994  | Gambaro ................ 400/489 |
| 5,471,042 | A |   | 11/1995 | Kirkeby et al. ....... 235/472.02 |
| 5,565,671 | A |   | 10/1996 | Kirkeby et al. ....... 235/472.01 |
| 5,612,719 | A |   | 3/1997  | Beernink et al. ........ 354/173 |
| 5,666,113 | A |   | 9/1997  | Logan et al. ............ 341/34 |
| 5,703,623 | A |   | 12/1997 | Hall et al. ............ 345/158 |
| 5,712,995 | A | * | 1/1998  | Cohn .................. 715/792 |
| 5,736,976 | A |   | 4/1998  | Cheung ................ 345/168 |
| 5,808,567 | A |   | 9/1998  | McCloud ................ 341/20 |
| 5,818,437 | A |   | 10/1998 | Grover et al. .......... 345/811 |
| 5,825,362 | A | * | 10/1998 | Retter ................. 715/854 |

(Continued)

FOREIGN PATENT DOCUMENTS

EP    0 735 514 A1    10/1996

(Continued)

OTHER PUBLICATIONS

Article titled "TiltType: Accelerometer-Supported Text Entry for Very Small Devices", http://www.cs.washington.edu (online), retrieved in Mar. 2004.

(Continued)

Primary Examiner—Vijay Shankar
Assistant Examiner—Nitin Patel
(74) Attorney, Agent, or Firm—Litman Law Offices, Ltd.

(57) ABSTRACT

An active keyboard system includes a processor, a memory, and a display communicatively connected to one another. The system includes input means for inputting data and commands into the system. The input means include at least one selector, and a plurality of keys. Active keyboard system software is stored on the memory and is configured to dynamically present available choices on the display grouped to effect unambiguous selection of the available choices through use of the input means. The active keyboard system software includes presentation code and filter code. The presentation code includes step or scroll resolution code to enable scrolling, and grid presentation code to organize available choices on a visual grid and provide the visual grid to the display. The grid presentation code configures the visual grid with one or more panes each configured as a matrix with a plurality of columns and plurality of rows.

36 Claims, 47 Drawing Sheets

U.S. PATENT DOCUMENTS

| | | | |
|---|---|---|---|
| 5,854,624 A | 12/1998 | Grant | 84/454 |
| 5,920,303 A * | 7/1999 | Baker et al. | 345/172 |
| 5,931,873 A | 8/1999 | Cisar | 701/1 |
| 6,011,554 A | 1/2000 | King et al. | 345/811 |
| 6,052,070 A | 4/2000 | Kivelä et al. | 341/22 |
| 6,067,358 A | 5/2000 | Grant | 379/433.07 |
| 6,104,317 A | 8/2000 | Panagrossi | 341/20 |
| 6,164,853 A | 12/2000 | Foote | 400/489 |
| 6,201,554 B1 | 3/2001 | Lands | 345/169 |
| 6,243,080 B1 | 6/2001 | Molne | 345/173 |
| 6,347,290 B1 | 2/2002 | Bartlett | 702/150 |
| 6,392,640 B1 | 5/2002 | Will | 345/184 |
| 6,400,376 B1 | 6/2002 | Singh et al. | 345/158 |
| 6,437,709 B1 | 8/2002 | Hao | 341/23 |
| 6,466,198 B1 | 10/2002 | Feinstein | 345/158 |
| 6,567,068 B1 | 5/2003 | Rekimoto | 345/156 |
| 6,567,101 B1 | 5/2003 | Thomas | 345/649 |
| 6,573,883 B1 | 6/2003 | Bartlett | 345/156 |
| 6,603,420 B1 | 8/2003 | Lu | 341/176 |
| 6,611,255 B1 | 8/2003 | Griffin et al. | 345/169 |
| 6,641,482 B1 | 11/2003 | Masuyama et al. | 463/44 |
| 6,683,599 B1 | 1/2004 | Shepherd et al. | 345/168 |
| 6,690,358 B1 | 2/2004 | Kaplan | 345/158 |
| 2002/0060699 A1 | 5/2002 | D'Agostini | 345/783 |
| 2002/0163504 A1 | 11/2002 | Pallakoff | 345/169 |
| 2002/0190947 A1 * | 12/2002 | Feinstein | 345/158 |
| 2003/0036362 A1 | 2/2003 | Buesseler et al. | 455/575.1 |
| 2003/0048262 A1 | 3/2003 | Wu et al. | 345/173 |
| 2003/0052861 A1 | 3/2003 | Peng | 345/161 |
| 2004/0012566 A1 | 1/2004 | Bradski | 345/158 |
| 2004/0018863 A1 | 1/2004 | Engstrom et al. | 455/575.8 |
| 2004/0066393 A1 * | 4/2004 | Cragun | 345/660 |

FOREIGN PATENT DOCUMENTS

| | | |
|---|---|---|
| EP | 1 271 288 A2 | 1/2003 |
| GB | 2 193 023 A | 1/1988 |
| WO | WO 02/073995 A1 | 9/2002 |
| WO | WO 03/015379 A1 | 2/2003 |

OTHER PUBLICATIONS

Article titled "TiltText: Using Tilt for Text Input to Mobile Phones", http://www.dgp.toronto.edu (online), retrieved in Mar. 2004.

* cited by examiner

Adaptive Thresholds

- Adaptive thresholds: e.g, the user is using backspace too often, too many jumps to get to the letter, etc. - threshold is lowered (increased)
- Different thresholds to move back and forward

ACTIVE KEYBOARD SYSTEM FOR HANDHELD ELECTRONIC DEVICES

CROSS-REFERENCE TO RELATED APPLICATIONS

This application is a continuation-in-part of U.S. patent application Ser. No. 10/320,529, filed Dec. 17, 2002, now U.S. Pat. No. 6,947,028 which claims the benefit of U.S. Provisional Patent Application Ser. No. 60/342,382, filed Dec. 27, 2001, each of which are incorporated herein by reference.

BACKGROUND OF THE INVENTION

1. Field of the Invention

The present invention generally relates to handheld data entry devices and, more particularly to an active keyboard system for handheld electronic devices. The active keyboard system dynamically presents available choices on a display grouped to effect unambiguous selection of the available choices through use of input means, thereby providing users of handheld electronic devices with a consistent set of techniques to perform all commonly used functions including entering alphanumeric text and data into the device using only one hand.

2. Description of the Related Art

Portable electronic devices are rapidly becoming smaller while their capabilities are continually increasing. Shrinking size has limited the ability of the user to physically manipulate the keyboard in order to input information into the electronic device and access information from the device. Some electronic devices have been produced with miniature keyboards, but these have proven difficult to use and the keys are too small for fast entry of data with the fingers. Using normal size keys for a complete keyboard limits how small a device can be due to the necessary width of the keyboard. Some companies have created normal size keyboards that break into overlapping pieces when the computer is not in use, but even then the device must still be relatively large.

Today many electronic devices are small enough to fit into the palm of the hand. With such small size it would be desirable to be able to quickly enter data, or to navigate the Internet with one hand, where that one hand not only supports the device but is also able to quickly enter data or commands using all five digits. A device for quickly and efficiently entering data, including full text, with a limited number of keys, such as that provided by the present invention, is needed in order to fully utilize the power of these small electronic devices.

The prior art has shown several methods of data entry using a limited number of full size keys. One such method is the "multi-tap" method. This method involves using twelve or more keys with several letters or symbols assigned to each key. The user taps each key until the desired letter appears on the device's display. This system allows the user to input complete text messages using a limited number of keys, but it is a time consuming system due to the excessive number of keystrokes and timeouts required, it has no Internet browsing capability, and it forces the user to shift the position of his fingers from key to key, further reducing keystroke efficiency.

Another method of inputting data using a limited number of keys are the systems described in U.S. Pat. No. 5,818,437, issued Oct. 6, 1998 to Dale L. Grover et al., and U.S. Pat. No. 6,011,554, issued Jan. 4, 2000 to Martin T. King et al. These systems also assign each key a plurality of values, but eliminate the need to press each key multiple times. The user simply presses each desired key once and the computer attempts to decipher what word the user intended to input out of the several possible words which could be formed from the several letters on each key. If the computer comes up with the wrong word the user can scroll through a number of other possibilities. These systems are effective in reducing the number of keystrokes as compared to the multi-tap method. They cannot, however, be used to input uncommon words and names due to a limited vocabulary, they have no application to Internet browsing, and they cannot be used without the user changing finger position on the keys.

U.S. Pat. No. 5,854,624, issued Dec. 29, 1998 to Jeffrey A. Grant, is an example of a pocket-sized interface for Internet browsing. The Grant '624 device uses a touch sensitive switch and several keys to allow a user to interface with the Internet. While the Grant '624 device does function to allow a user to navigate the Internet, it shows no way of entering data such as text and numbers, and is not designed for one hand operation.

U.S. Pat. No. 6,164,853, issued Dec. 26, 2000 to Lisa L. Foote, is also relevant in that it discloses an ergonomic housing for a handheld device. The Foote device fits over a standard electronic device such as a remote control and allows the user to comfortably operate such a device using only one hand. The Foote device does not, however disclose any method for quickly entering a variety of data, nor show any method of navigating the Internet.

Additional relevant art includes U.S. patent application Publication No. 2002/0060699 A1, published May 23, 2002 for Giovanni D'Agostinin (character input device based on a two-dimensional movement sensor); U.S. patent application Publication No. 2002/0163504 A1, published Nov. 7, 2002 for Matthew G. Pallakoff (hand held device that supports fast text typing); U.S. patent application Publication No. 2003/0036362 A1, published Feb. 20, 2003 for Joshua R. Buesseler et al. (interchangeable cover for a mobile communications device) ; and U.S. patent application Publication No. 2003/0048262 A1, published Mar. 13, 2003 for Charles Wu et al. (method and apparatus for navigation, text input, and phone dialing).

Additional related art includes U.S. patent application Publication No. 2003/0052861 A1, published Mar. 20, 2003 for Jiang Peng (portable communication device with detachable joystick and method therefore); U.S. patent application Publication No. 2004/0012566 A1, published Jan. 22, 2004 for Gary R. Bradski (intuitive mobile device interface to virtual spaces); and U.S. patent application Publication No. 2004/0018863 A1, published Jan. 29, 2004 for G. Eric Engstrom et al. (personalization of mobile electronic devices using smart accessory covers).

Additional related art includes U.S. Pat. No. 4,891,777, issued Jan. 2, 1990 to James M. Lapeyre (single hand keyboard arrays providing alphanumeric capabilities from twelve keys); U.S. Pat. No. 5,187,480, issued Feb. 16, 1993 to Ronald H. Thomas et al. (symbol definition apparatus); U.S. Pat. No. 5,332,322 issued Jul. 26, 1994 to Thomas L. Gambaro (ergonomic thumb-actuable keyboard for a hand-grippable device); U.S. Pat. Nos. 5,471,042 and 5,565,671, issued Nov. 28, 1995 and Oct. 15, 1996, respectively, to David Kirkeby et al. (handheld data entry terminal having dual trigger switches); U.S. Pat. No. 5,612,719, issued Mar. 18, 1997 to Ernest H. Beernik et al. (gesture sensitive buttons for graphical user interfaces); U.S. Pat. No. 5,666, 113, issued Sep. 9, 1997 to James D. Logan (system for using a touchpad input device for cursor control and keyboard emulation); and U.S. Pat. No. 5,703,623, issued Dec. 30, 1997 to Malcolm G. Hall et al. (smart orientation sensing circuit for remote control).

Additional related art includes U.S. Pat. No. 5,736,976, issued Oct. 6, 1998 to Nina T. Cheung (computer data entry apparatus with hand motion sensing and monitoring); U.S. Pat. No. 5,808,567 issued Sep. 15, 1998 to Seth R. McCloud (apparatus and method of communicating using three digits of a hand); and U.S. Pat. No. 5,931,873, issued Aug. 3, 1998 to James M. Cisar (programmable mobile device with thumb wheel).

Additional related art includes U.S. Pat. No. 6,052,070, issued Apr. 18, 2000 to Seppo Kivellä et al. (method for forming a character string, an electronic communication device and a charging unit for charging the electronic communication device); U.S. Pat. No. 6,067,358, issued May 23, 2000 to Alan H. Grant (ergonomic cellular phone); U.S. Pat. No. 6,104,317, issued Aug. 15, 2000 to Jerry Panagrossi (data entry device and method); U.S. Pat. No. 6,201,554, issued Mar. 13, 2001 to Robert M. Lands (device control apparatus for hand-held data processing); and U.S. Pat. No. 6,243,080, issued Jun. 5, 2001 to Anders L. Molne (touch-sensitive panel with selector).

Additional related art includes U.S. Pat. No. 6,347,290, issued Feb. 12, 2002 to Joel F. Bartlett (apparatus and method for detecting and executing positional and gesture commands corresponding to movement of handheld computing device); U.S. Pat. No. 6,392,640, issued May 21, 2002 to Craig A. Will (entry of words with thumbwheel by disambiguation); U.S. Pat. No. 6,400,376, issued Jun. 4, 2002 to Mona Singh et al. (display control for hand-held data processing device); U.S. Pat. No. 6,437,709, issued Aug. 20, 2002 to Qi Hao (keyboard and thereof input method); U.S. Pat. No. 6,466,198, issued Oct. 15, 2002 to David Y. Feinstein (view navigation and magnification of a hand-held device with a display); and U.S. Pat. No. 6,567,101, issued May 20, 2003 to Keith C. Thomas (system and method utilizing motion input for manipulating a display of data).

Additional related art includes U.S. Pat. No. 6,573,883 issued Jun. 3, 2003 to Joel F. Bartlett (method and apparatus for controlling a computing device with gestures); U.S. Pat. No. 6,603,420, issued Aug. 5, 2003 to Jin Lu (remote control device with motion based control for receiver volume, channel selection, or other parameters); U.S. Pat. No. 6,611,255, issued Aug. 26, 2003 to Jason T. Griffin et al. (handheld electronic device with a keyboard optimized for use with the thumbs); U.S. Pat. No. 6,641,482, issued Nov. 4, 2003 to Iwao Masuyama et al. (portable game apparatus with acceleration sensor and information storage medium storing a game program); U.S. Pat. No. 6,683,599, issued Jan. 27, 2004 to Robert A. Shepherd (keypads style input device for electrical device); and U.S. Pat. No. 6,690,358, issued Feb. 10, 2004 to Alan E. Kaplan (display control for hand-held device).

Additional related art includes European Patent Application Publication No. EP 0 735 514 A1, published in October 1996, Great Britain Patent Application Publication No. GB 2 193 023 A, published in January 1988, World International Patent Organization (WIPO) Patent Application Publication No. WO 02/073995 A1, published in September 2002, European Patent Application Publication No. EP 1 271 288 A2, published in January 2003, and WIPO Patent Application Publication No. WO 03/015379, published in February 2003.

None of the above inventions and patents, taken either singly or in combination, is seen to describe the instant invention as claimed. cl SUMMARY OF THE INVENTION The present invention is an active keyboard system for handheld electronic devices. The active keyboard system dynamically presents available choices on a display grouped to effect unambiguous selection of the available choices through use of input means, thereby providing users of handheld electronic devices with a consistent set of techniques to perform all commonly used functions including entering alphanumeric text and data into the system using only one hand. The active keyboard system includes a processor, a memory, and a display communicatively connected to one another. The system includes input means for inputting data into the system that include at least one selector and a plurality of keys. Active keyboard system software is stored on the memory and is configured to dynamically present available choices on the display grouped to effect unambiguous selection of the available choices through use of the input means.

The active keyboard system software includes presentation code and filter code. The presentation code includes step or scroll resolution code to enable scrolling, and grid presentation code to organize available choices on a visual grid and provide the visual grid to the display. The presentation code displays a selection pointer controlled by one of the selectors at a time. The grid presentation code configures the visual grid with one or more panes each configured as a matrix with a plurality of columns and plurality of rows. The pane(s) may be configured as a matrix with three columns and four rows, a matrix with one column and a plurality of rows, etc. The pane(s) may be clear, transparent, translucent, and/or opaque.

The visual grid includes a plurality of cells and the grid presentation code may have grid population code to populate each of the cells with an alphanumeric character, a symbol, a music note, an icon, text, an ideogram, or a logogram. The presentation code may have application adapter code to translate transactions between application and presentation code, sound code to provide an audio announcement for a selected choice, an audio confirmation for completion of an action or an alarm for failure to complete an action, and feedback code to enhance user interaction with the system.

The filter code is configured to separate an intentional user motion input from accidental motion. Filter code may have external forces filter code to separate user input from undesired effects of external forces, step motion code to translate user intentions into precise movement of a pointer over the grid, and to allow readjustment of the system between steps, sliding zero code to allow the user to change his/her position while operating the device, adaptive threshold code to optimize operator interaction with the system via feedback, and/or calibration code to effect user and application preferences.

The keys may be configured to be operated by fingers without obstructing the display. The active keyboard system may be configured with a single selector or plural selectors. A selector may be a wheel, a track ball, a joystick, a rocker pad, a touch pad, a selector switch, a toggle switch, a key button, an N-state button, or an N-state selector configured to be operated by a thumb or other finger.

Alternatively or in addition to a thumb/finger operated selector(s), the active keyboard system may have selector(s) configured to interpret motion of the system as an input. Such a selector may be a set of one, two, or three movement sensors configured to sense motion in different substantially orthogonal dimensions. The movement selector(s) may include two or more sets of movement sensors configured to filter out effects of undesired movement of the system by external forces.

The active keyboard system may be configured to achieve ambidextrous use by providing a partial or full duplication of the input means on the system or by allowing the user to rotate, reattach, slide, or move system parts. The keys may be configured to inhibit unintentional engagement.

The active keyboard system may be configured as a cellular phone, a personal digital assistant, a global positioning receiving device, a remote control, a computer mouse, a pager, a walkie-talkie, a scanner, a multi-meter, etc., and may be configured to effect browsing on the Internet with a single pointer.

Accordingly, it is a principal aspect of the invention to provide an active keyboard system including a processor, a memory communicatively connected to the processor, a display communicatively connected to the processor, input means for inputting data into the system, the input means including at least one selector, a plurality of keys, and active keyboard system software stored on the memory. The active keyboard system software is configured to dynamically present available choices on the display grouped to effect unambiguous selection of the available choices through use of the input means.

It is an aspect of the invention to provide improved elements and arrangements thereof in an active keyboard system for handheld electronic devices for the purposes described which is inexpensive, dependable and fully effective in accomplishing its intended purposes.

These and other aspects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
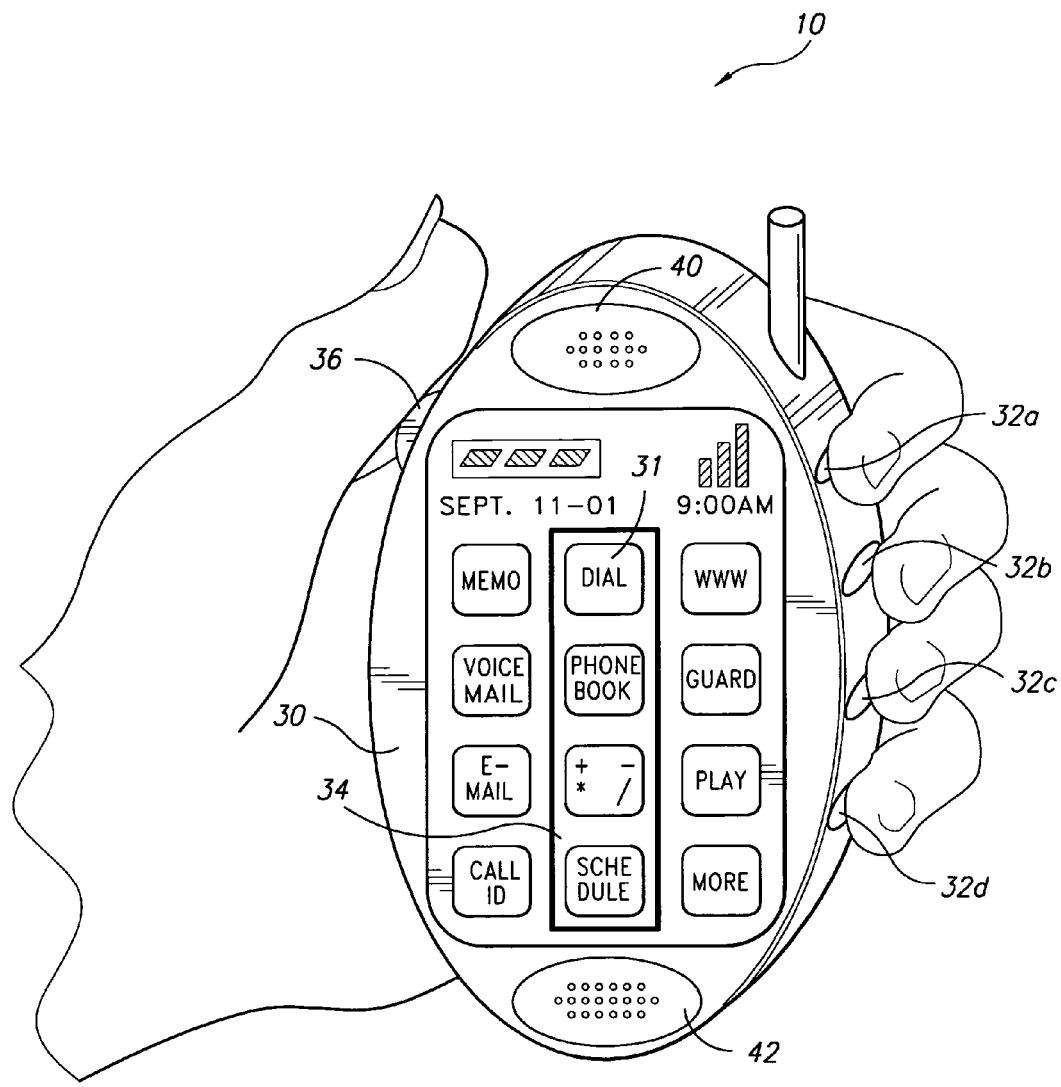
FIG. 1 is front perspective view of an active keyboard system configured as a cellular phone for left handed use according to the present invention.

The present invention is an active keyboard system for handheld electronic devices. The active keyboard system dynamically presents available choices on a display grouped to effect unambiguous selection of the available choices through use of input means, thereby providing users of handheld electronic devices with a consistent set of techniques to perform all commonly used functions including entering alphanumeric text and data into the device using only one hand. The invention disclosed herein is, of course, susceptible of embodiment in many different forms. Shown in the drawings and described herein below in detail are preferred embodiments of the invention. It is to be understood, however, that the present disclosure is an exemplification of the principles of the invention and does not limit the invention to the illustrated embodiments.

Referring to the drawings, FIG. 1 shows an active keyboard system 10 according to the present invention configured in the form of a cell phone. However, the active keyboard system 10 may be configured, integrated into, and/or incorporated into a variety of handheld electronic devices, such as cellular phones (cell phones), personal digital assistants (PDAs), Global Positioning System (GPS) receiving devices, remote controls, computer mouses, pagers, walkie-talkies, scanners, multi-meters, remote controls, etc. The cell phone 10 has an ergonomic housing 30 with a front, back, top, bottom and two sides, at least four keys 32*a*, 32*b*, 32*c* and 32*d*, a display 34, a selector 36, a processor, a memory, and active keyboard system software. The keys 32*a*–32*d* are positioned on the side of the housing 30 so that they underlie the fingertips of the user when the cell phone 10 is held during normal operation. The selector 36 is positioned on the side of the housing 30 opposite the keys so that it is disposed under the thumb of the user of the cell phone 10 when the cell phone 10 is held.

The cell phone 10 in FIG. 1 is configured for a left handed user and has a conventional speaker 40 and microphone 42 above and below the display 34. The cell phone 10 dynamically presents available choices on the display 34 grouped to effect unambiguous selection of the available choices through use of the keys 32*a*–32*d* and the selector 36, thereby providing users of the cell phone 10 with a consistent set of techniques to perform all commonly used functions including entering alphanumeric text and data into the device using only one hand.

As used herein, the phrase "unambiguous selection of available choices" is defined as an ability to make an unequivocal choice of a desired value from a group of values assigned to one key. Obviously, other phraseology having substantially the same meaning may be utilized, such as disambiguating an ambiguous keystroke by correlating between keys, selectors, and display readings.

Figure 2:
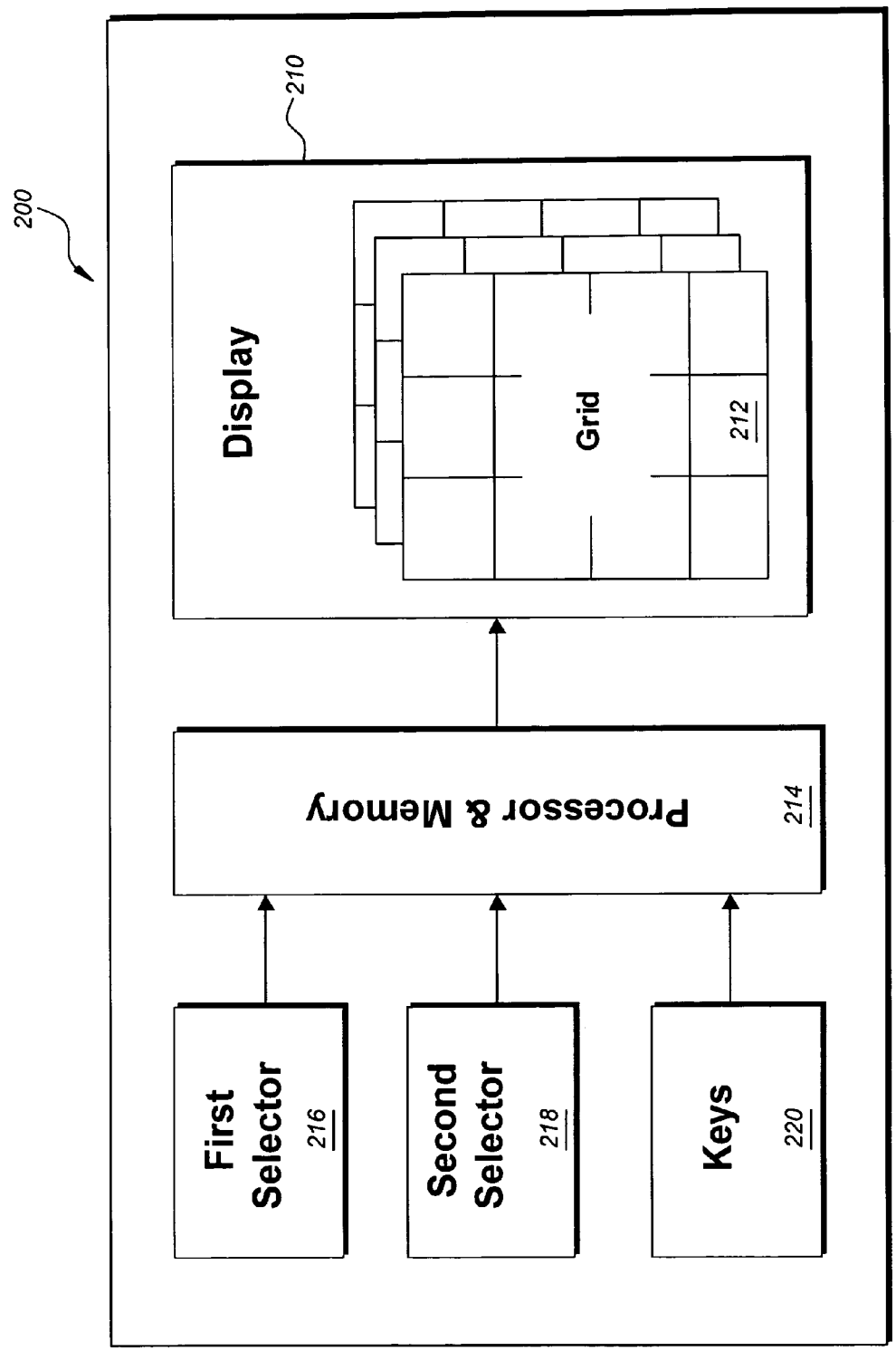
FIG. 2 is a block diagram of an active keyboard system according to the present invention.

Major components of an active keyboard system 200 according to the invention include a display 210 showing a grid 212, a processor and memory 214, a first selector 216, a second selector 218, and keys 220, as shown in FIG. 2. Two dimension sensors are sufficient for most applications, but three dimension sensors may be implemented as desired. Active keyboard system software is carried on and/or is embodied in the memory of the active keyboard system 200.

The keys 220 are configured to be operated by fingers without obstructing the display 210. Either the first selector 216 or the second selector 218 may be configured to interpret motion of the system 200 as input. For example, the first selector 216 may be a wheel, a track ball, a joystick, a rocker pad, a touch pad, a selector switch, a toggle switch, a key button, an N-state button (e.g., a multi-state button), an N-state selector (e.g., a multi-state selector), or the like. Preferably, the first selector is configured and positioned to be operated by a thumb, but may be operated by any part of a user's hand or a tool.

The second selector 218 may be configured to interpret motion of the system 200 as an input, and may be a set of one or more movement sensor(s) configured to sense motion in different dimensions. One such selector may include two or more sets of movement sensors configured to filter out effects of external forces applied to the system 200. The movement sensor(s) may be configured to filter out effects of external forces applied to the system 200 by aligning a sensitivity axis of a second set of movement sensor(s) to a first set of movement sensor(s).

In addition, the system 200 may be configured for ambidextrous use by providing partial or full duplication of the input means on the system 200. The system 200 may be configured for ambidextrous use by allowing a user to rotate, reattach, slide, or move parts of the system 200. The keys 220 may be configured to inhibit unintentional engagement.

The system 200 may be configured as a cellular phone, a personal digital assistant, a global positioning receiving device, a remote control, computer mouse, a pager, a walkie-talkie, a scanner, a multi-meter, etc. Some or all of components of the system 200 may be configured as a sleeve to operatively attach to and be used in combination with a handheld electronic device, such as a cell phone, a PDA, a GPS receiving device, a remote control, a computer mouse, a pager, a walkie-talkie, a scanner, a multi-meter, etc. The system 200 may be configured to effect browsing on the Internet, or to work with applications with a single selector and/or with two selectors.

The active keyboard system software includes presentation code and filter code. The presentation code includes step or scroll resolution code to enable scrolling, and grid presentation code to organize available choices on a visual grid 212 and provide the visual grid 212 to the display 210. The presentation code displays a selection pointer controlled by one of the selectors 216 or 218 at a time. The grid presentation code configures the visual grid 212 with one or more panes each configured as a matrix with a plurality of columns and plurality of rows. The pane(s) may be configured as a matrix with three columns and four rows, a matrix with one column and a plurality of rows, etc. The pane(s) may be clear, transparent, translucent, and/or opaque.

The visual grid 212 includes a plurality of cells and the grid presentation code may have grid population code to populate each of the cells with an alphanumeric character, a symbol, a music note, an icon, text, an ideogram, a logogram, etc. The presentation code may have application adapter code to translate transactions between application and presentation code, sound code to provide an audio announcement for a selected choice, an audio confirmation for completion of an action or an alarm for failure to complete an action, and feedback code to enhance user interaction with the system 200.

The filter code is configured to separate an intentional user motion input from accidental motion. Filter code may have external forces filter code to separate user input from undesired effects of external forces, step motion code to translate user intentions into precise movement of a pointer over the grid, and to allow readjustment of the system between steps, sliding zero code to allow the user to change his/her position while operating the device, adaptive threshold code to optimize operator interaction with the system via feedback, and/or calibration code to effect user and application preferences.

Figure 3:
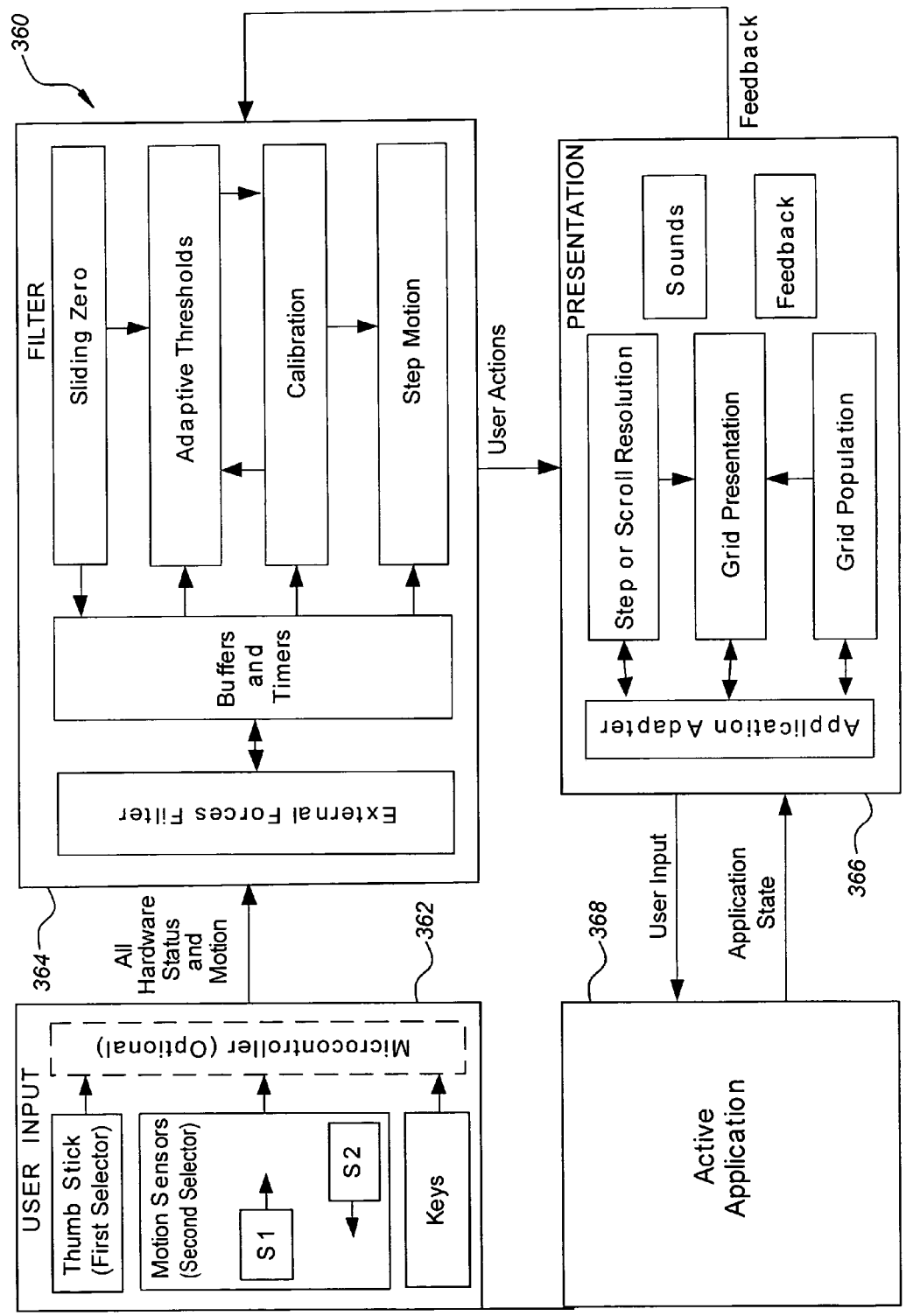
FIG. 3 is a block diagram of the active keyboard system software according to the present invention.

Active keyboard system software is illustrated in FIG. 3 as 360 and reflects user input 362, the filter 364, the presentation 366, and the active application 368. User input 362 represents hardware status of the selectors(s) and keys, and may be initially processed by an optional microcontroller. The user input 362 then passes through a motion filter, buffers and timers, and is then evaluated using the adaptive threshold code, the sliding zero code, and the step motion code in the filter 364. Calibration code may be utilized to control the buffers, timers, and/or adaptive thresholds. Images on the presentation 366 are determined by an active application. The user input results in movement of the selection pointer over the grid, a change in the grid outline, and/or selection of one of the presented choices. The software can produce sound announcement for an available selection, a confirmation for a completed action, or an alert for a failed one. The software is capable to provide a feedback to the filter 364 for threshold adaptation to improve useability. The application state and user input is continuously reported between the presentation 366 and the active application 368.

Figure 4A:
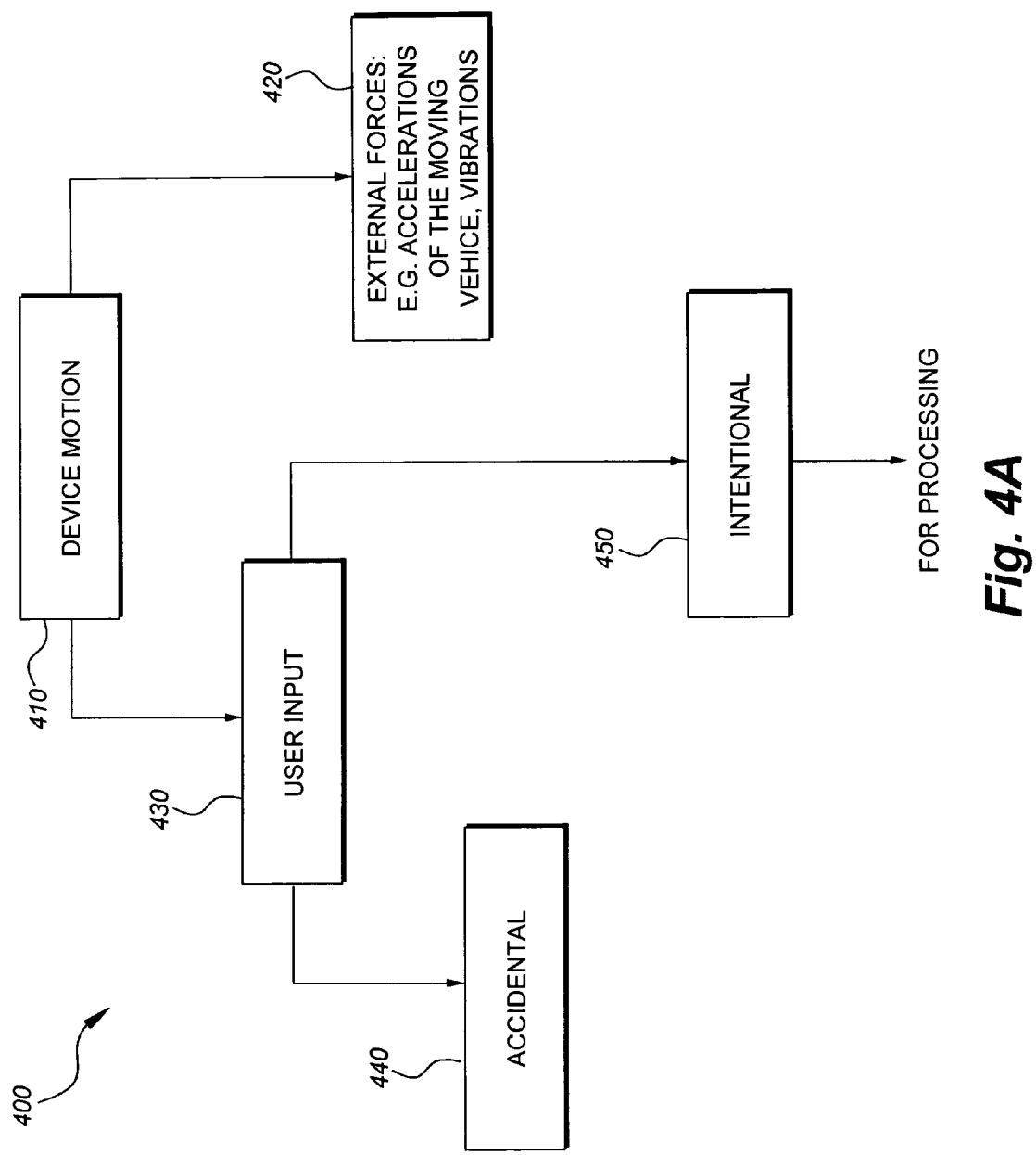
FIG. 4A is a flow diagram indicating the effect of tilt movement of an active keyboard system according to the present invention.
Figure 4B:
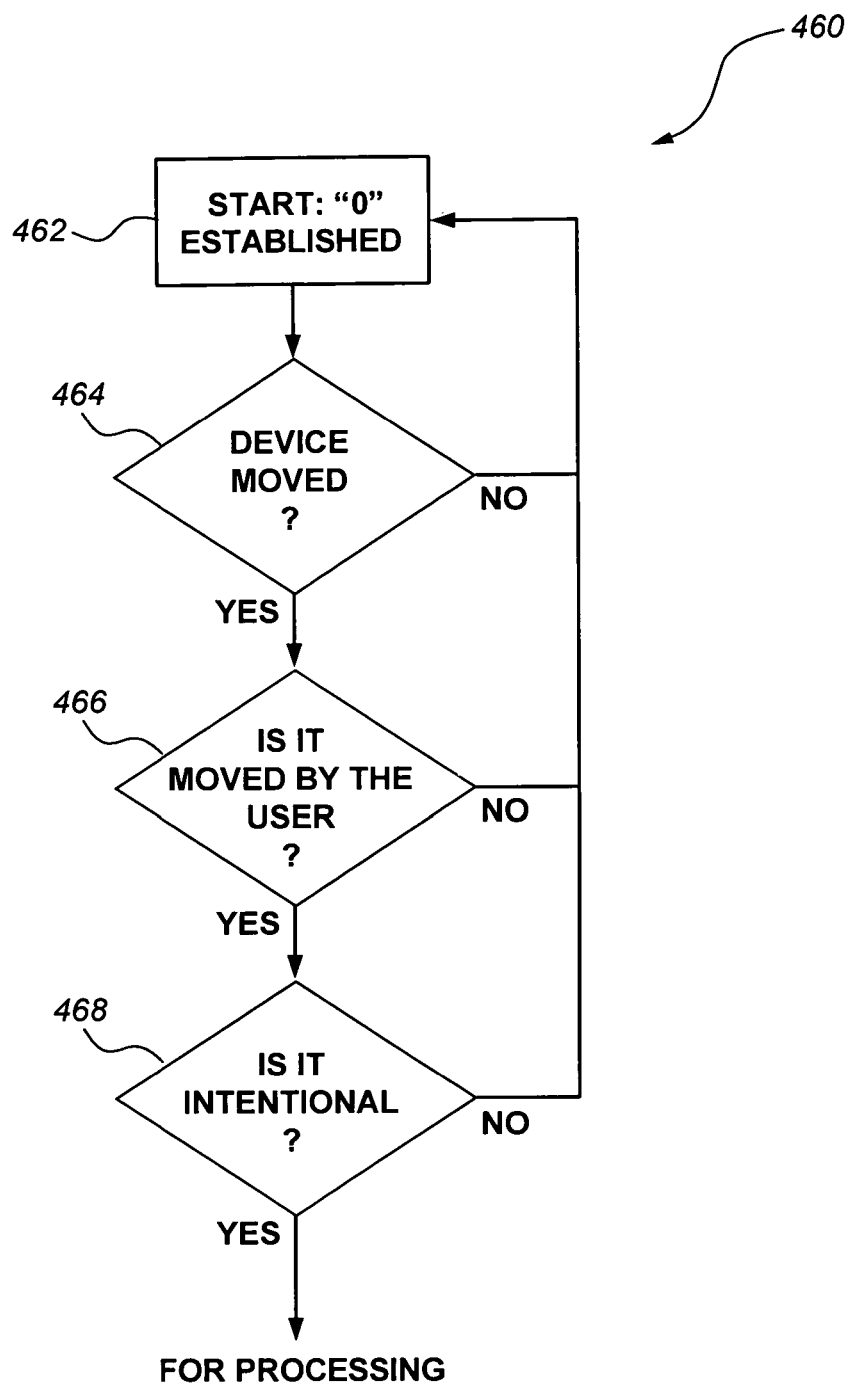
FIG. 4B is a flow diagram indicating the effect of tilt movement of an active keyboard system according to the present invention.

Effects of movement are shown in the flow charts 400 and 410 shown in FIGS. 4A and 4B. FIG. 4A shows how movement of the device 410 may be interpreted and/or processed as user input 430 after determining and/or ignoring external forces 420 and/or accidental movement 440, thereby separating intentional user input based on the analysis of the forces applied to the device. The flow chart 460 of FIG. 4B shows how after a reference zero is established 462, a determination is made as to whether the device has been moved 464. If the determination is negative, no further activity occurs. If the determination is positive, a determination is made whether the movement was made by the user. If the determination is negative, no further activity occurs. If the determination is positive, a determination is made whether the movement is intentional. No further activity occurs if the determination is negative. Further processing occurs if the determination is positive.

Figure 5A:
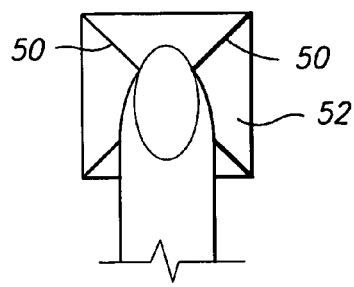
FIG. 5A is a top view of a button assembly selector according to the present invention.
Figure 5B:
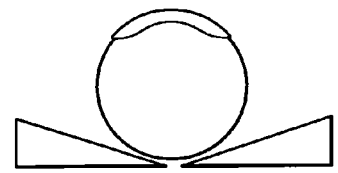
FIG. 5B a cross sectional view of the button assembly selector shown in FIG. 5A.

The selector 36 of FIG. 1 may be configured in a variety of ways, some of which are shown in FIGS. 5A–5E. A four triangular button configuration of the selector 36 is shown in FIG. 5A. Each triangular button has two legs 50 and a hypotenuse 52. The buttons are positioned so that one leg 50 from each triangular button is positioned next to a leg 50 of one other triangular button. In this way the hypotenuses 52 of the four triangular buttons form a rectangle. Each triangular button is also sloped, as shown in FIG. 5B, so that the thickness of each button is greatest along its hypotenuse 52 and least where the two legs 50 intersect.

Figure 5C:
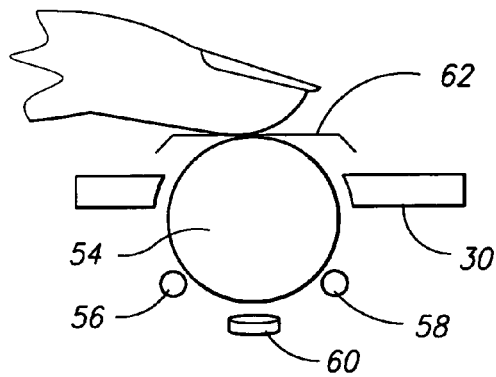
FIG. 5C is a cross sectional view of a roller ball selector according to the present invention.

A track ball configuration of the selector 36 is shown in FIG. 5C. Track balls are well known in the art and include a spherical ball 54 which is rotatably secured inside the housing 30. The spherical ball is in contact with two rotational sensors 56 and 58 and a push down contact 60. When in use, a user moves the portion of the spherical ball 62 that extends outside of the housing and the rotations are detected by the rotational sensors 56 and 58. The user can also press the spherical ball 62 toward the push down contact 60. Once the spherical ball 62 touches the push down contact 60 the motion of the ball 62 is detected.

Figure 5D:
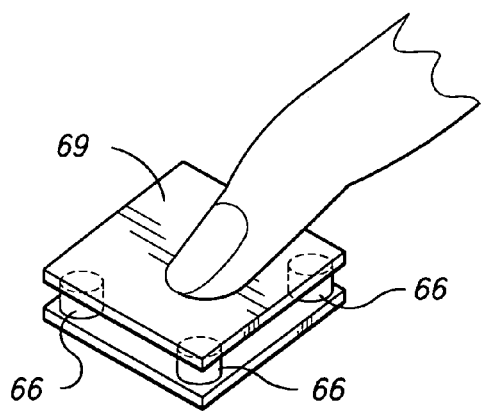
FIG. 5D is a perspective view of a touch pad selector according to the present invention.

A rocker pad configuration of the selector 36 with multiple contacts is shown in FIG. 5D. The rocker pad has a panel 69 connected to five push down contacts 66 (three shown in FIG. 5D). The contacts are positioned one at each corner of the panel 69 and one in the center of the panel 69. When a user presses near a corner of the pad or in the middle of the pad the pressure is detected by one of the contacts 66.

Figure 5E:
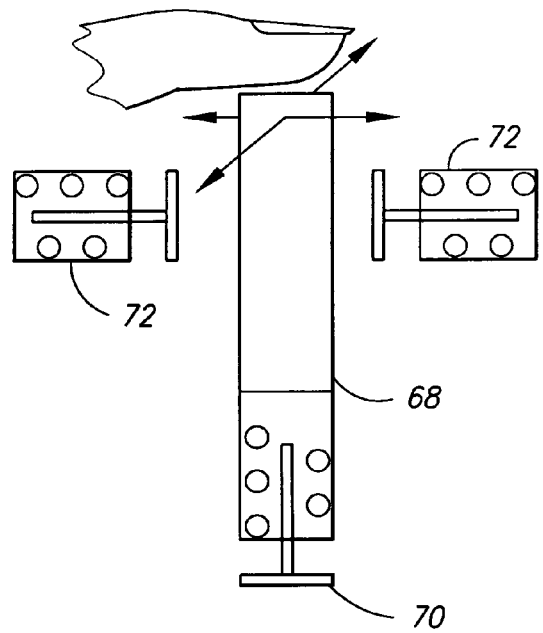
FIG. 5E is a cross sectional view of a joystick selector according to the present invention.

A joystick configuration of the selector 36 is shown in FIG. 5E. Joysticks are well known in the art and have an elongated stick member 68 which has a bottom and top portion. The bottom portion is moveably connected to a push down contact 70. When the joystick is operated the user places one of his/her digits on top of the stick member and tips the stick forward, back, left, or right. These motions are detected by contacts 72 arranged in front, behind, and to the left and right of the stick member, respectively. The user may also press the top of the stick member 68 toward the push down contact 70. This motion is detected by the push down contact 70.

Figure 6A:
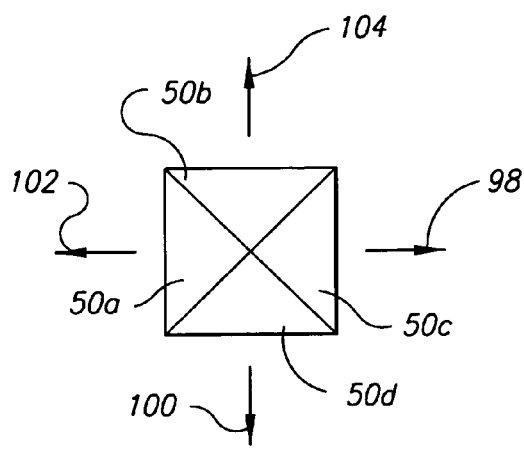
FIG. 6A is a functional view of the button assembly selector shown in FIG. 5A.
Figure 6B:
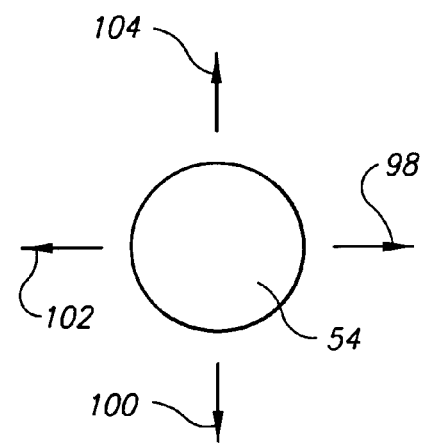
FIG. 6B is a functional view of the roller ball selector shown in FIG. 5B.
Figure 6C:
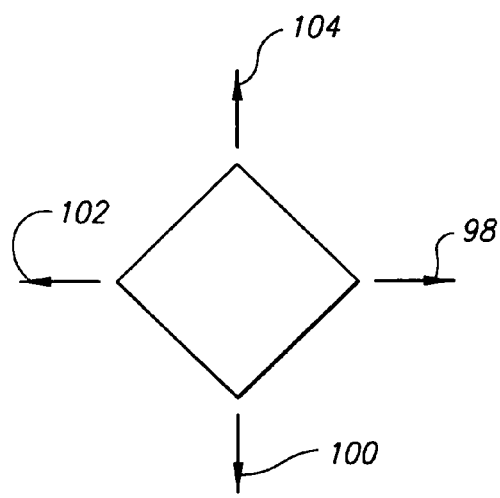
FIG. 6C is a functional view of the touch pad selector shown in FIG. 5D.
Figure 6D:
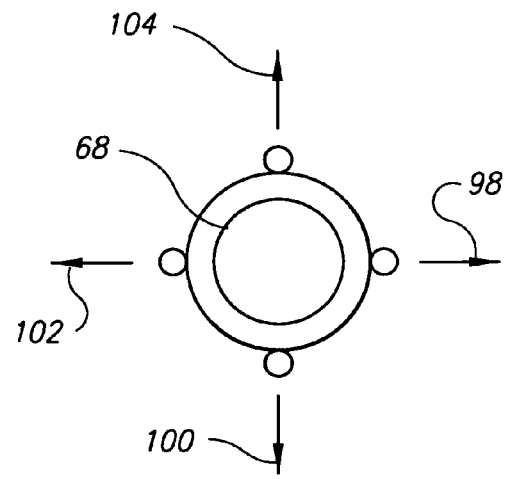
FIG. 6D is a top view of the joystick selector shown in FIG. 5E.

FIGS. 6A–6D illustrate lateral directional movements that may be made with the selector configurations shown in FIGS. 5A–5E. The operation of each configuration differs slightly, but the intended direction of operation is the same with each selector. For example, pushing the joystick 68 in the direction of arrow 98 in FIG. 6D is analogous to pushing down button 50c on the button assembly of FIG. 6A, rolling the roller 54 of the roller ball FIG. 6B towards the direction of arrow 98, or pushing down the corner of the direction pad FIG. 6C closest to the direction of arrow 98. The selectors are each oriented with arrow 104 always pointing towards the top portion of the handheld device's housing 30. Similarly, directional arrows 102 and 100 point toward the left and bottom sides of the housing 30. As used herein, the verbs push or press, and derivations thereof, encompass any analogous motion of all selector configurations.

All functions of the active keyboard system software (to be discussed infra) can be controlled through the combined use of both the keys 32a–32d and the selector 36 shown in FIG. 1. As described above, the active keyboard system may also, however, incorporate one or more movement sensors to perform many of the functions performed by the selector 36 through physical movements of the handheld device.

Figure 7:
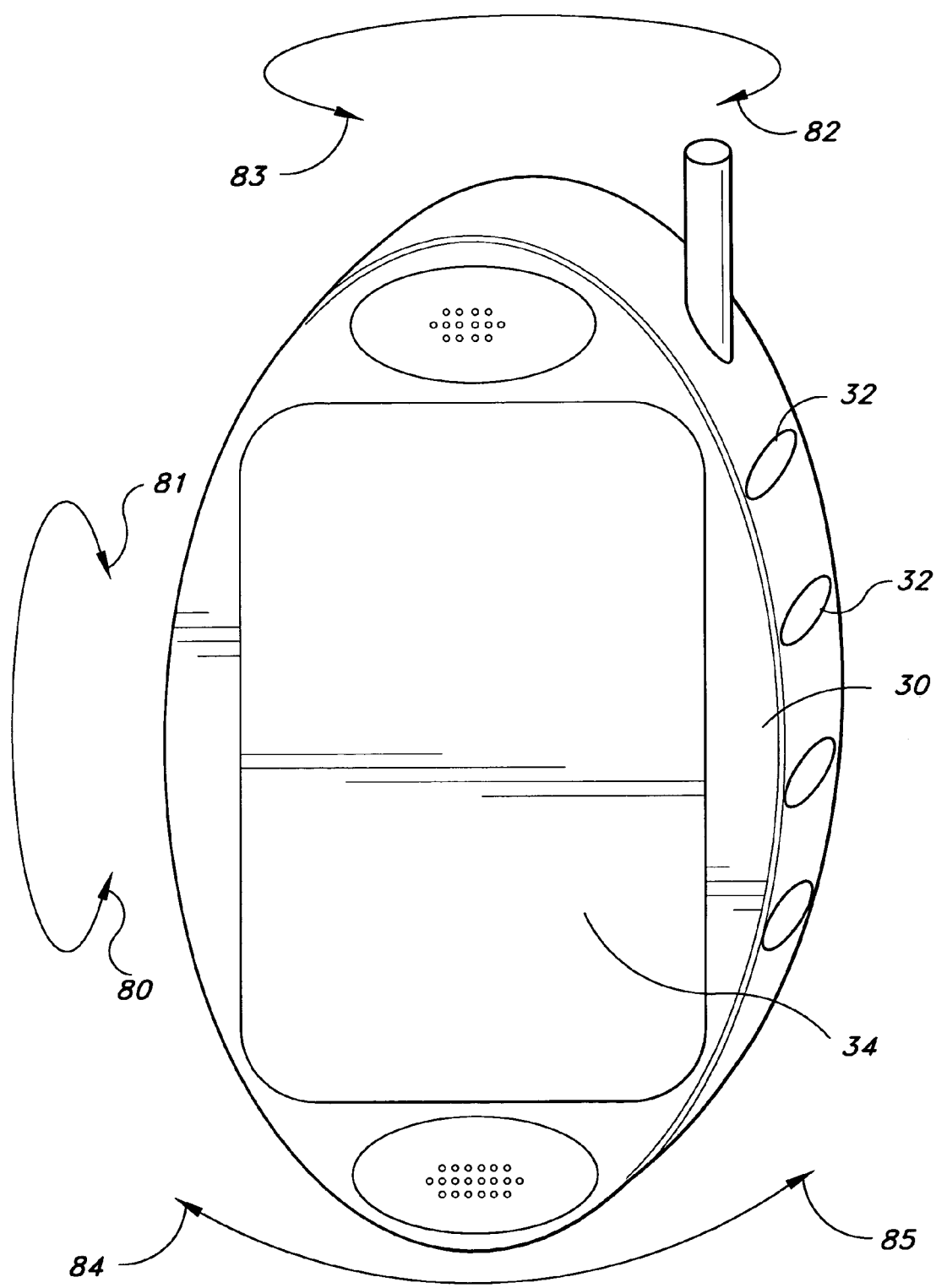
FIG. 7 is a perspective view of an active keyboard system device equipped with a movement sensor selector according to the present invention.

When equipped with one or more movement sensors, the active keyboard system can be configured to sense one or more substantially orthogonal component(s) of movement (e.g., pitch, roll, and/or yaw of the system) by having the sensor(s) periodically sample the movement component(s) of the system, as shown in FIG. 7. Directions 80 and/or 81 represent pitch (clockwise or counterclockwise about a horizontal axis through the device), directions 82 and/or 83 represent roll (clockwise and counterclockwise about a vertical axis through the device), and directions 84 and 85 represent yaw (clockwise and counterclockwise about an orthogonal axis through the device) These types of movements are consistent with the type of movement a handheld device would undergo if the holder of the device flexed, extended, and/or rotated his/her wrist.

There are several different types of movement sensors that can be incorporated into the active keyboard system to sense the movement of the active keyboard system, all of which are well known in the art and will only be discussed briefly here as they relate to the functional aspects of the active keyboard system. Movement sensors may be configured to sense a change in one, two, or three substantially orthogonal components of an acceleration, velocity, displacement, and/ or electromagnetic field of a moving object to which the sensor(s) are attached (e.g., the pitch, roll, and/or yaw of the active system keyboard system) and cause the processor to calculate the movement of the system as a sequence of location changes. Such movement sensors may use gravity, inertia, oscillation, magnetic fields, acoustics, optics, gyroscopics, or other physical effects and principles.

In addition, such movement sensors may configured in the form of "sets" of one or more one dimensional, two dimensional, or three dimensional sensors for detecting multidimensional movement. For example, acceleration sensors may be configured as one dimensional sensors. As such, a "set" of three separate one dimensional acceleration sensors can be attached to an object and used to sense movement of the object in each orthogonal direction.

Two or more sets of movement sensors, for example, acceleration sensors, gravitational field sensors, gyroscopic sensors, etc. (e.g., inertial type sensors that track object movement independently from the location of the object), may be incorporated into the housing of the active keyboard system to filter out effects of external forces applied to the system. Placement of the movement sensors is not critical as long as the sensors are capable of detecting their assigned range of movements. It would be beneficial to keep sensors of both sets closely aligned over their sensitivity axis. A second set of sensors may also be external to the active keyboard system.

Figure 8:
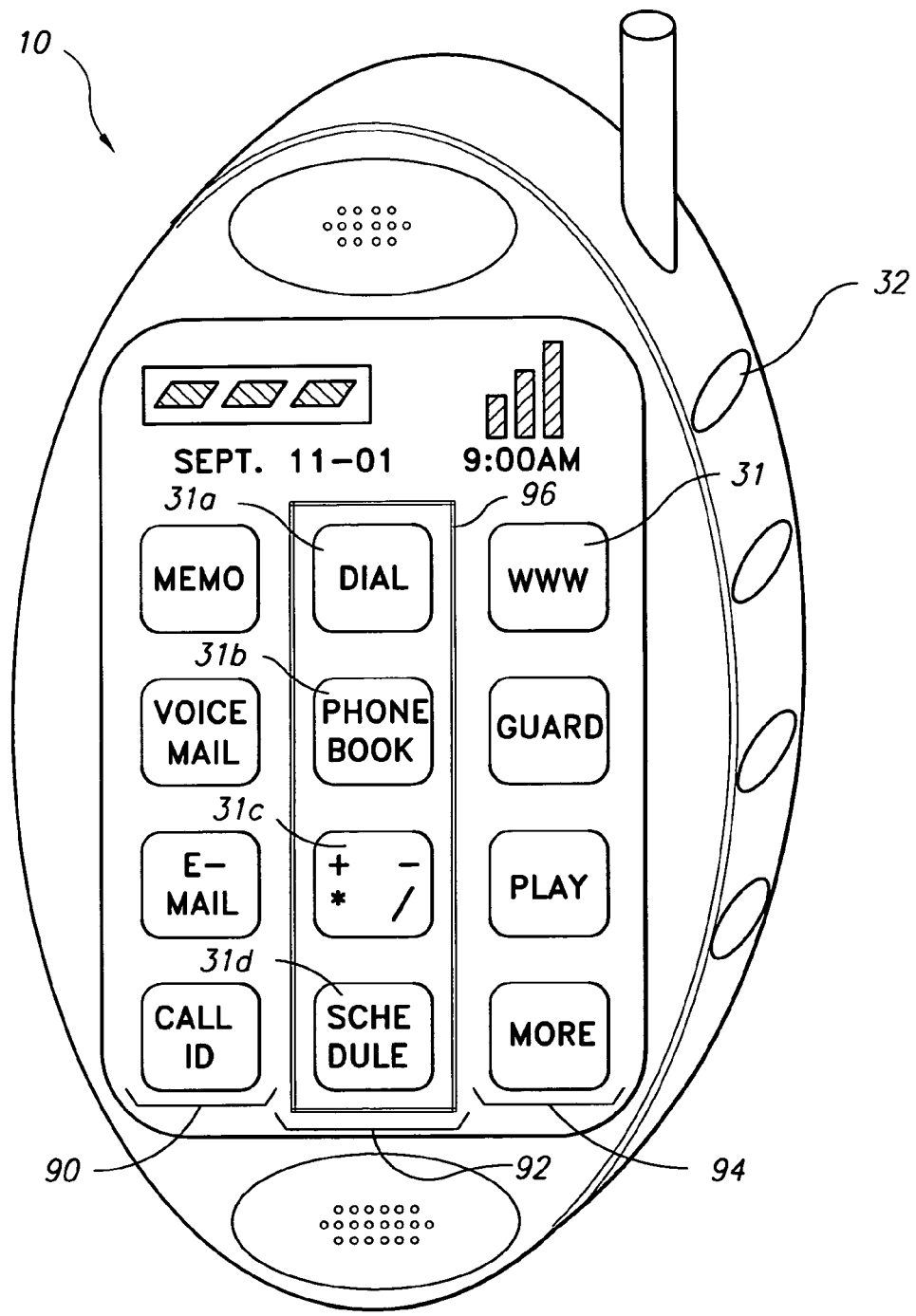
FIG. 8 is a front perspective view of an active keyboard system with the display showing columns of selection pointers according to the present invention.

The active keyboard system software includes a plurality of computer instructions and may be carried on any type of computer useable medium, such as electronic memory, optical memory, magnetic media memory, or the like. The active keyboard system software works with the processor to output information to the display and interpret commands and data entered by the user. When power is applied to the active keyboard system the user has the option to select one of several modes of operation. The modes of operation vary depending on the capability of the active keyboard system. The active keyboard system software has two selection techniques, row selection and column selection. The column selection, made by a selector, selects one of the three vertical columns 90, 92, and 94 by selection pointer 96 effecting unambiguous input from finger keys of any of the four boxes 31a, 31b, 31c, 31d, located at a crossing between a selected column and row, as shown in FIG. 8. The selected boxes 31a, 31b, 31c, 31d, initiate different possible modes of operation startup, but the same selection techniques may be used to input a variety of values into the active keyboard system.

Figure 9:
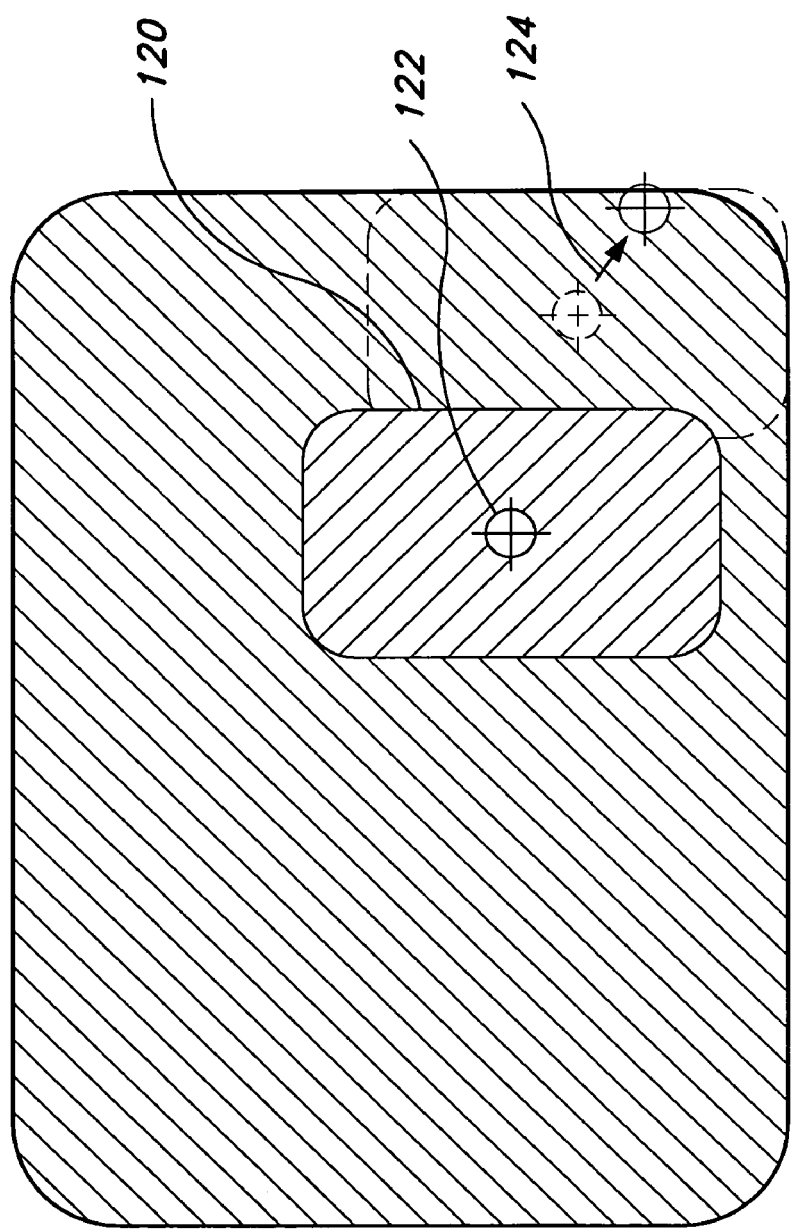
FIG. 9 is a front view of a computer screen with a shaded portion representing the portion of a page viewed on a display of an active keyboard system according to the present invention.

The active keyboard system can operate in an Internet navigation mode, or can work with applications, such as Windows based applications or the like, with a single selector or two selectors. With a single selector, as shown in FIG. 9, when the active keyboard system is in the Internet navigation mode the display shows a portion of a particular web page. The user can move the displayed view 120 of the page by using a selector or through the use of the movement sensors. In the Internet mode a cursor 122 appears in the middle of the displayed web page image. As the user navigates through a web page the cursor 122 stays centered in the display until the image reaches the edge of the web page. At that point the motion of the image stops and the cursor continues 124 toward the edge of the screen. This allows the user to "click" on portions of the web page that are close to the edge of the page. With two selectors, one of the selectors can control the motion of the displayed window over the web page and the second selector can control the pointer.

Figure 10:
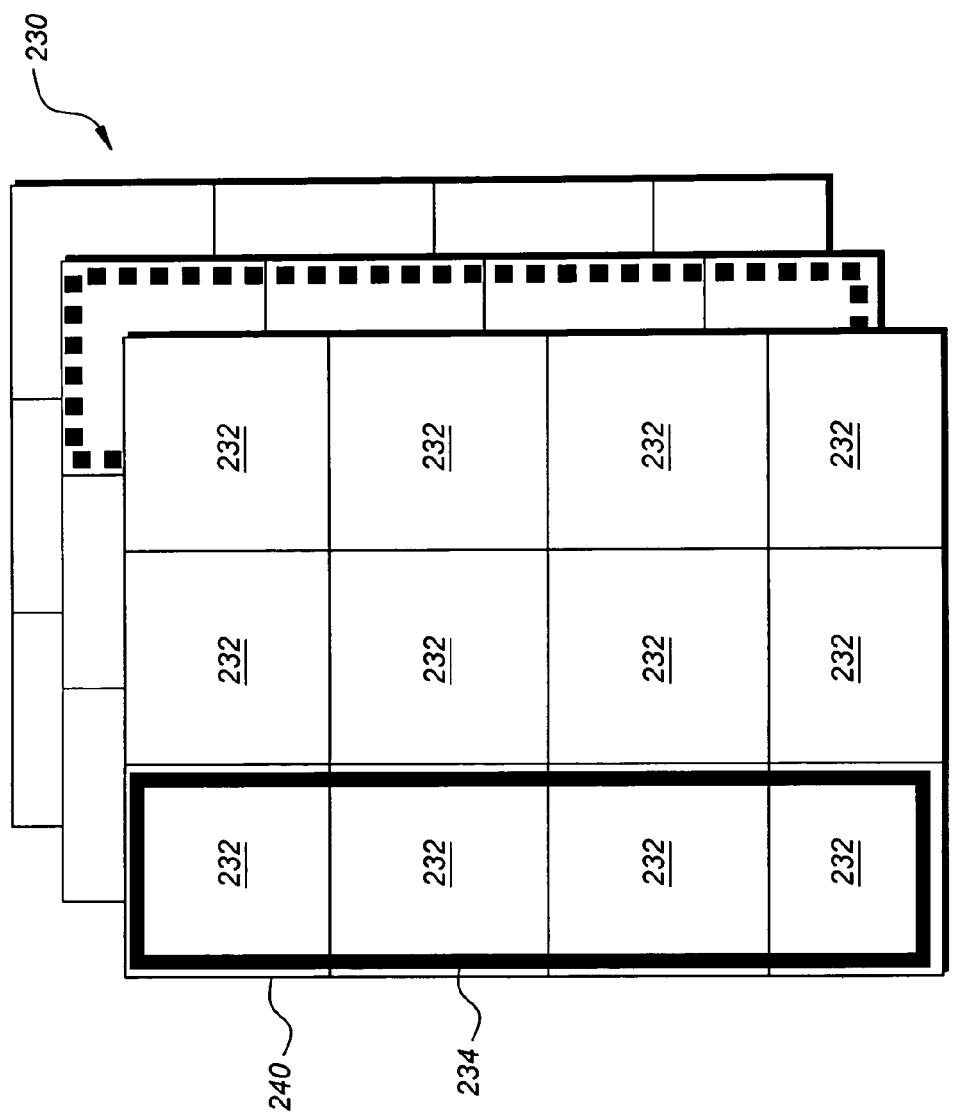
FIG. 10 is an expanded view of a multi-pane grid of an active keyboard system according to the present invention.

A grid 230 with three translucent panes 240 for typing, dialing, and icon selection of an active keyboard system is shown in FIG. 10. More than three panes 240 can be used, but only three panes 240 are visible at a time, the selected pane, the pane behind the selected pane, and the pane on top of the selected pane.

While each pane 240 of the grid 230 includes a three column by four row matrix of cells 232, the grid panes 240 may be configured with a matrix having any number of rows and columns of cells 232. Usually, only three columns are visible, the selected column, the column to the left of the selected column, and the column to the right of the selected column. And, in most applications, the number of keys of a particularly configured active keyboard system equals the number of rows in the grid pane of the particular active keyboard system. The keys may be configured to be protected from unintentional engagement (e.g., by the palm of a hand) by being positioned in a groove, by being separated by bars, by being positioned in a pit, etc. The panes 240 of the grid 230 are selected through the use of up and down commands, and a desired column is selected by moving the selection pointer 234 to the associated column through the use of left and right commands. Each cell 232 can contain a variety of items, such as an alphanumeric character, a symbol, a music note, an icon, an ideogram, a logogram, etc.

Figure 11:
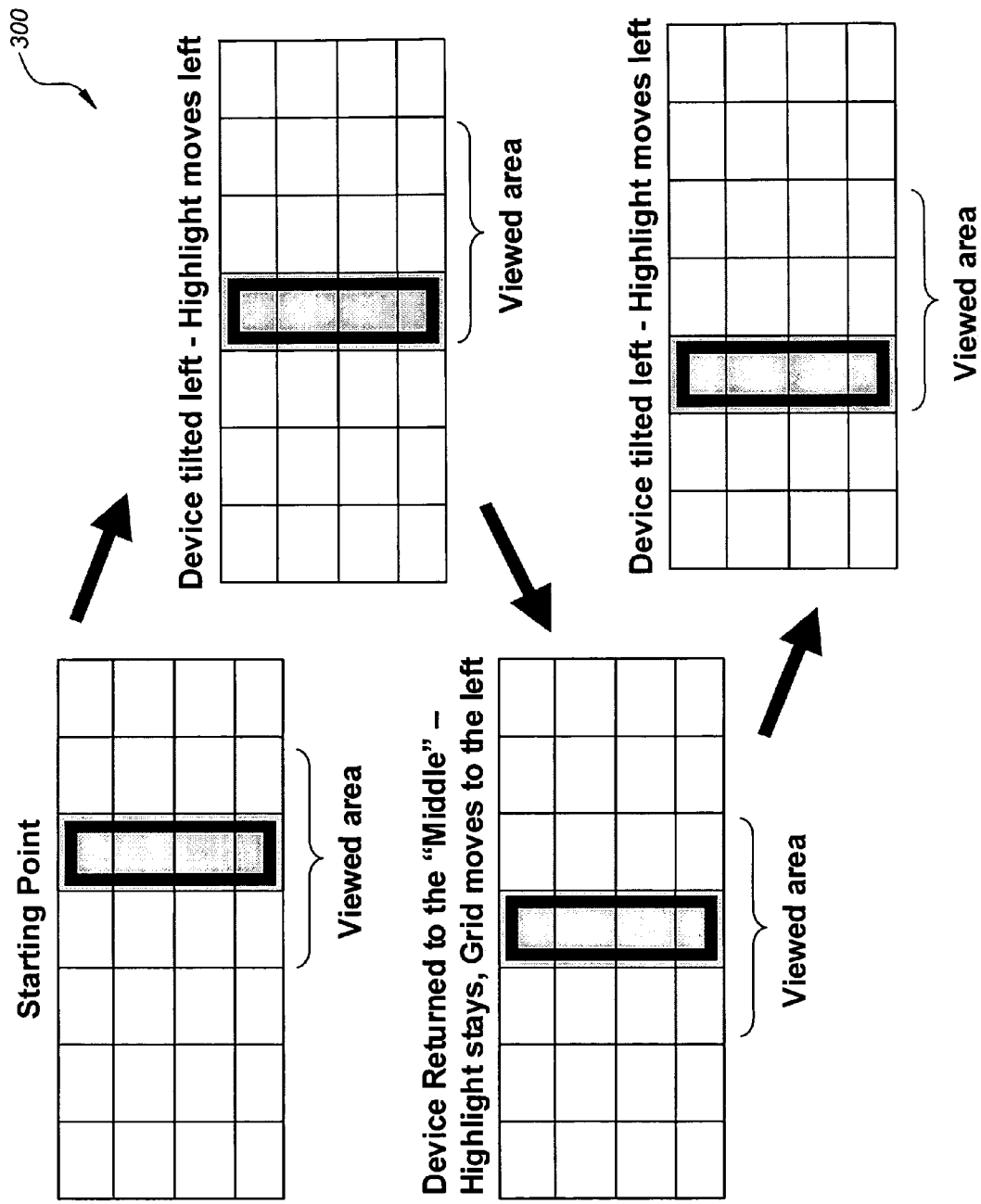
FIG. 11 is a functional view of step motion of an active keyboard system according to the present invention.
Figure 12:
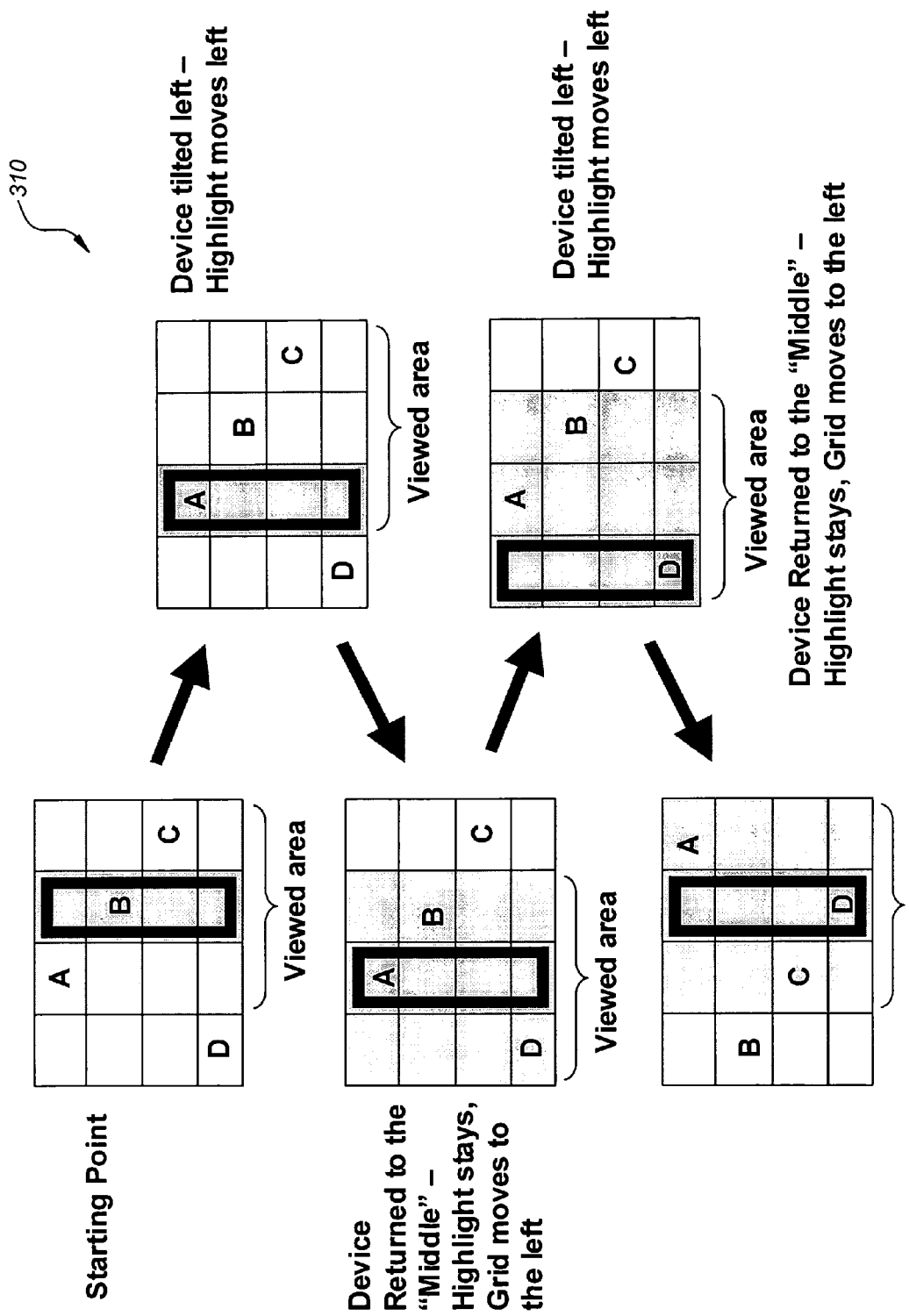
FIG. 12 is a functional view of step motion of an active keyboard system according to the present invention.

The active keyboard system software effects step motion movement of the viewed area and selection pointer which is functionally illustrated as 300 in FIG. 11. When the viewed area begins at a particular position and the user tilts the system left, the selection pointer moves left, when the device is returned to the middle, the visible grid subsequently moves left. When the user again tilts the system left, the selection pointer moves left. The active keyboard system software effects circular motion movement of the viewed area and selection pointer which is functionally illustrated as 310 in FIG. 12. When the viewed area begins at a particular position, the selection pointer is on column B and the user tilts the system left, the selection pointer moves left to column A and when the device is returned to the middle, the visible grid subsequently moves left and the selected column A is centered. When the user again tilts the system left, the selection pointer moves left to column D. If column D is the farthest left column the selection pointer remains on column D and the viewed area centers on column D by moving columns B and C to the left of column D.

Figure 13:
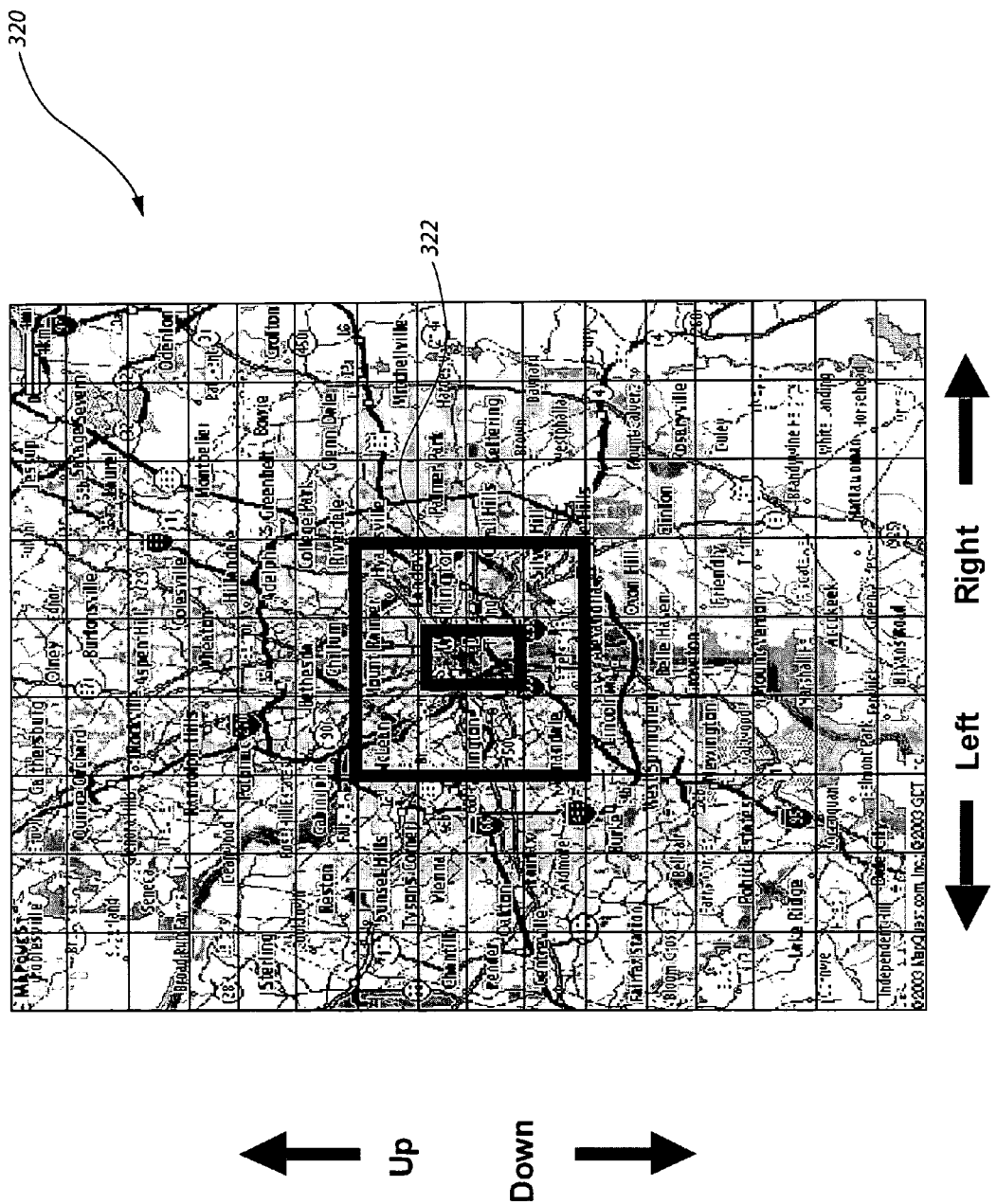
FIG. 13 is a front view of a map image on a display of an active keyboard system according to the present invention.
Figure 14:
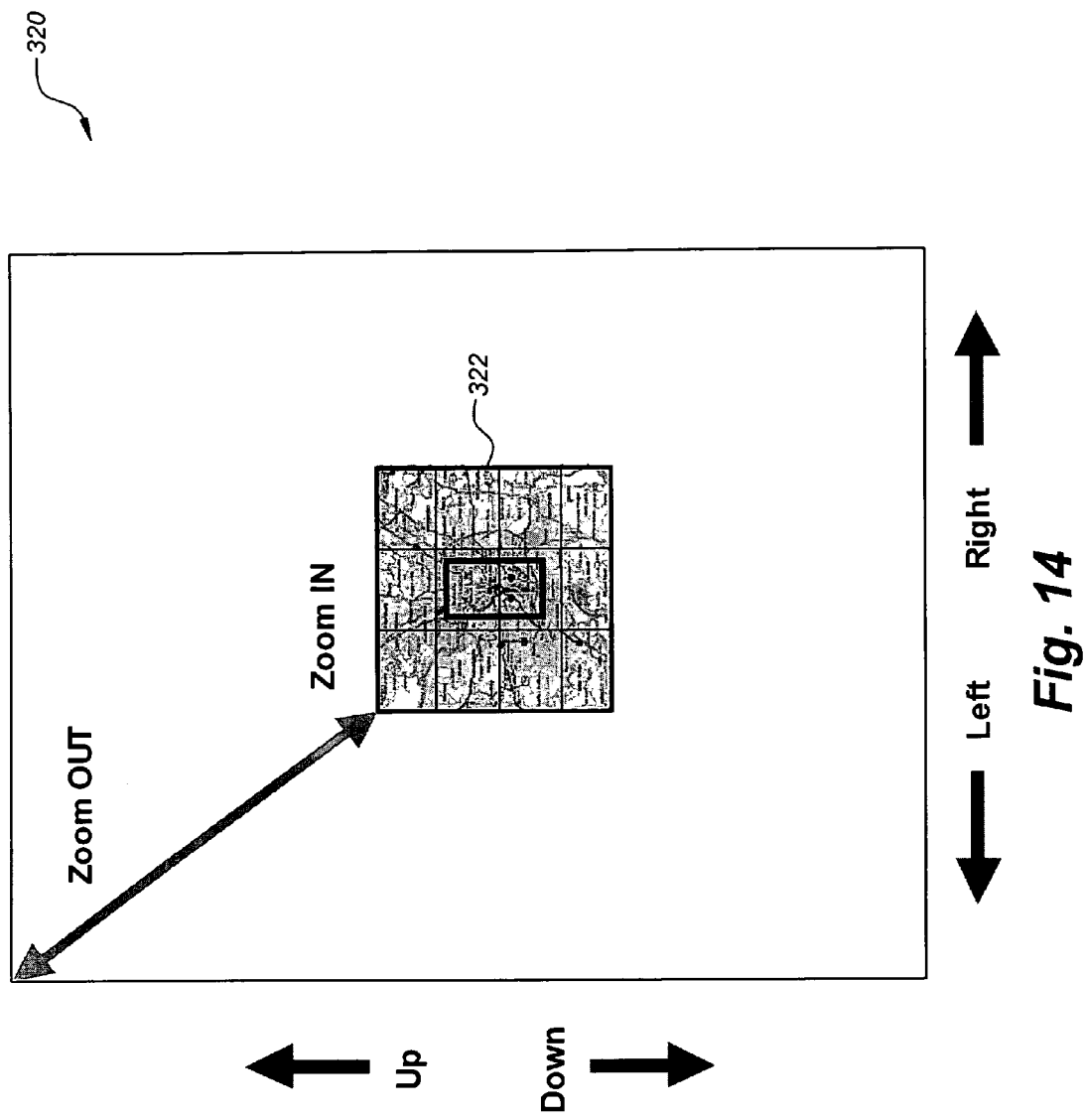
FIG. 14 is a functional view of a zoom in process on a map image on a display of an active keyboard system according to the present invention.
Figure 15:
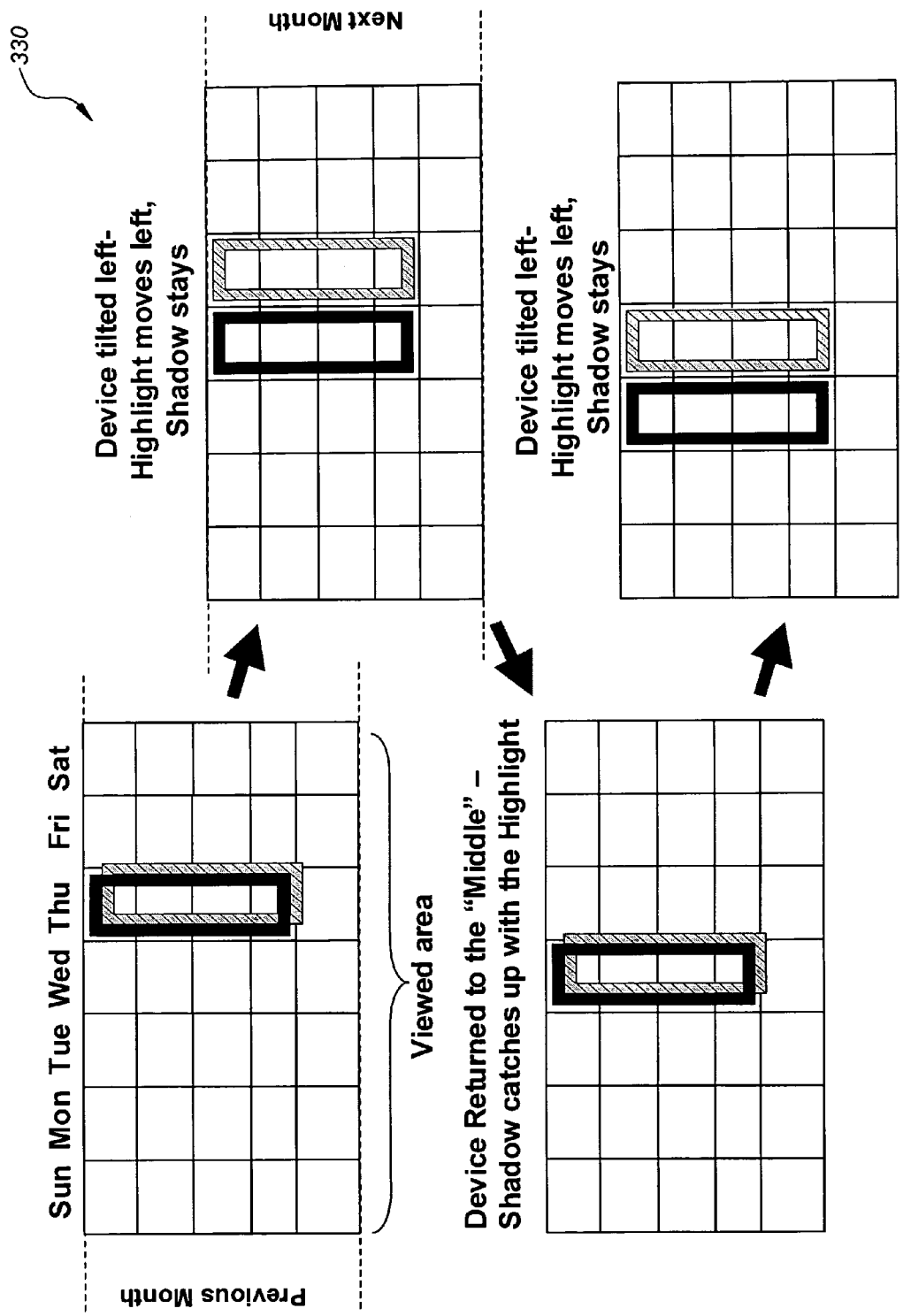
FIG. 15 is functional view of a step implementation of a calendar on a display of an active keyboard system according to the present invention.

Step motion movement may be used to move the selection pointer over any image, such as a map image as illustrated as 320 in FIGS. 13 and 14. In this example, the viewed image is divided into a number of squares according to the desired zoom level of the map image (e.g., 1:1→3×4; 1:2→6×8; 1:10→30×40, etc.). The desired viewed area is selected through the use of up and down commands, and left and right commands. Step motion movement may be used with a calendar as illustrated as 330 in FIG. 15. For example, the calendar configuration is done for the active keyboard system in landscape mode. By tilting the active keyboard system to the left, the selection pointer moves one column to the left and a shadow remains. The shadow subsequently catches up to the selection pointer when the device is tilted back, and the process can be repeated.

Figure 16:
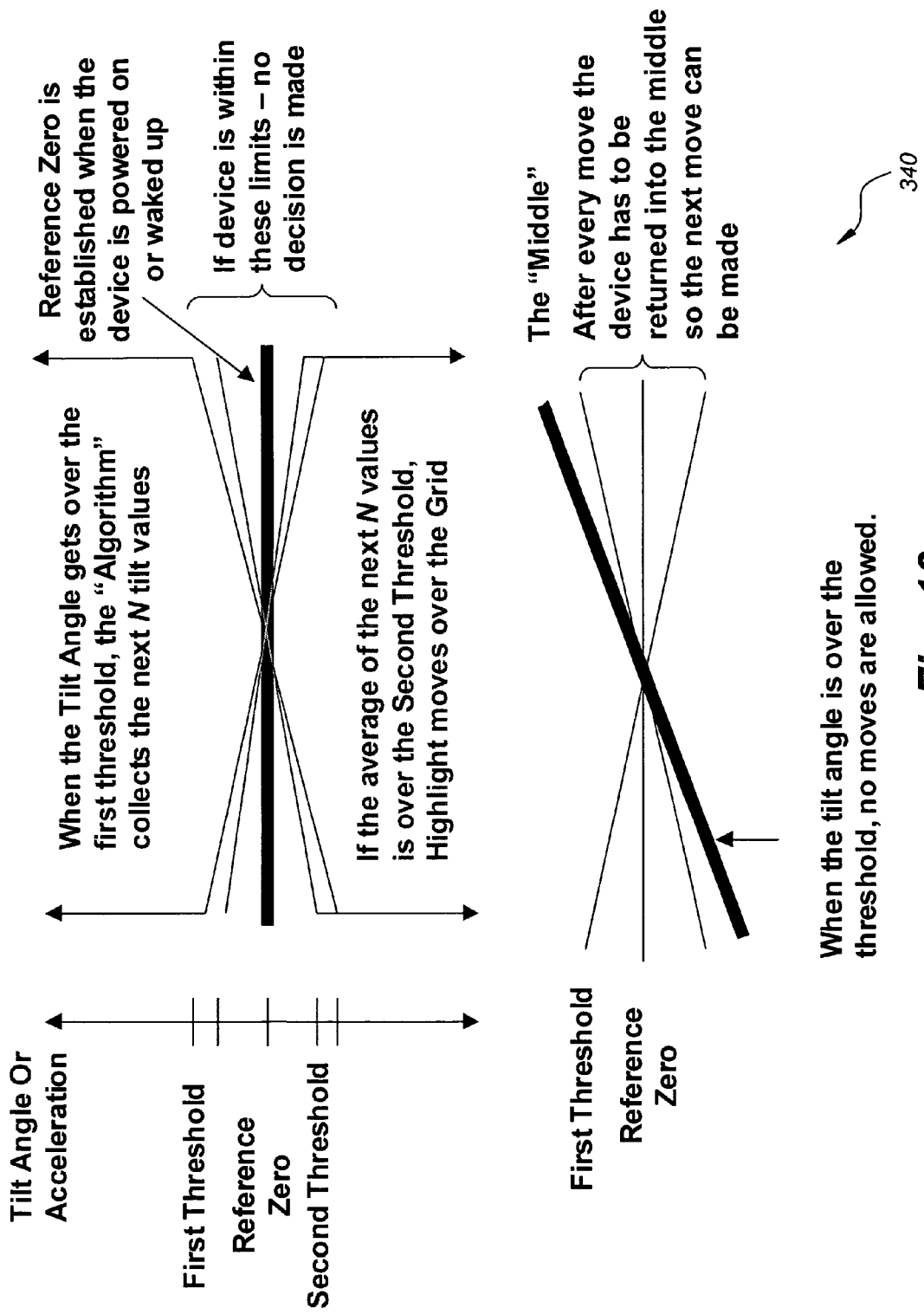
FIG. 16 is a functional diagram of step motion of an active keyboard system according to the present invention.
Figure 17:
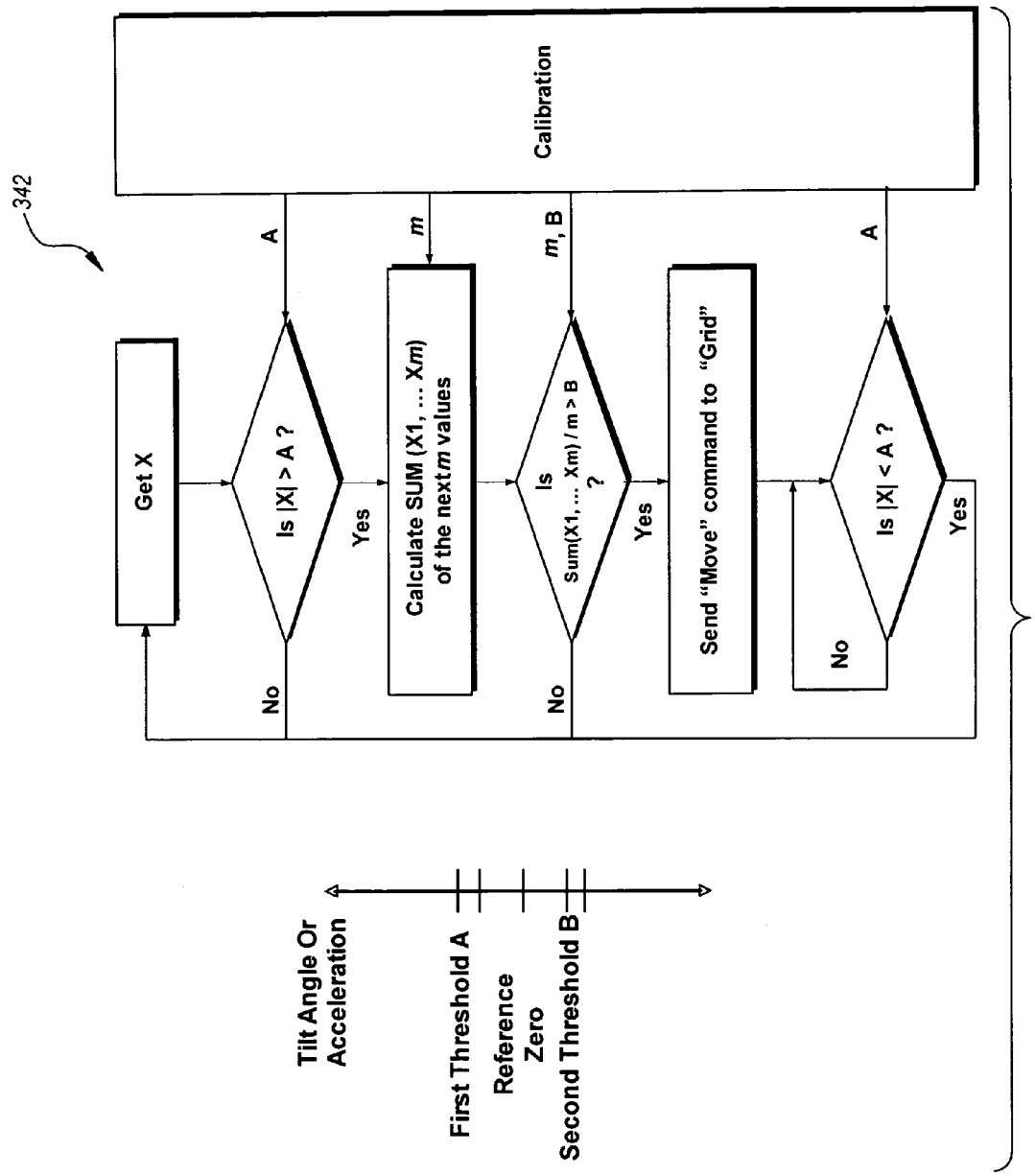
FIG. 17 is a flow chart of step motion of an active keyboard system according to the present invention.

As described above, the active keyboard system software includes step motion code, sliding zero code, adaptive threshold code, and step or scroll resolution code. The step motion code is functionally illustrated with images 340 shown in FIG. 16 and with the flow diagram 342 shown in FIG. 17. A reference zero is established when the system is powered on or awakened. During use, when the actual tilt (acceleration) of the active keyboard system has a value that is greater than reference zero and lower than a predetermined first threshold, no decision is made regarding movement of the selection pointer and the selection pointer remains in position.

A tilt is determined based on periodic movement sensor input over predetermined time intervals (e.g., fractions of a second). When the tilt value exceeds the first threshold tilt value and the average of the next 'n' tilt values is over the second threshold tilt value, the step motion code causes the selection pointer to move over the viewed image in the direction corresponding to the direction of the tilt. As long as the tilt angle remains over the first threshold tilt value, no further movement of the selection pointer is allowed. The user has to return the device into a position with a tilt value below the first threshold in order to be allowed to do the next "step".

The step motion code may also be configured to effect a scroll or continuous motion of the selection pointer, and will be referred to herein as 'rock-n-scroll' motion. The rock-n-scroll motion operates when a special key or timer is activated, and/or an application specific step or scroll flag is set, and causes continuous motion or multiple steps to occur per recognized tilt.

Figure 18:
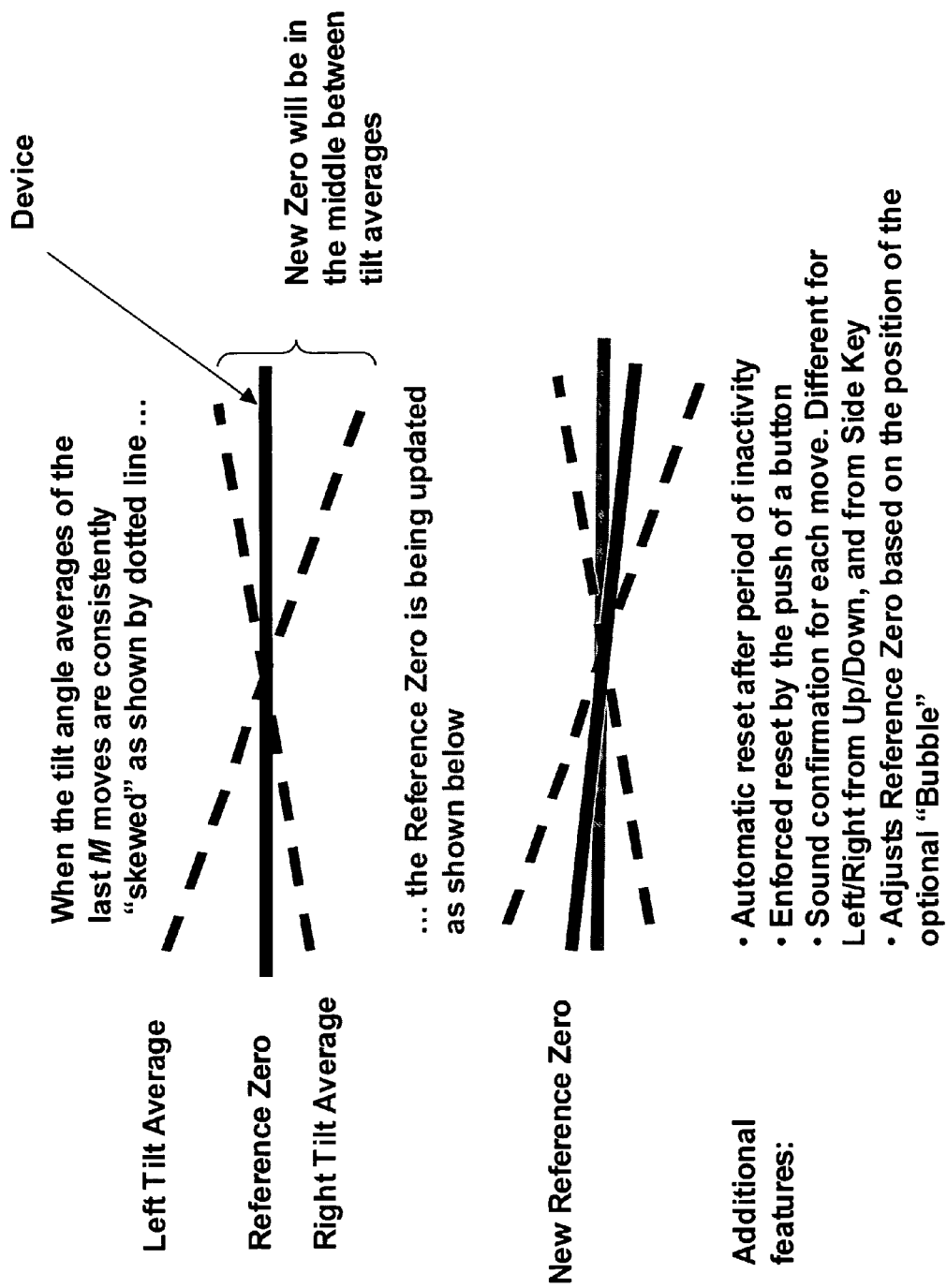
FIG. 18 is a functional diagram of sliding zero code of active keyboard system software according to the present invention.

The sliding zero code is functionally illustrated in FIG. 18. When tilt angle value averages of a predetermined number of moves 'm' are consistently skewed as shown by left and right tilt averages, a new reference zero is updated to correspond to the middle tilt value between the left and right tilt value averages. The reference zero may be automatically reset after a period of inactivity, an enforced reset may be effected by depressing a button. A sound confirmation may be emitted for each move and may be different for left/right moves, up/down moves, and from a side key. In some cases selections may be preempted by a sound announcement. The reference zero may also be adjusted based on the position of an optional 'bubble' (see 392 in FIG. 20).

Figure 19:
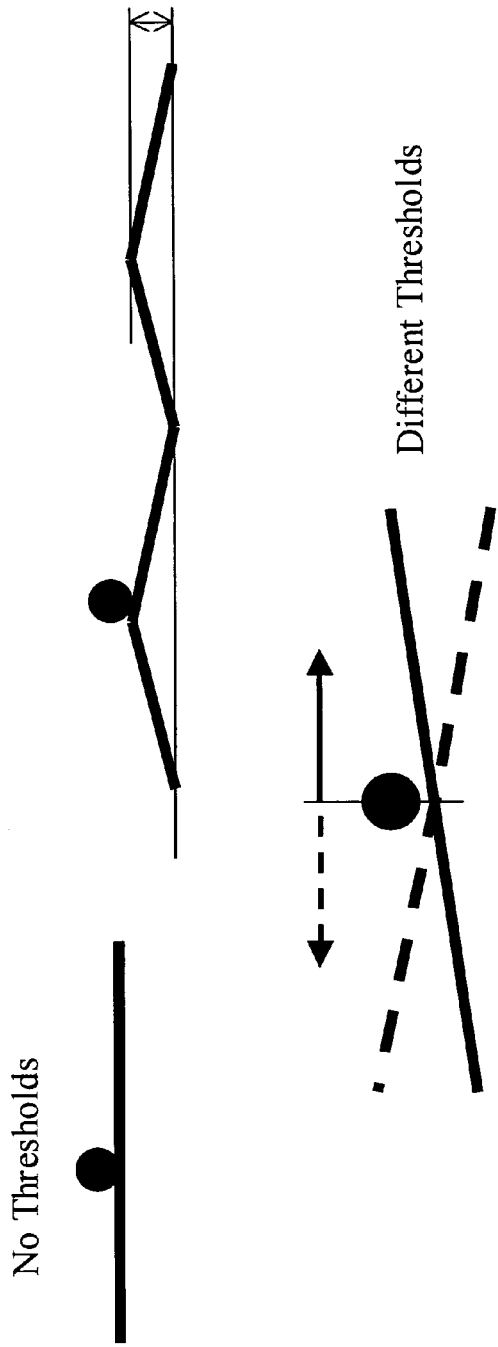
FIG. 19 is a functional diagram of adaptive threshold code of active keyboard system software according to the present invention.

The adaptive threshold code is functionally illustrated in FIG. 19. The adaptive threshold code may be effected when the user is using the backspace too often, is making too many jumps to get from one grid cell to another, etc. When such activity occurs the first and second thresholds may be lowered or increased, and different thresholds may be effected to move back and forth.

Figure 20:
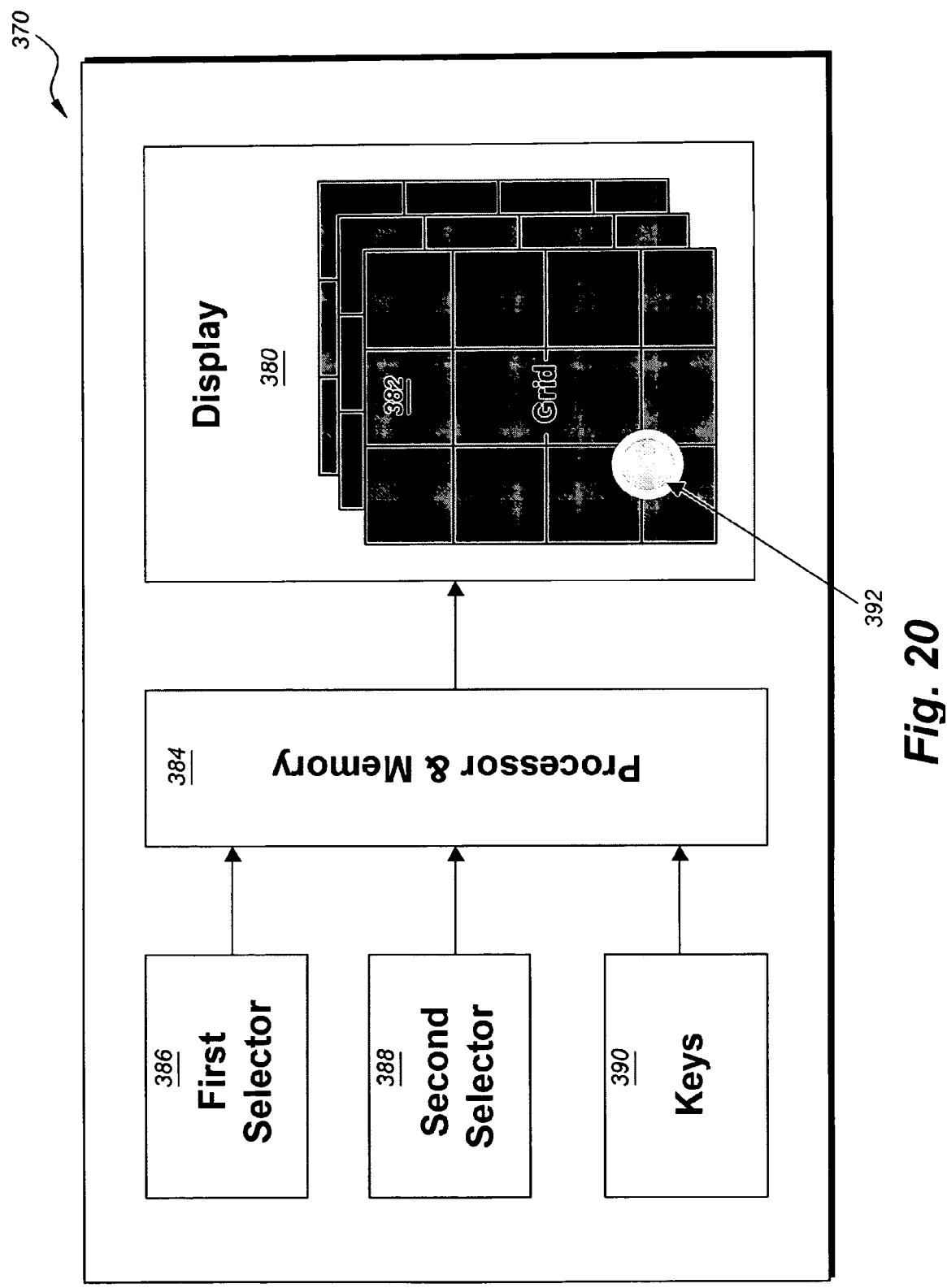
FIG. 20 is a functional diagram illustrating a virtual bubble of an active keyboard system according to the present invention.

The active keyboard system 370 shown in FIG. 20 includes a display 380 with a grid 382, a processor and memory 384, a first selector 386, a second selector 388, keys 390, and illustrates the use of an optional virtual bubble 392. The display 380 can be external (e.g. in remote controls). The bubble 392 shows the position of a pointer image and is a part of an application programming interface (API) for other applications.

Figure 21:
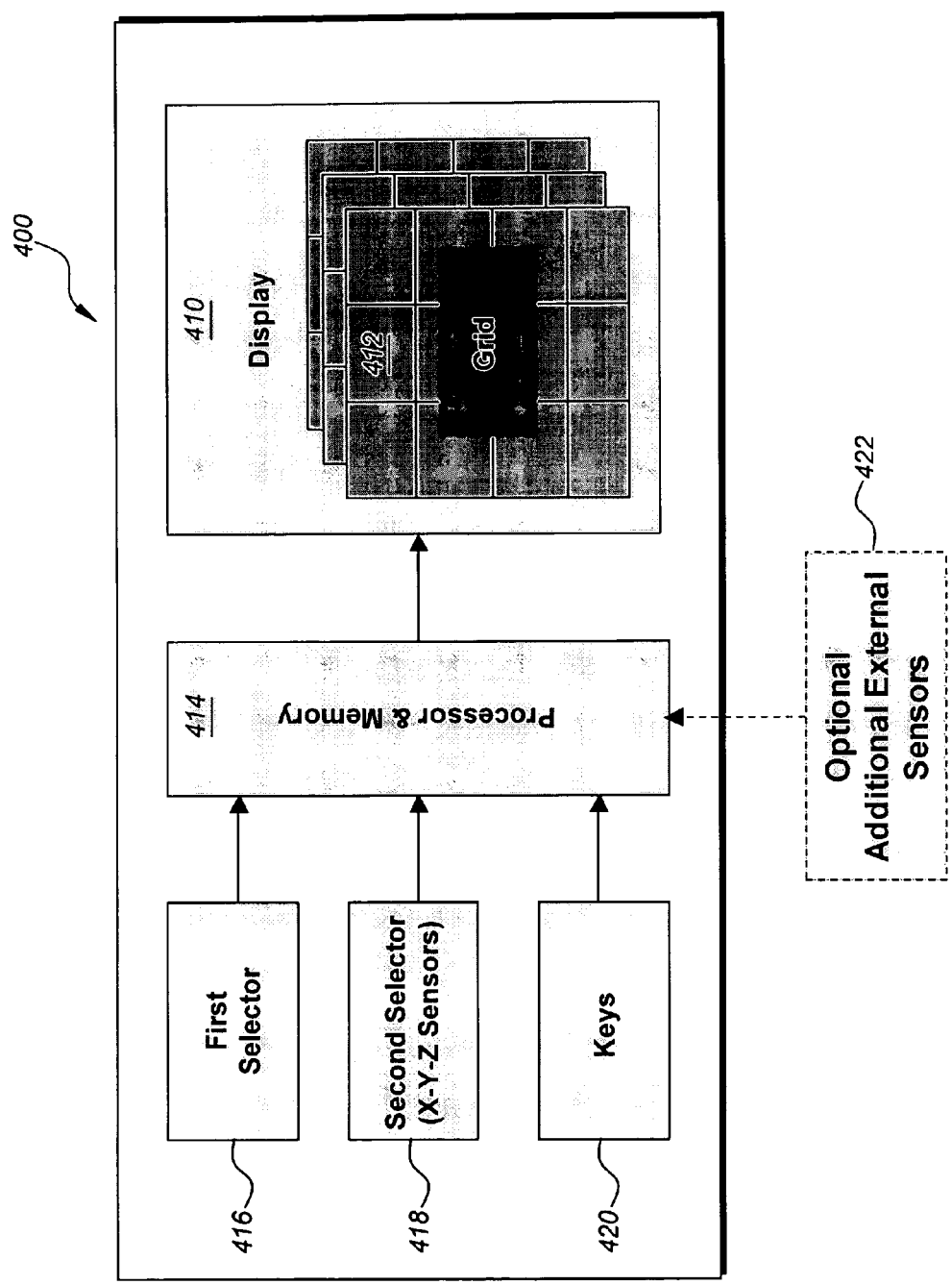
FIG. 21 is an active keyboard system with optional external sensors according to the present invention.
Figure 22:
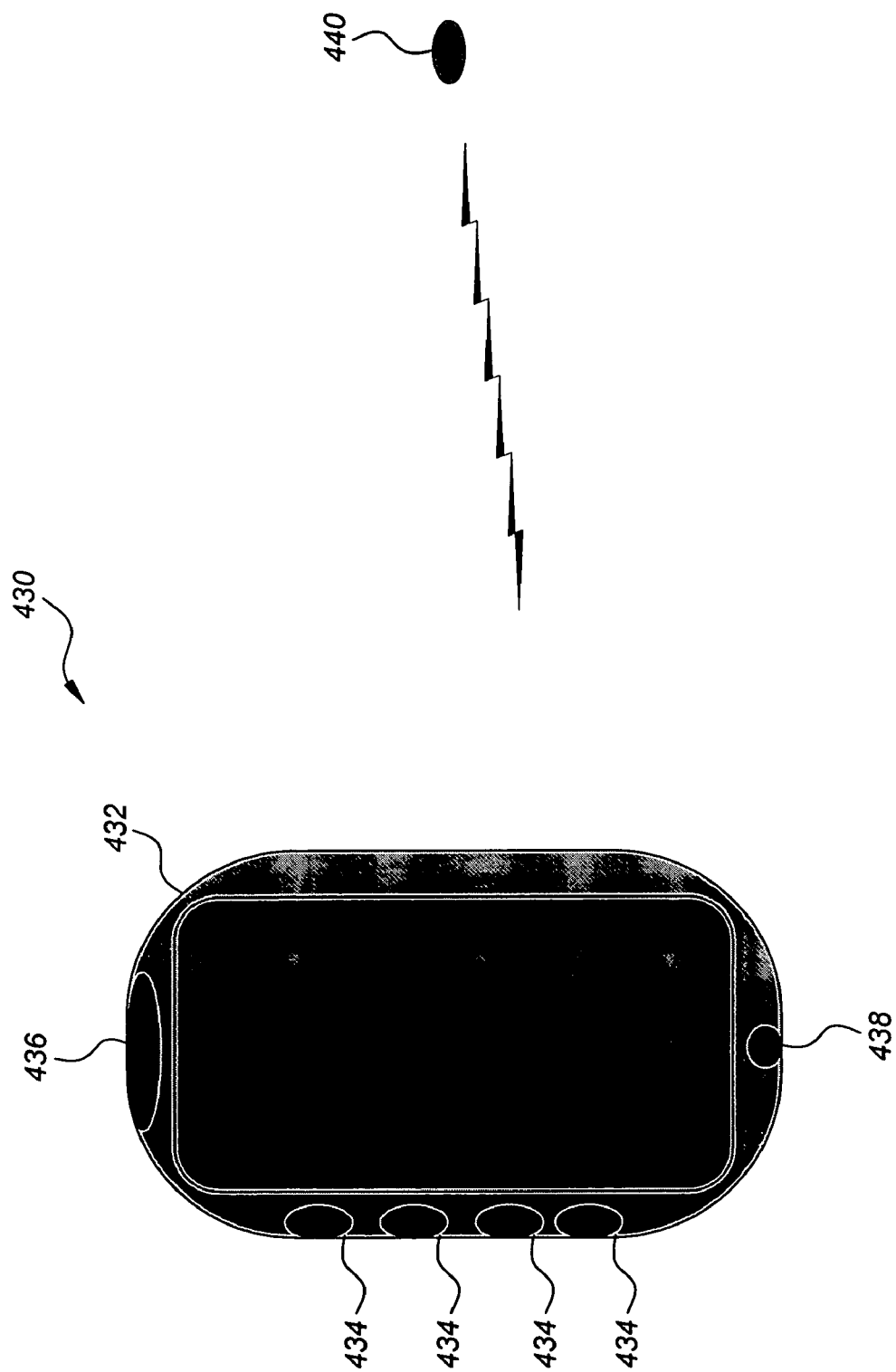
FIG. 22 is an active keyboard system with an external motion compensator according to the present invention.

The active keyboard system 400 shown in FIG. 21 includes a display 410 with a grid 412, a processor and memory 414, a first selector 416, a second selector (one or more movement sensors) 418, keys 420, and illustrates the use of an optional additional sensors 422. The display 410 can be external (e.g. in remote controls). The additional external sensors 422 can be utilized to determine the true user input as a differential signal between internal and external sensors. For example, the external sensors 422 may be located in a vehicle carrying the user and the active keyboard system 400. FIG. 22 illustrates a handheld active keyboard system 430 configured for use with external sensor(s) 440 over a wireless communication link. The system 430 includes an ergonomic housing 432, keys 434, a selector 436, and an internal sensor(s) 438.

Figure 23:
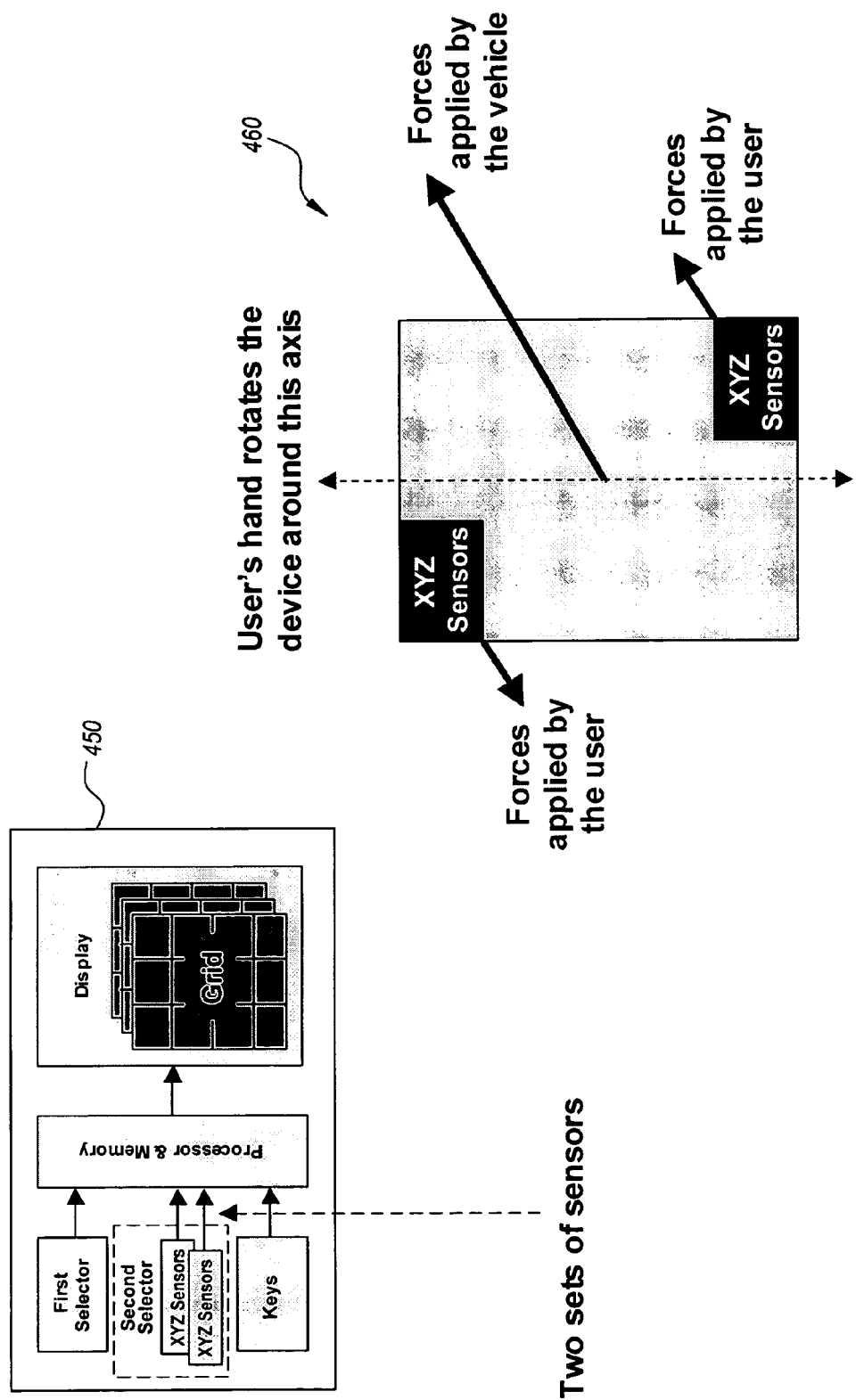
FIG. 23 is a functional diagram of an active keyboard system with two external sensors according to the present invention.
Figure 24:
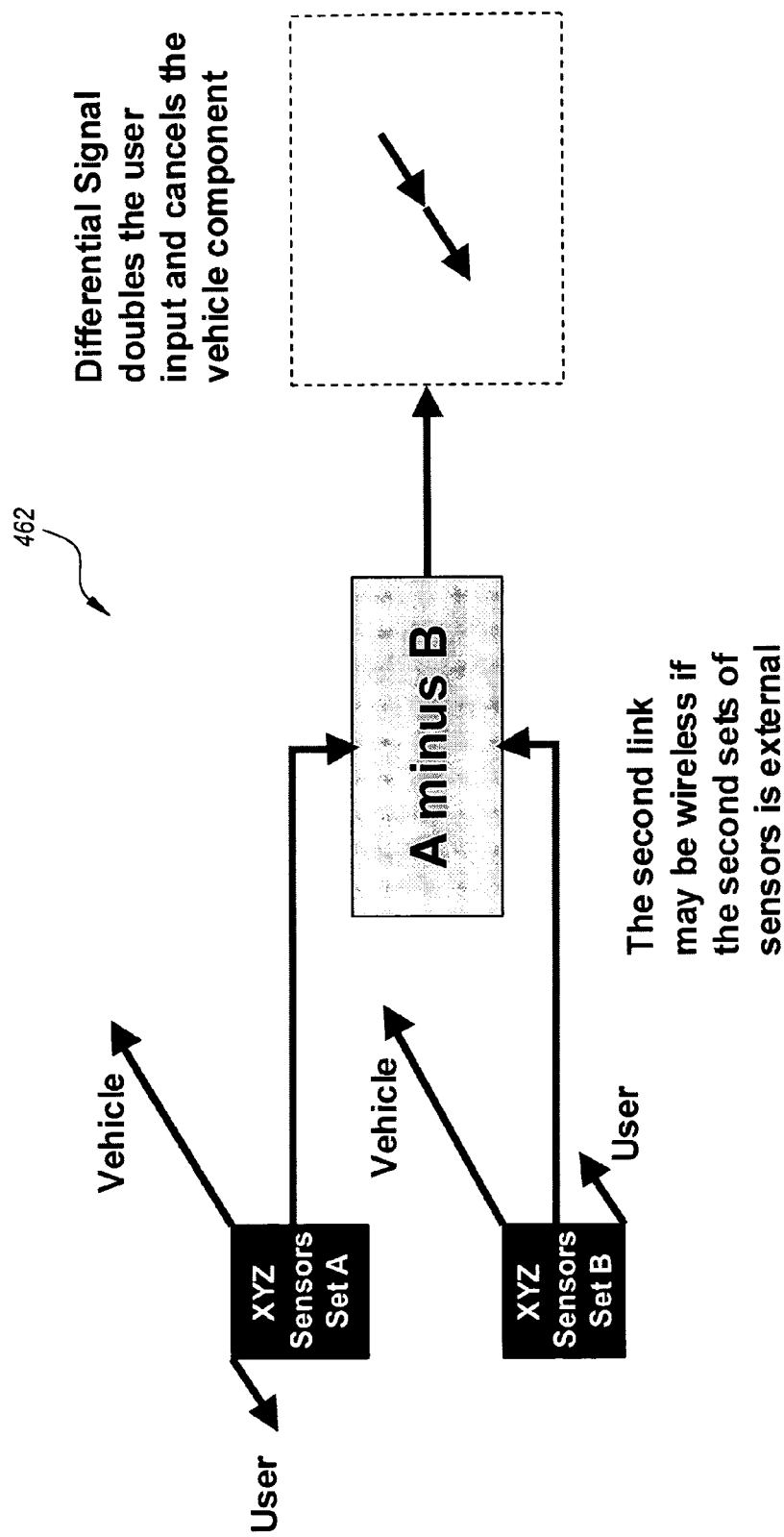
FIG. 24 is a functional diagram of circuitry for use with an active keyboard system according to the present invention.

FIG. 23 illustrates an active keyboard system 450 being carried by a user in a vehicle. The system 450 has two sets of sensors that may be both internal to the system 450 or one internal and one external to the system 450. External sensors may be communicatively interconnected wirelessly and/or non-wirelessly with the system 450. The image 460 illustrates how movement of the system 450 is determined. For example, when the user's hand rotates the system 450 about an axis a differential signal indicating the true tilt value of the system 450 is determined based on the difference between the forces applied by the user and the forces applied to the system 450 by the vehicle. Referring to the image 462 in FIG. 24, the differential signal between the two sets of sensors, A minus B, can double the user input and cancel the vehicle force component.

Figure 25:
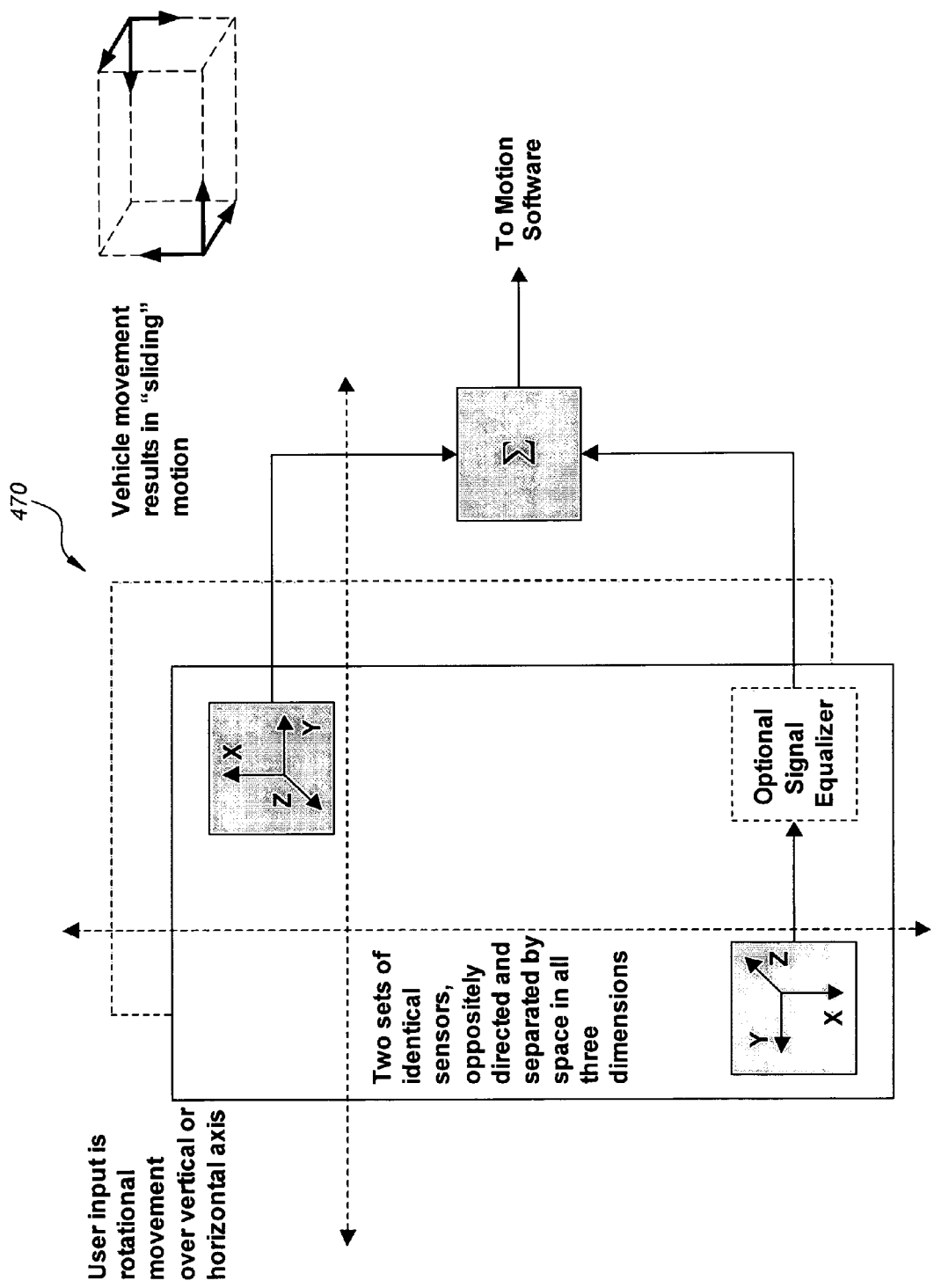
FIG. 25 is a functional diagram illustrating noise cancellation code of active keyboard system software utilizing two oppositely directed sensors according to the present invention.

As illustrated in FIG. 25, external motion filtering can be effected when an active keyboard system 470 is equipped with two sets of sensors. User input may be rotational movement over the pitch, roll, and/or yaw axes, and signals received by two sets of identical sensors, properly aligned and separated by space in all three dimensions may be processed by motion filter software. The vehicle movement results in a sliding motion and can be easily filtered out. The system 470 may have an optional signal equalizer(s) to adjust for the normal dispersion of the movement sensor(s) parameters.

Figure 26C:
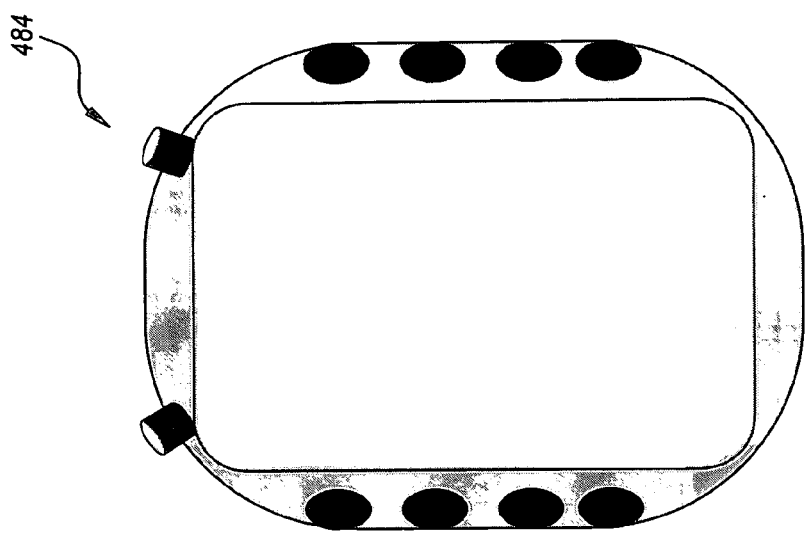
FIGS. 26A, 26B, and 26C are three examples of active keyboard systems according to the present invention.
Figure 26B:
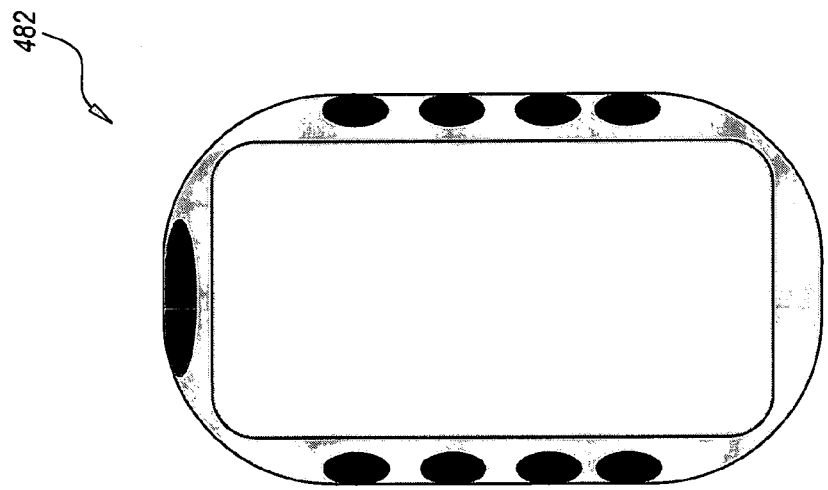
Figure 26A:
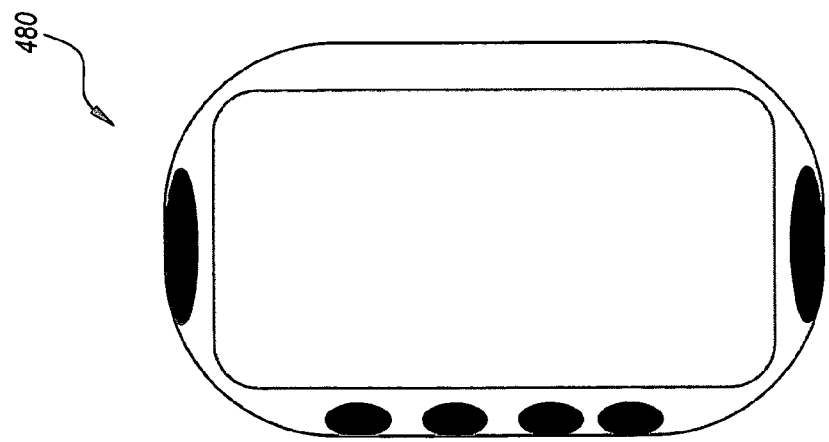

Handheld active keyboard systems may be configured for ambidexterity. A handheld active keyboard system 480 is shown in FIG. 26A and is configured as a PDA with keys or buttons on the left side of the PDA 480 and there are two rocker pad or joystick selectors on the top and bottom of the PDA 480 that enables ambidextrous use by right and left handed individuals by inverting the PDA 480 so the keys or buttons are on one side or the other. The PDA 482 shown in FIG. 26B includes a single rocker pad or joystick selector on the top of the PDA 482 and two sets of keys or buttons on the right or left sides of the PDA 482 that enables ambidextrous use of the PDA 482. The larger PDA 484 shown in FIG. 26C is configured for ambidextrous use by including sets of keys or buttons on the left and right sides of the PDA 484, as well as two joystick selectors on the upper left and upper right of the PDA 484.

Figure 27B:
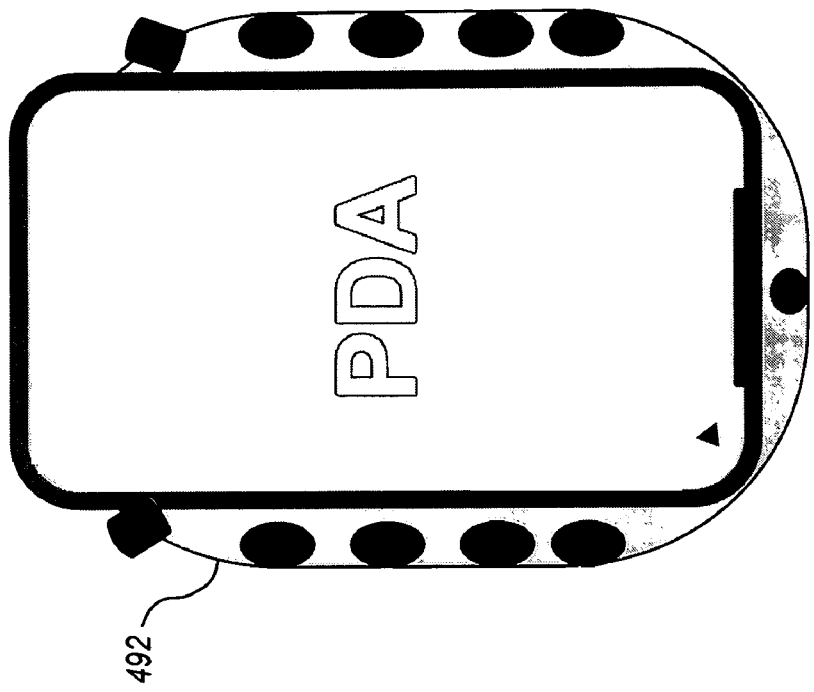
FIGS. 27A and 27B are two examples of sleeves for use with an active keyboard system according to the present invention.
Figure 27A:
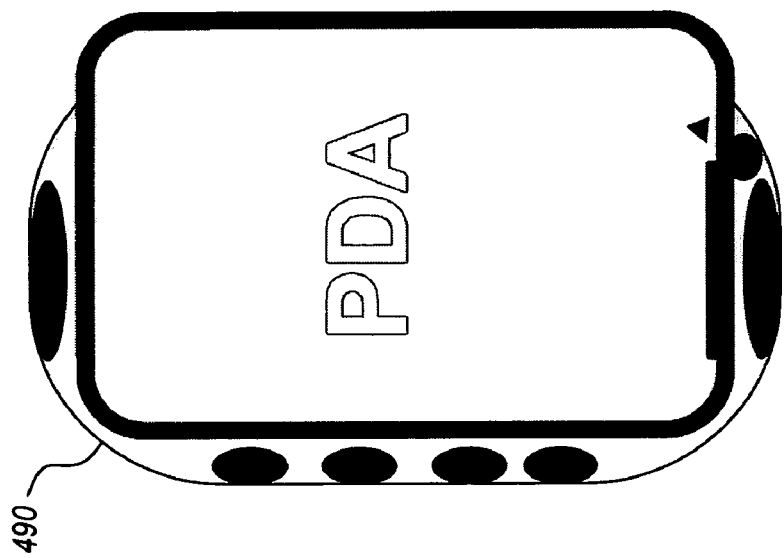

A small active keyboard system where some or all components of the system are configured as a sleeve 490 to operatively attach to and be used in combination with a handheld device in the form of a PDA is shown in FIG. 27A. The sleeve 490 is configured for ambidextrous use by including keys or buttons on the left side of the sleeve 490 and a rocker pad or joystick selector on the top and bottom of the sleeve 490 that enables ambidextrous use of the PDA by right and left handed individuals by inverting the sleeve 490 so the keys or buttons are on one side or the other. The sleeve 490 is a device in which a regular PDA can be placed, and includes some or all components of an active keyboard system according to the invention, such as selectors, keys, a microcontroller, etc.

A sleeve 492 with some or all components of an active keyboard system according to the invention, and configured to operatively attach to and be used in combination with a handheld device in the form of a larger PDA is shown in FIG. 27B, and is configured for ambidextrous use by including sets of keys or buttons on the left and right sides of the sleeve 492, as well as two joystick selectors on the upper left and upper right of the sleeve 490.

Figure 28:
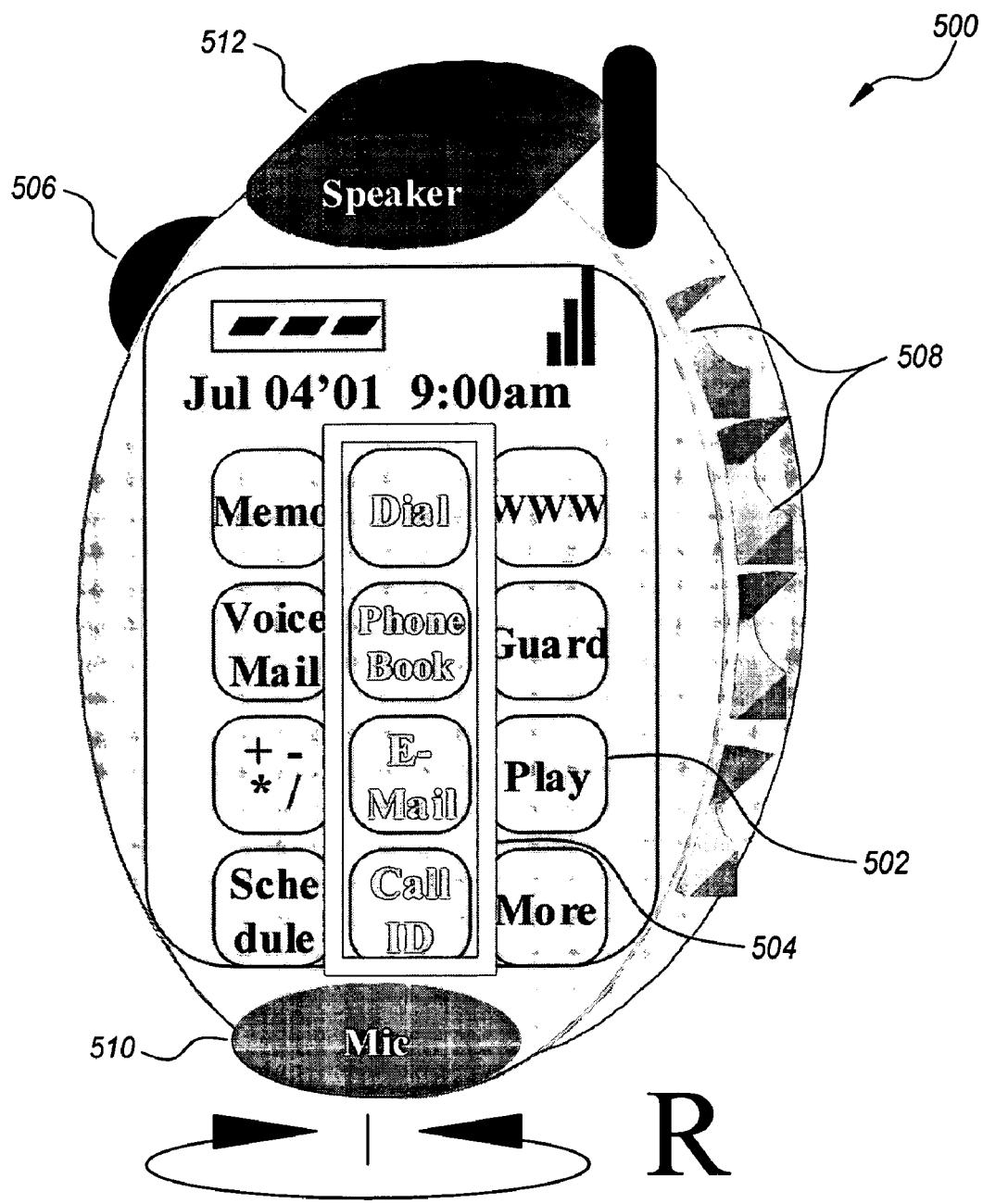
FIG. 28 is a display screen image for dialing with an active keyboard system according to the present invention.

A handheld active keyboard system 500 configured as a cell phone is shown in FIG. 28. The cell phone 500 includes an ergonomic housing with a display and a visual grid image showing multiple cells 502 and a selection pointer 504 surrounding one column of the grid image. The cell phone 500 also includes a selector 506, side buttons or keys 508, a microphone 510, and a speaker 512. The visual grid image shown in FIG. 28 represents a power-on screen that may be shown when the cell phone 500 is turned on or is activated. The power-on screen provides the ability of the user to have instant access to major functional modes including typing a memo, obtaining voice mail, using a calculator, reviewing/editing a schedule, dialing a number, using a phone book, sending/receiving e-mail, using caller ID, using the Internet, guarding use of the cell phone 500, etc. The selection pointer 504 is controlled by movement sensor(s).

Figure 29:
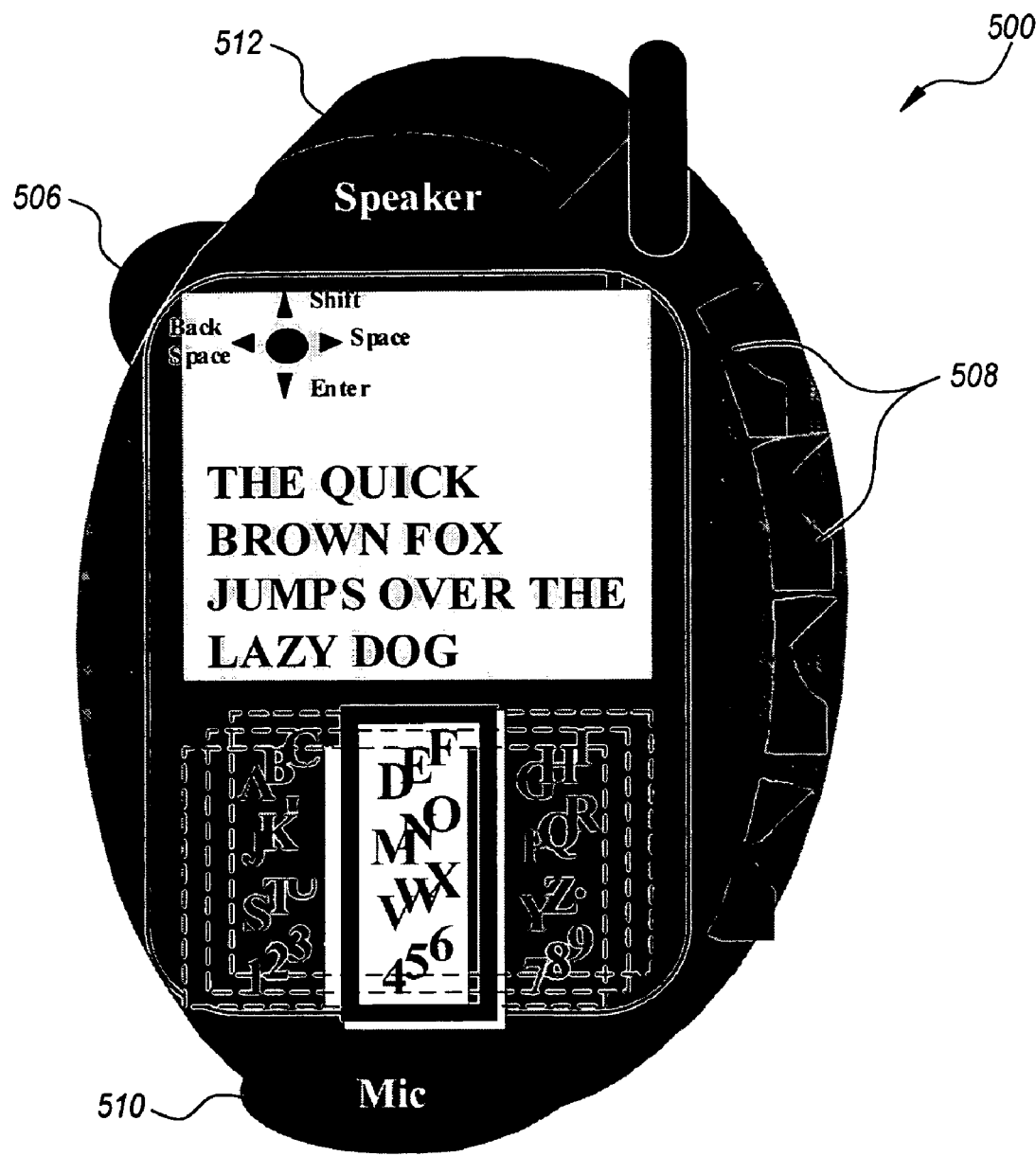
FIG. 29 is a display screen image for typing with an active keyboard system according to the present invention.
Figure 30:
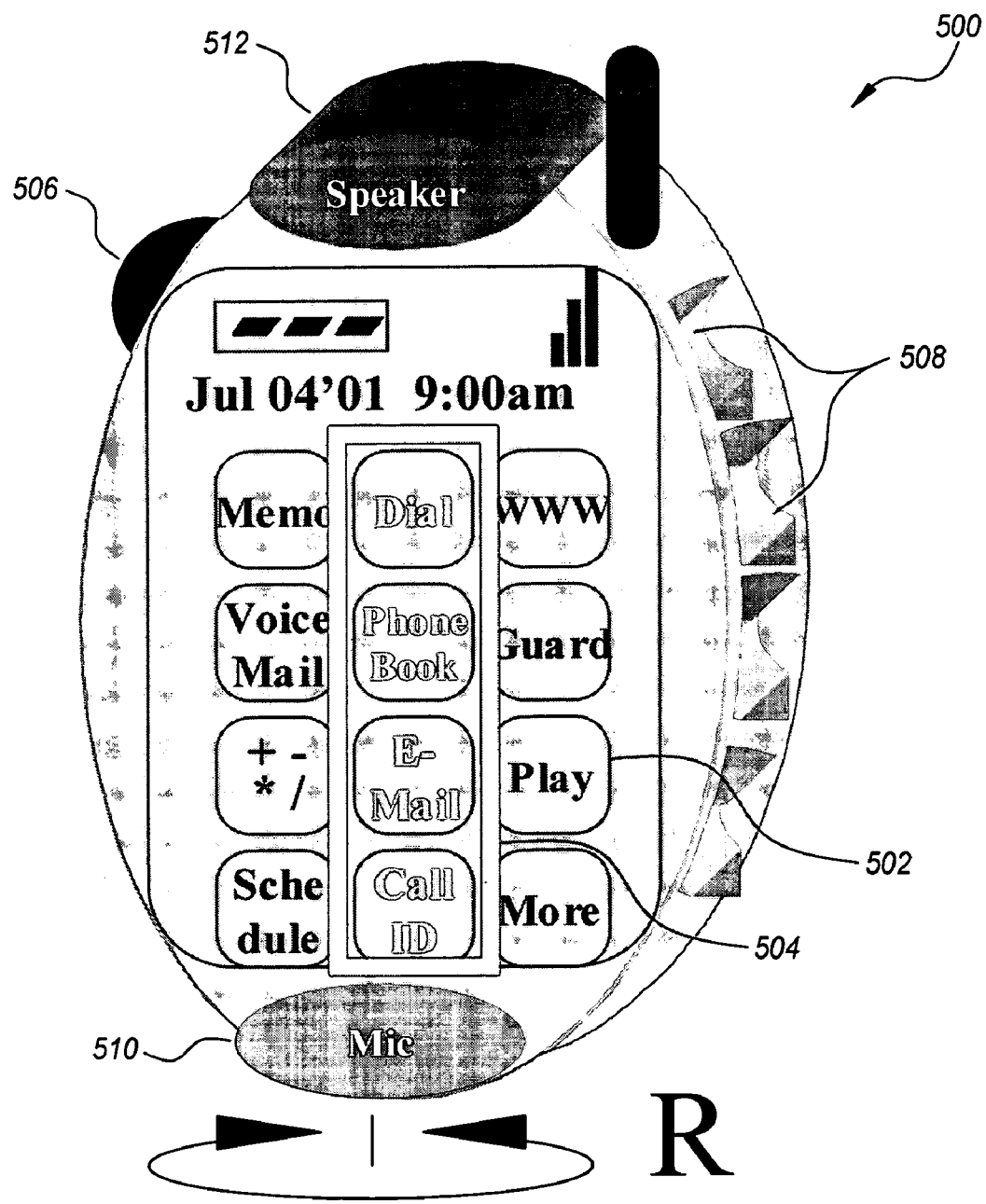
FIG. 30 is a functional diagram illustrating movement amongst grid pane layers on an active keyboard system according to the present invention.

FIG. 29 illustrates the cell phone 500 in text mode. The display is split to show the typed text and a key assignment grid. Only one hand is needed to type and the typing speed is much faster than multi-tapping. FIG. 30 illustrates how the left/right sensor moves the selection pointer 504 left and right, and how the up/down sensor switches between the panes in the image 530. Typing without the movement sensor(s) may also be effected using the side buttons 508 and/or a selector.

Figure 31:
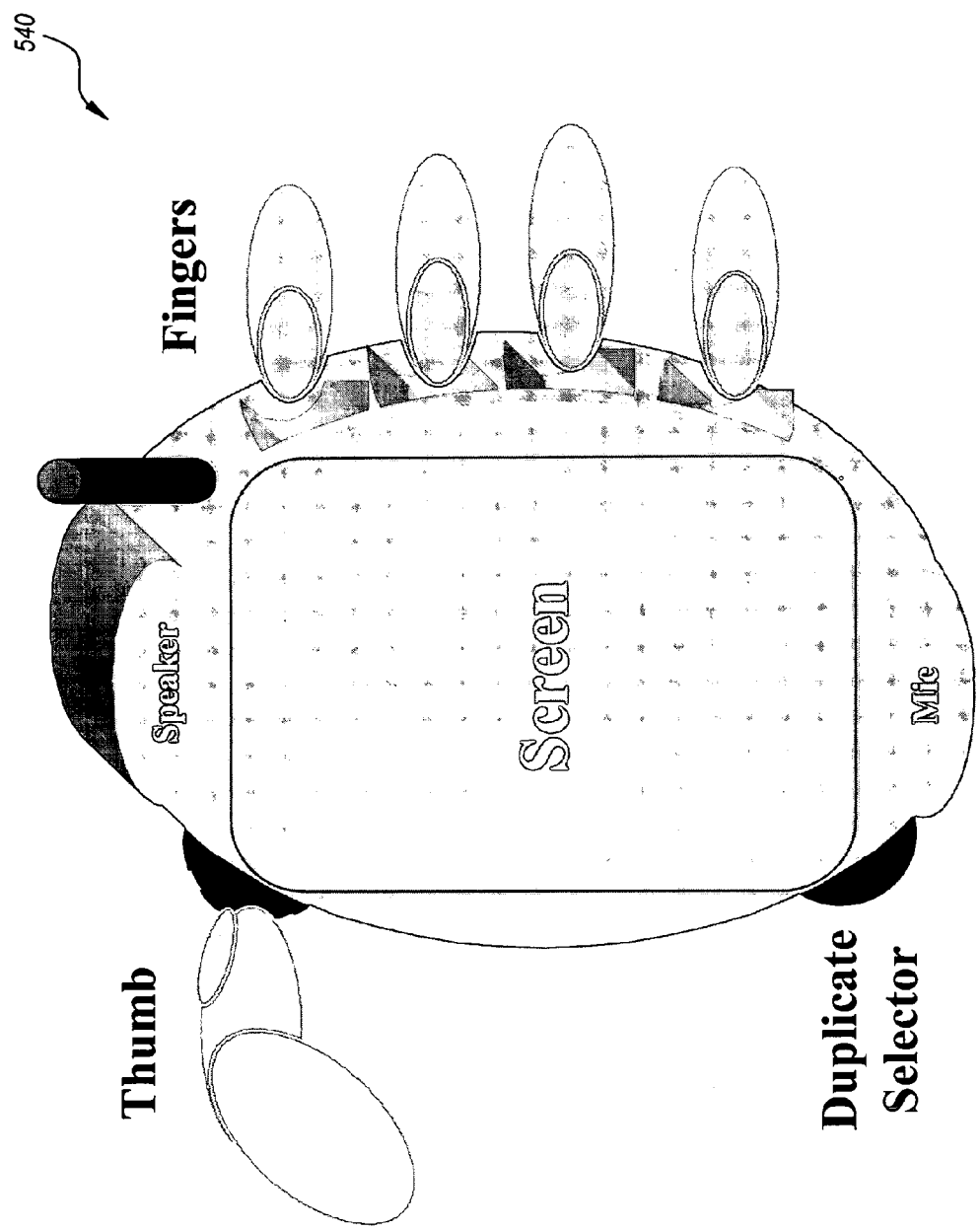
FIG. 31 is a functional illustration of the grip of an active keyboard system according to the present invention.
Figure 32:
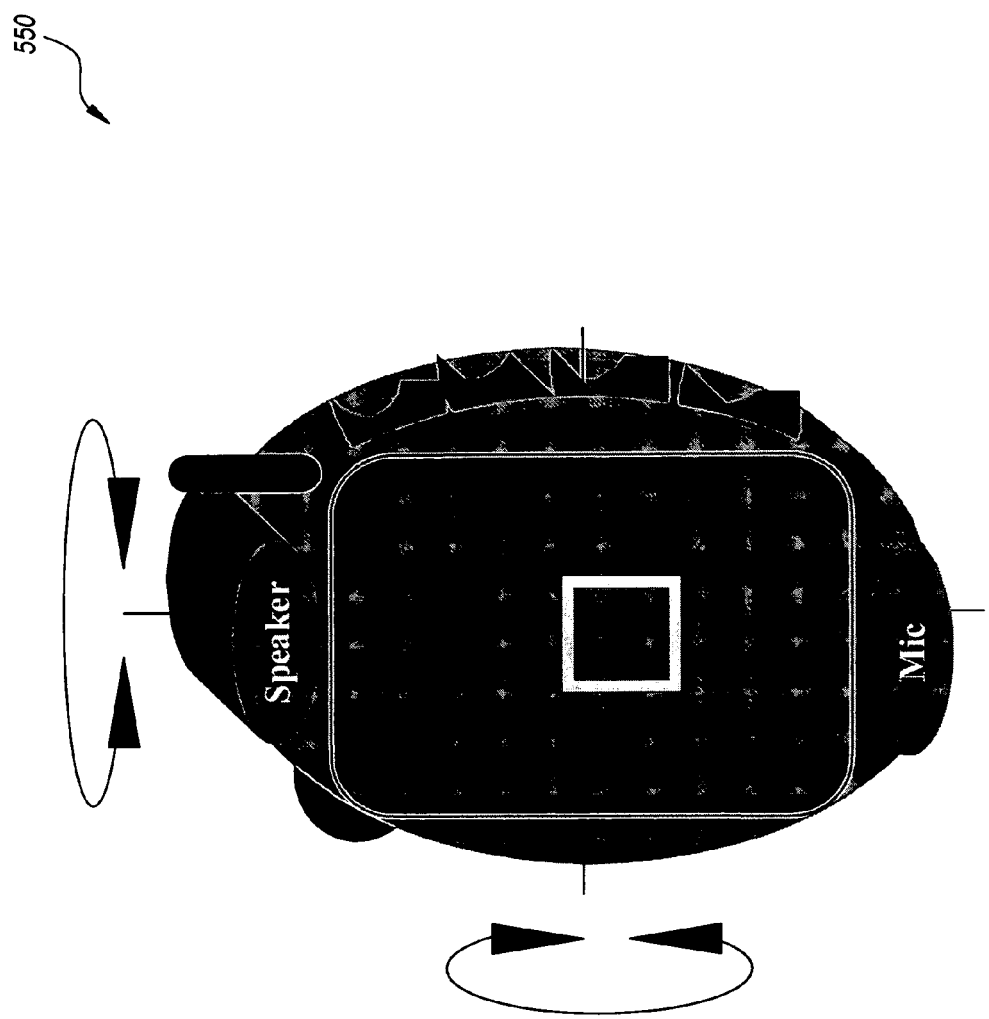
FIG. 32 is a functional illustration of an active keyboard system equipped with movement sensors according to the present invention.

As illustrated in FIG. 31, an active keyboard system 540 configured as a cell phone for left hand use may be configured for ambidextrous use by equipping the cell phone 540 with a duplicate selector so the cell phone 540 can be turned over for right hand use. The cell phone active keyboard system 550 in FIG. 32 has built in movement sensor(s) and can detect natural swinging and/or lateral/vertical hand moves. The sensors provided on the cell phone 550 may be configured to have one, two, or three orthogonal axes to allow detecting motion in all three dimensions.

Figure 33:
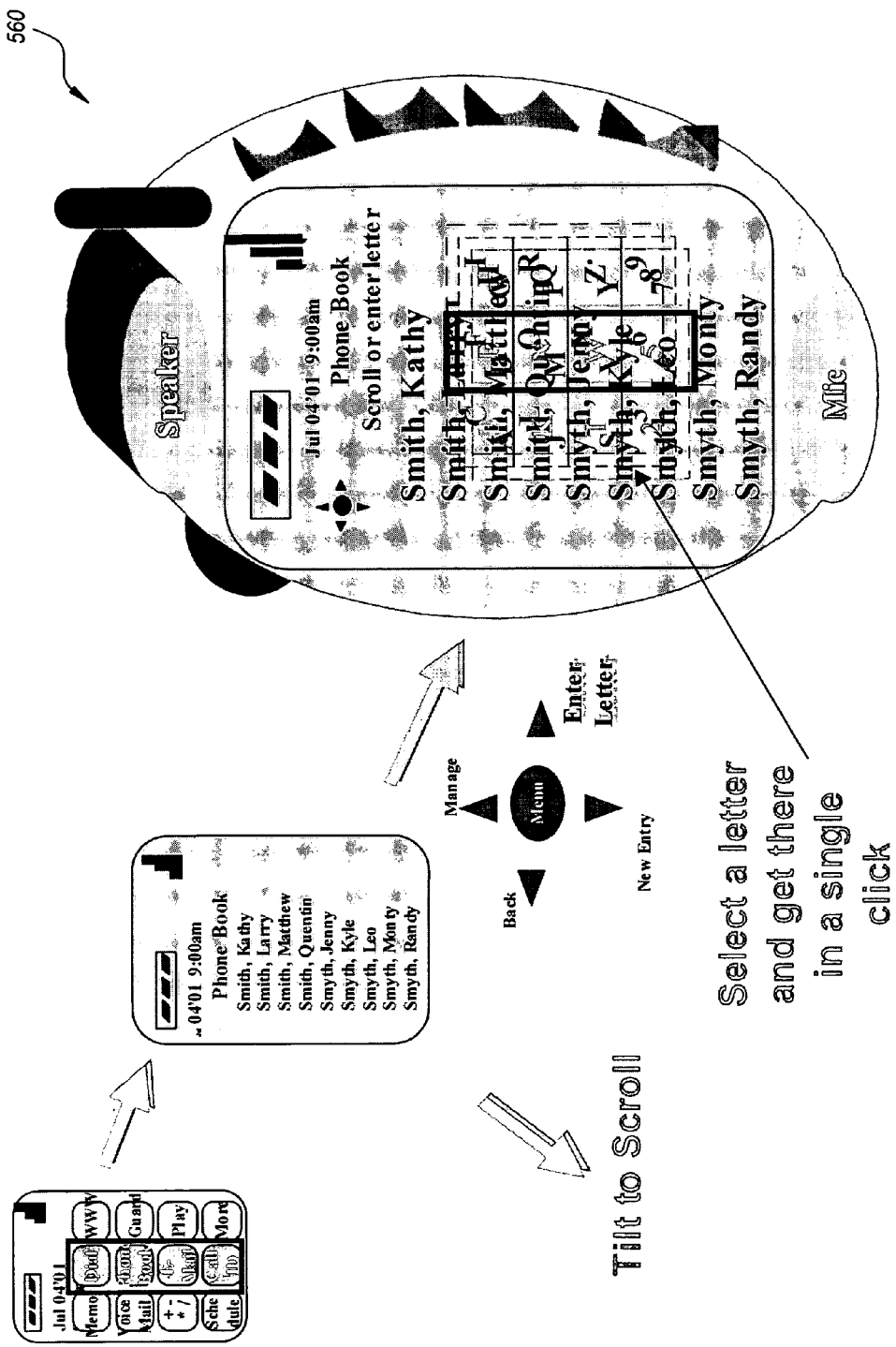
FIG. 33 is a functional diagram illustrating phone/address book features of an active keyboard system according to the present invention.
Figure 34:
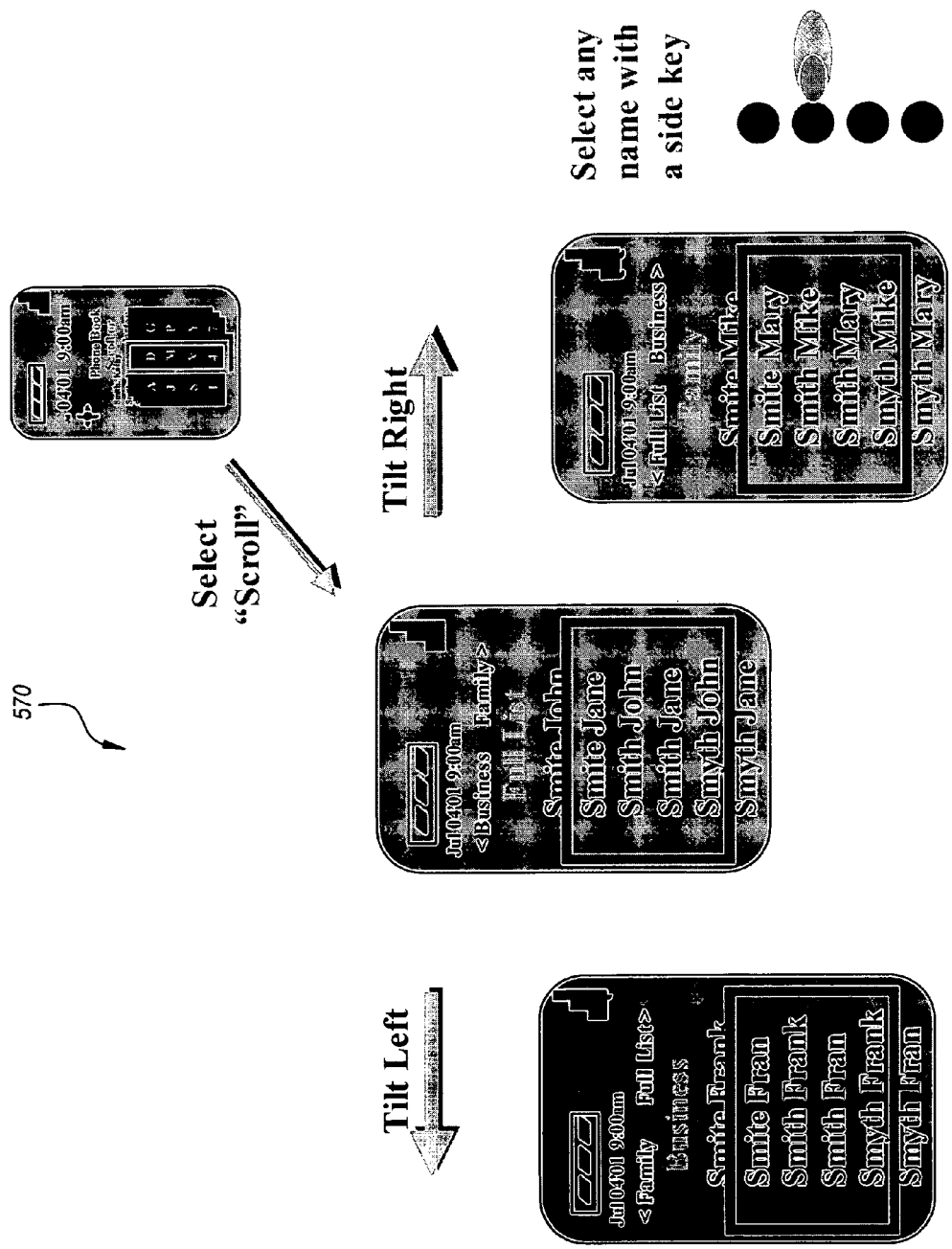
FIG. 34 is a functional diagram illustrating name selection phone/address book features of an active keyboard system according to the present invention.
Figure 35:
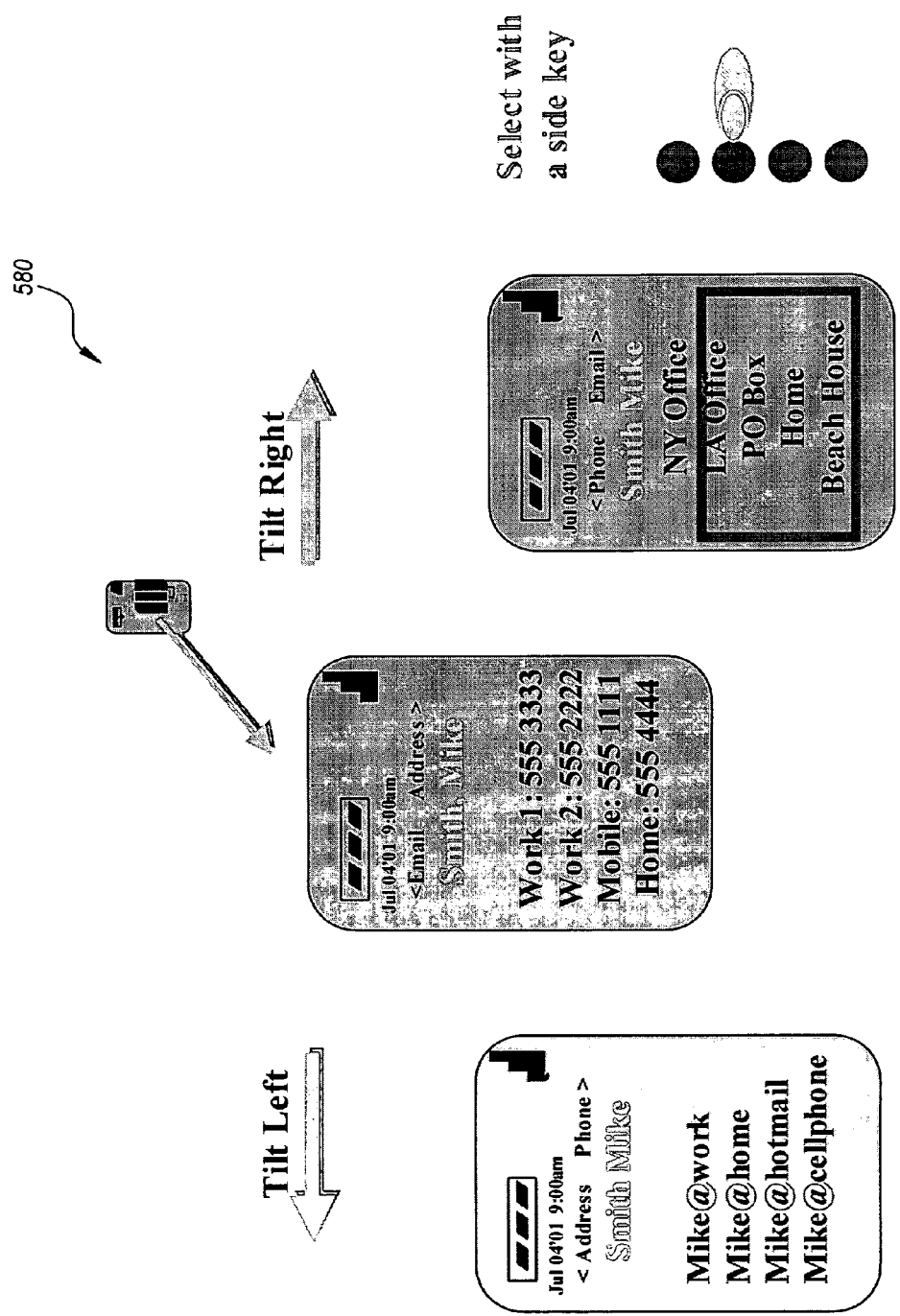
FIG. 35 is a functional diagram illustrating phone number email, and address selection phone/address book features of an active keyboard system according to the present invention.
Figure 36:
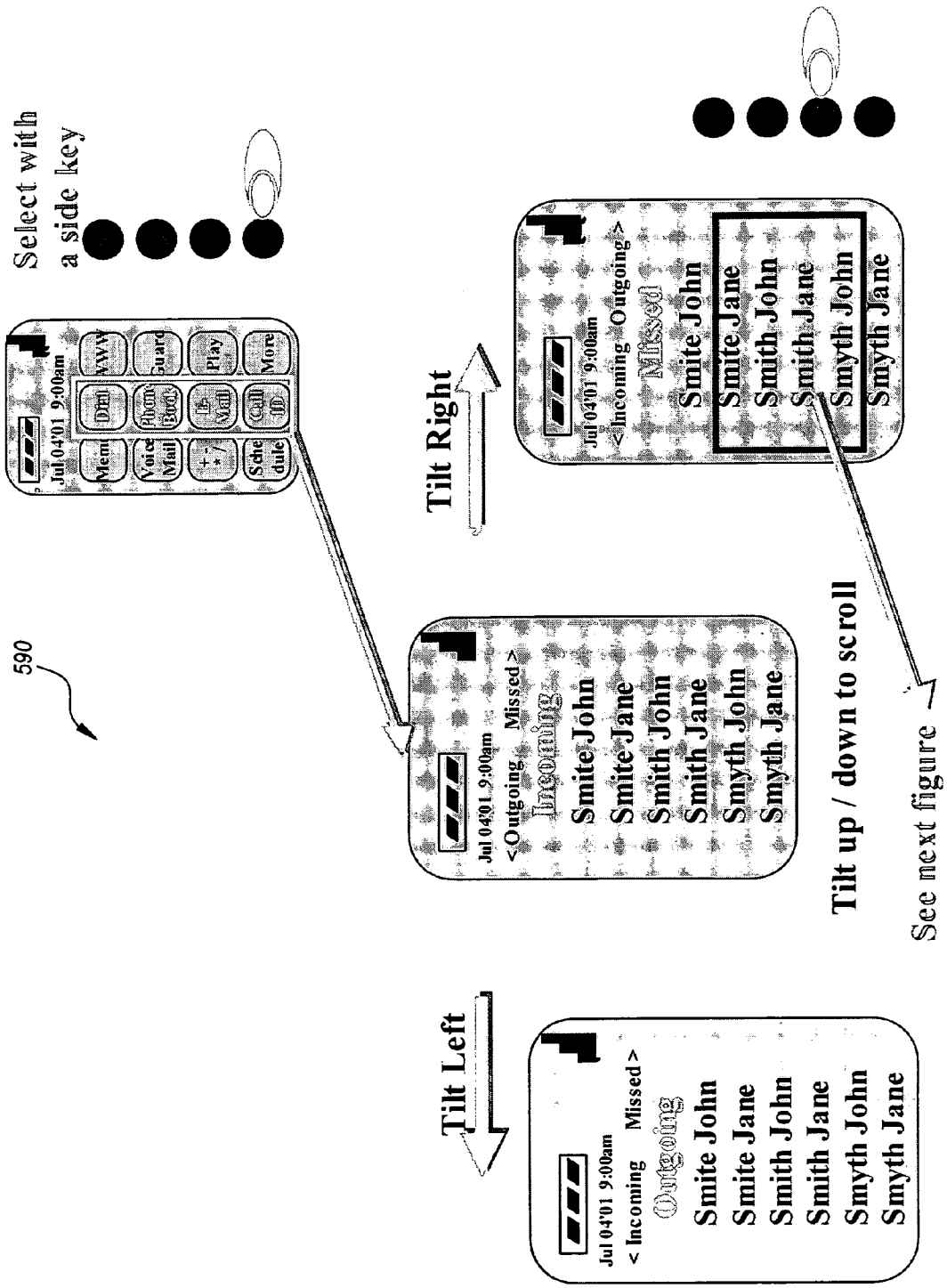
FIG. 36 is a functional diagram illustrating call history selection phone/address book features of an active keyboard system according to the present invention.
Figure 37:
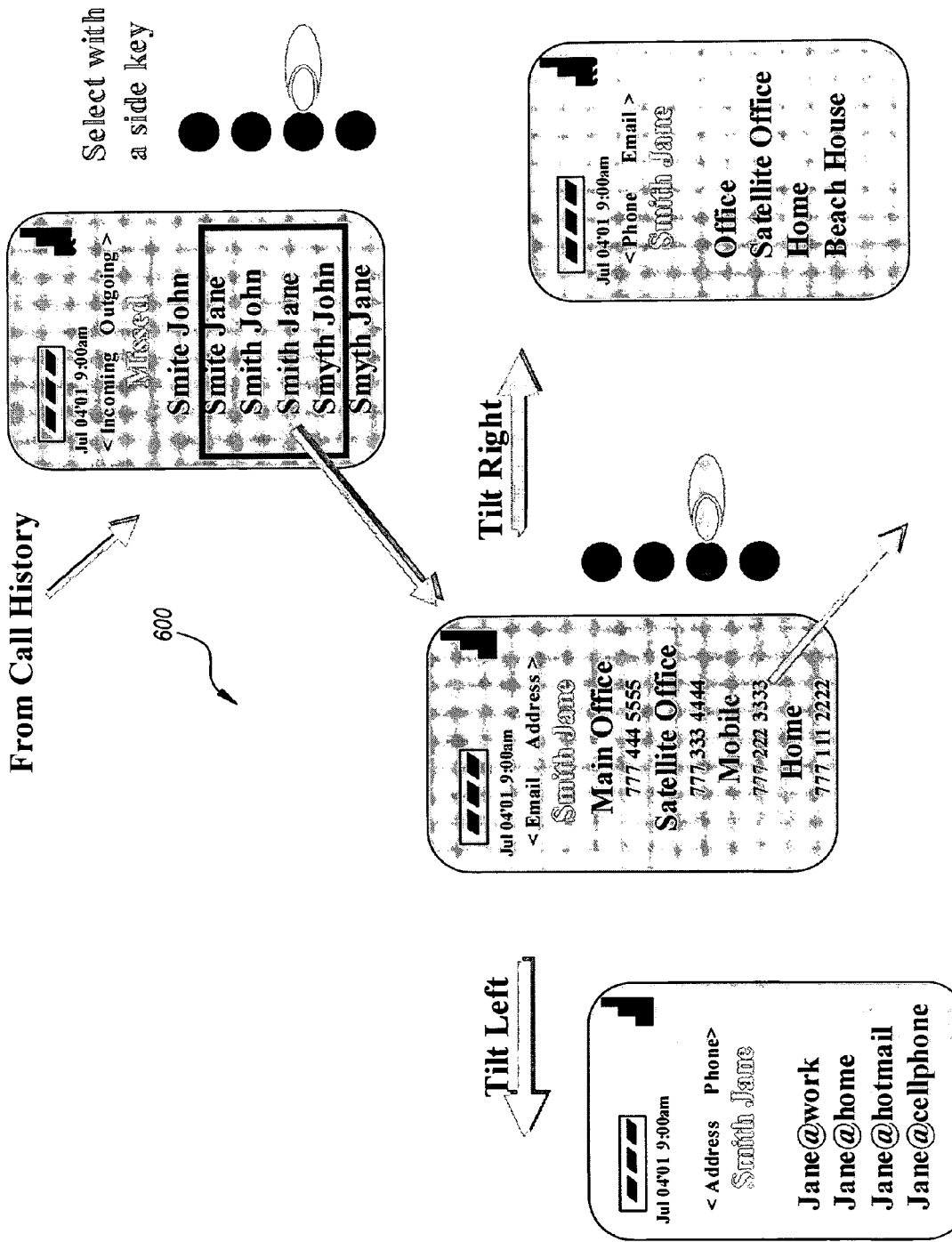
FIG. 37 is a functional diagram illustrating existing number call history selection phone/address book features of an active keyboard system according to the present invention.
Figure 38:
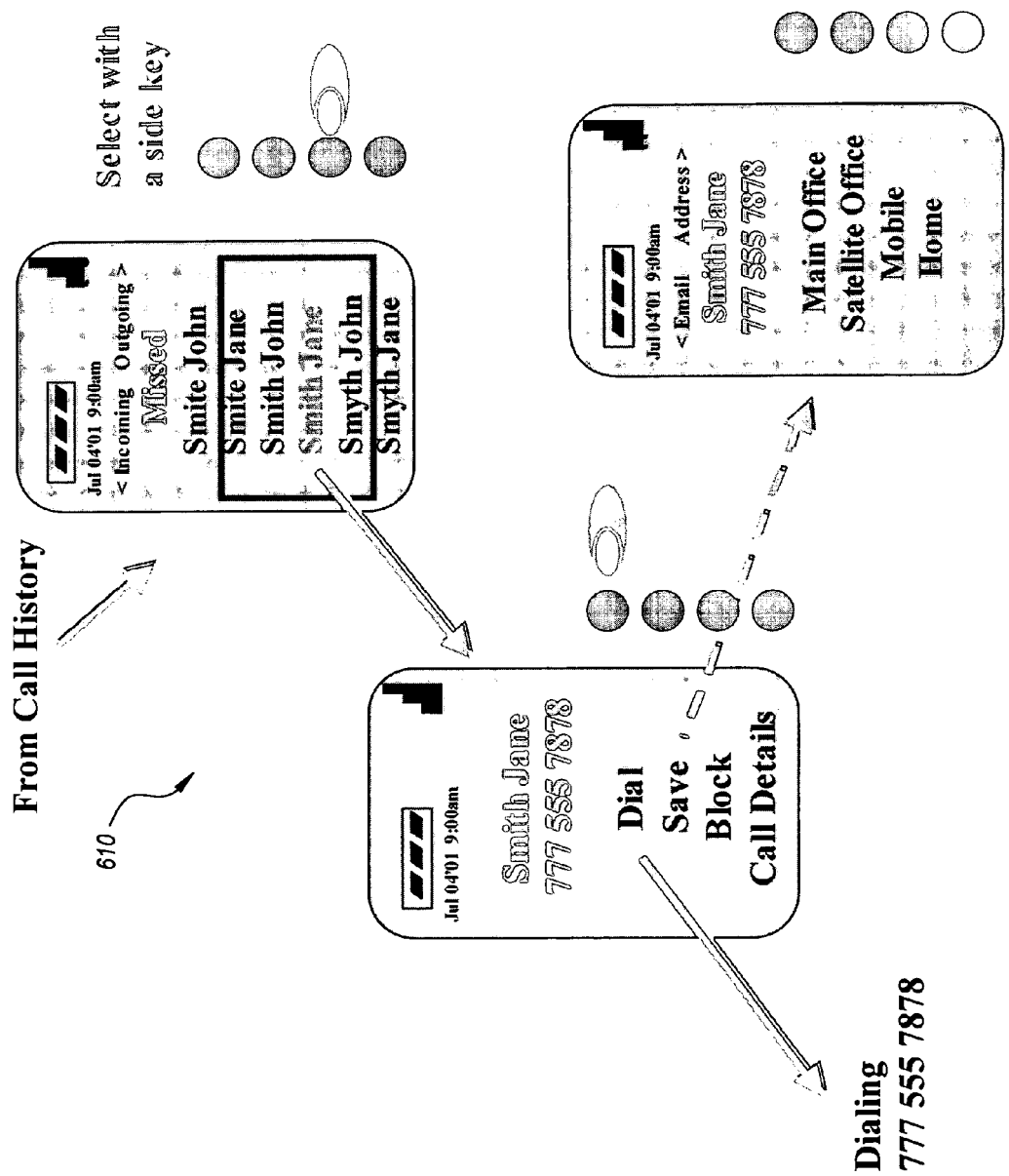
FIG. 38 is a functional diagram illustrating new number call history selection phone/address book features of an active keyboard system according to the present invention.
Figure 39:
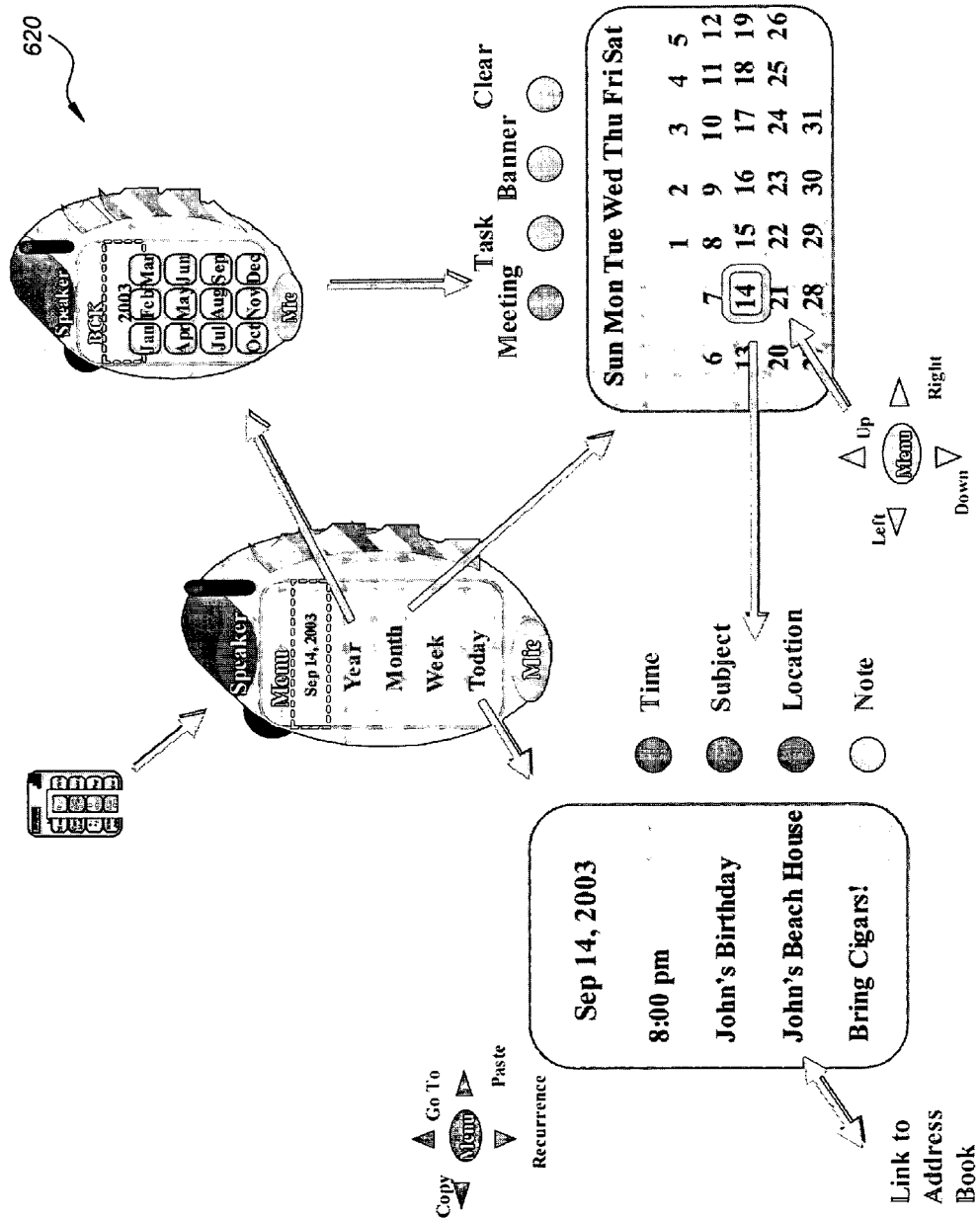
FIG. 39 is a functional diagram illustrating calendar features of an active keyboard system according to the present invention.

User interactions with a cell phone are generally involved in managing existing data and phone applications, such as a phone book, call history, phone features, a calendar/schedule, a pocket office, etc. The functional use of a handheld active keyboard system configured as a cell phone using a phone/address book is illustrated in FIGS. 33 and 34 via 560 and 570. As illustrated the phone/address book is selected from the power-on screen and a particular name can be found by scrolling, or may be selected using the text mode. Final name choice is made by a key. The phone number, email, and/or address may be selected in the same manner, as shown via 580 in FIG. 35. The outgoing, incoming, or missed call history may be obtained in the same manner, as shown via 590 in FIG. 36. An existing number in call history may be obtained in the same manner, as shown via 600 in FIG. 37, and a new number in call history may be obtained in the same manner, as shown via 610 in FIG. 38. Calendar features may be obtained in the same manner, as shown via 620 in FIG. 39.

Figure 40:
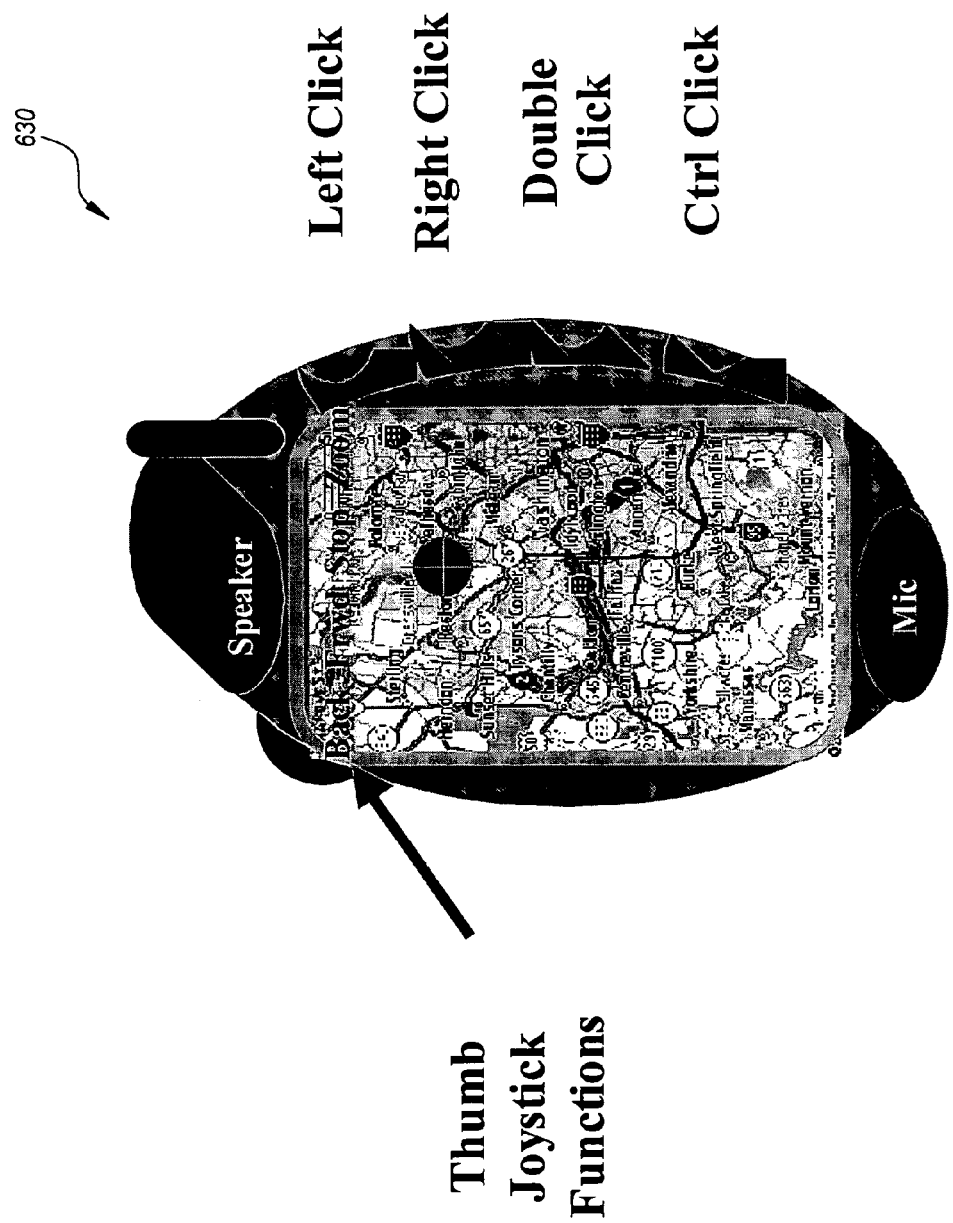
FIG. 40 is a functional diagram illustrating browsing features of an active keyboard system according to the present invention.
Figure 41:
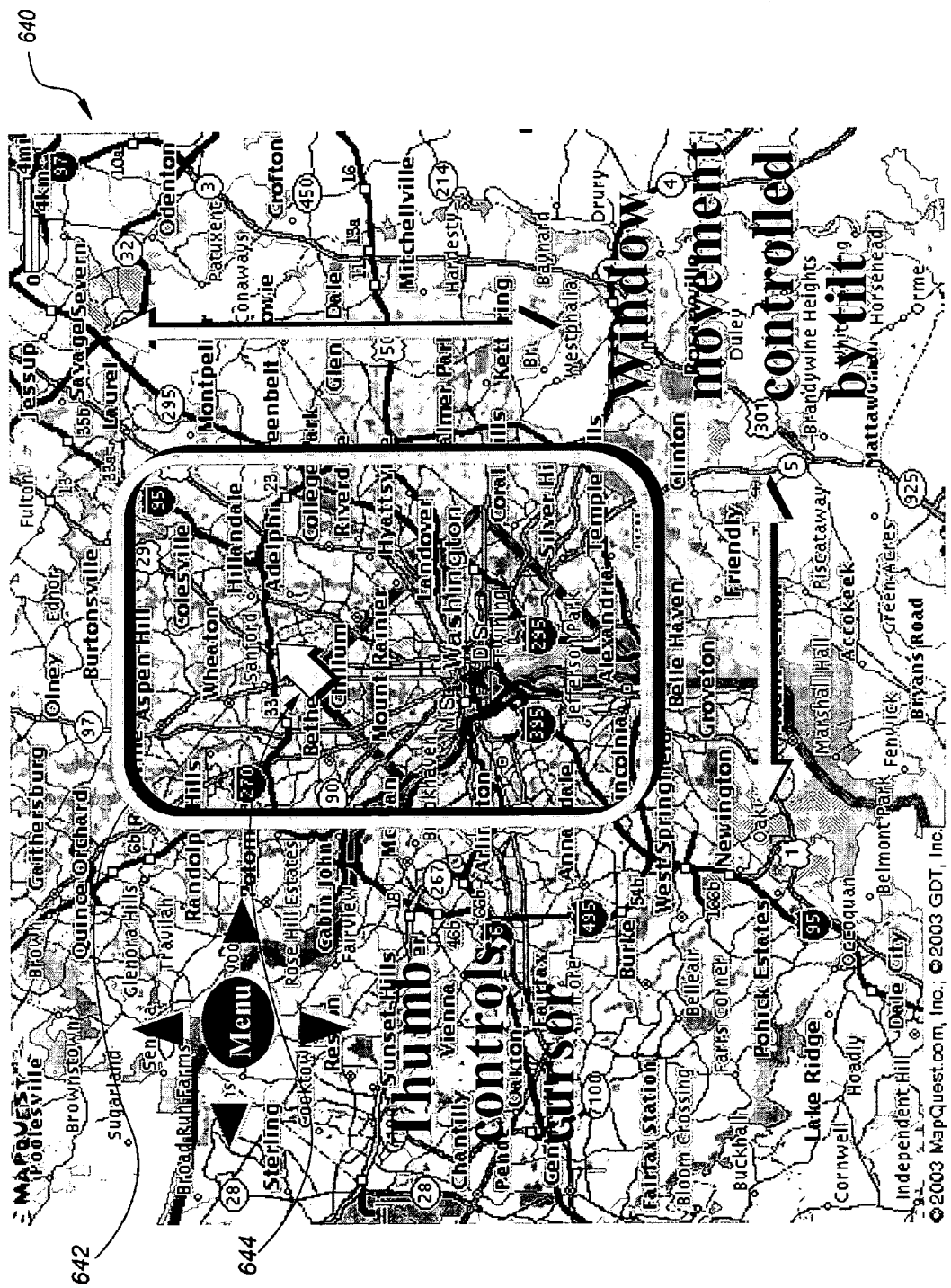
FIG. 41 is a functional diagram illustrating navigating map features of an active keyboard system according to the present invention.
Figure 42:
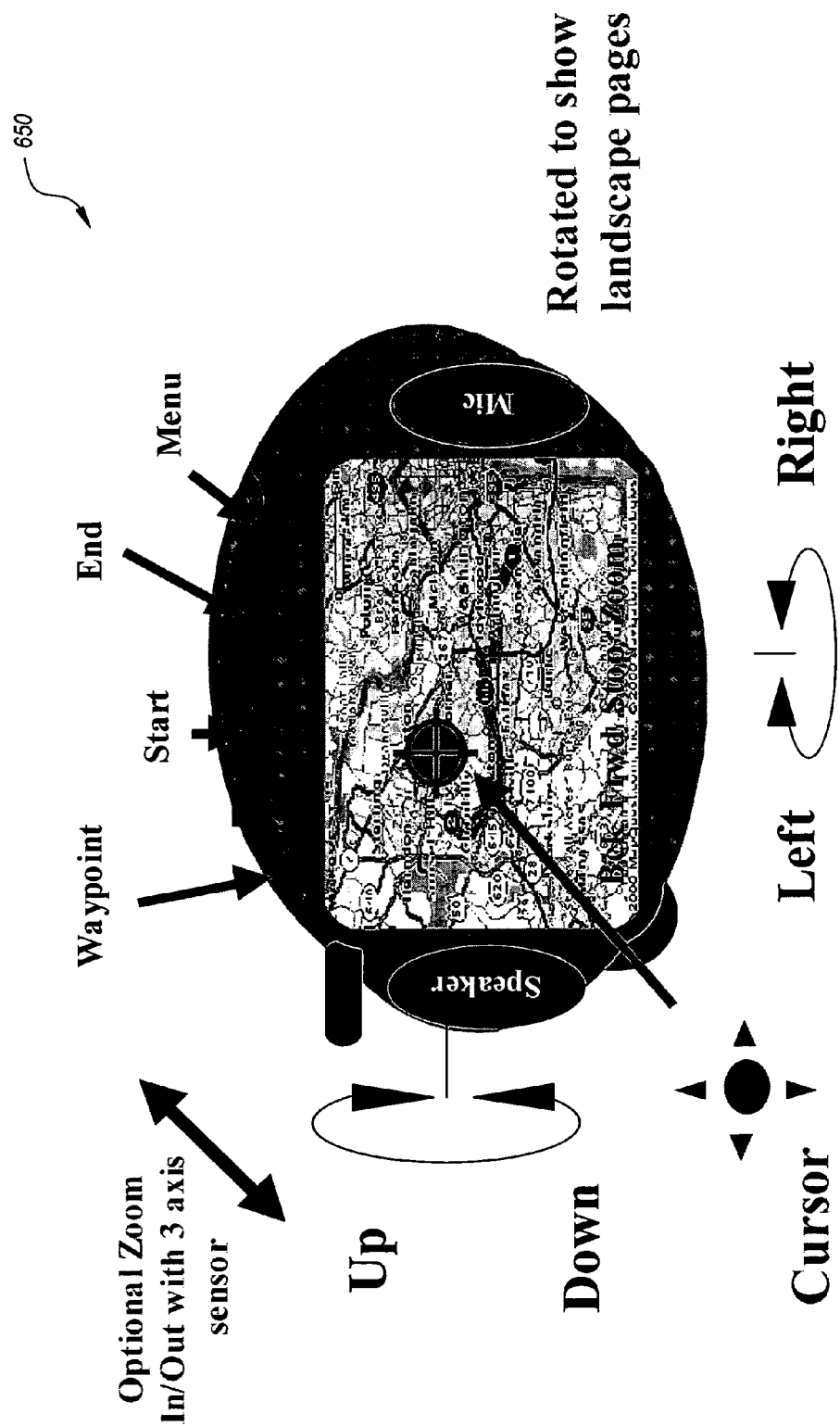
FIG. 42 is a functional diagram illustrating browsing with navigational map features of an active keyboard system according to the present invention.
Figure 43:
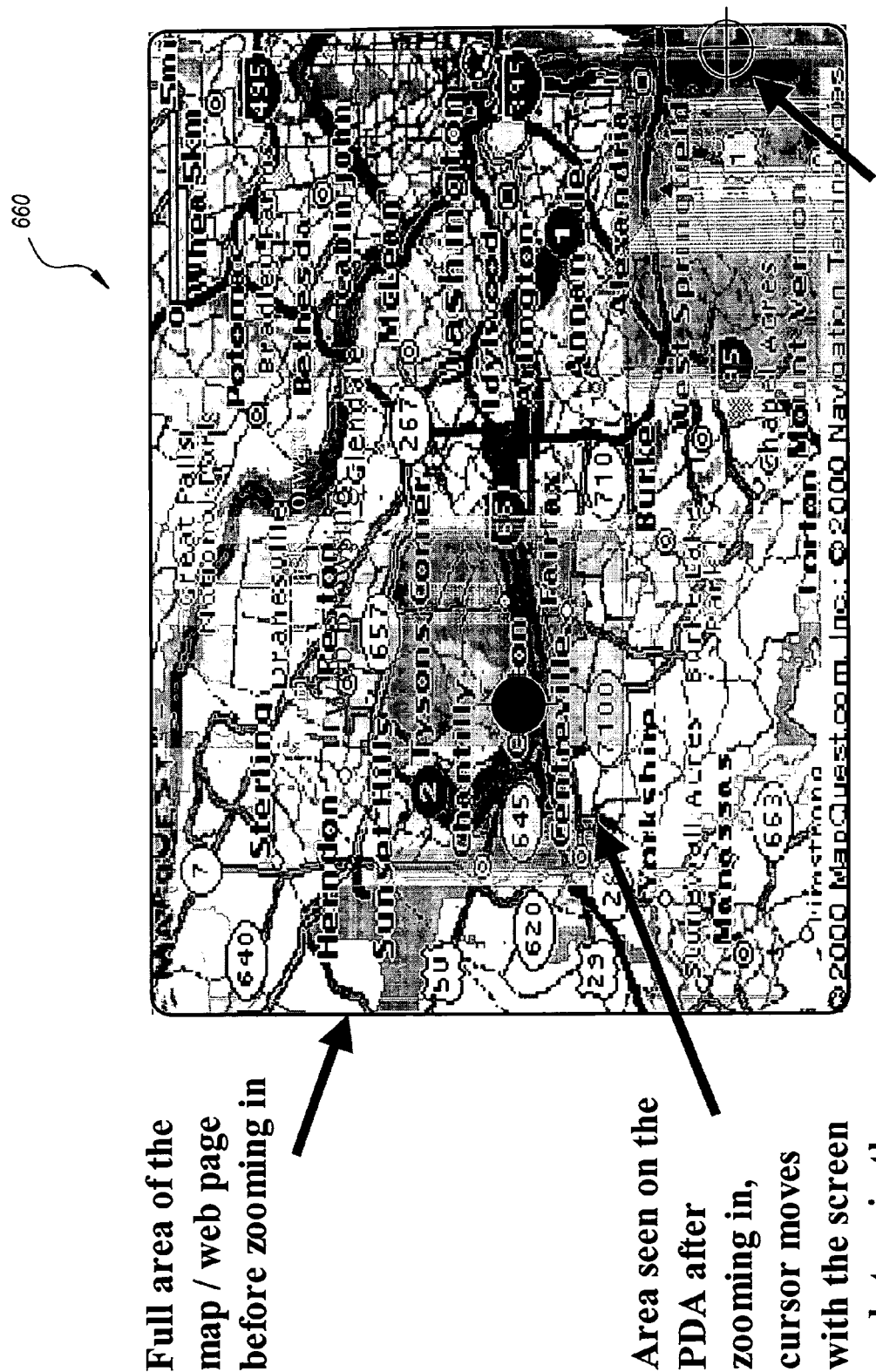
FIG. 43 is a functional diagram illustrating browsing with navigational map features of an active keyboard system according to the present invention.

FIG. 40 shows how selector functions and/or side button functions may be utilized to emulate mouse clicks in a browsing mode of an appropriately configured active keyboard system cell phone. FIG. 41 shows via 640 how the selection pointer of an active keyboard system can be used with navigating maps via tilt controlled movement. FIGS. 42 and 43 show via 650 and 660 how a cell phone active keyboard system can be used to navigate maps in the browsing mode.

Figure 44:
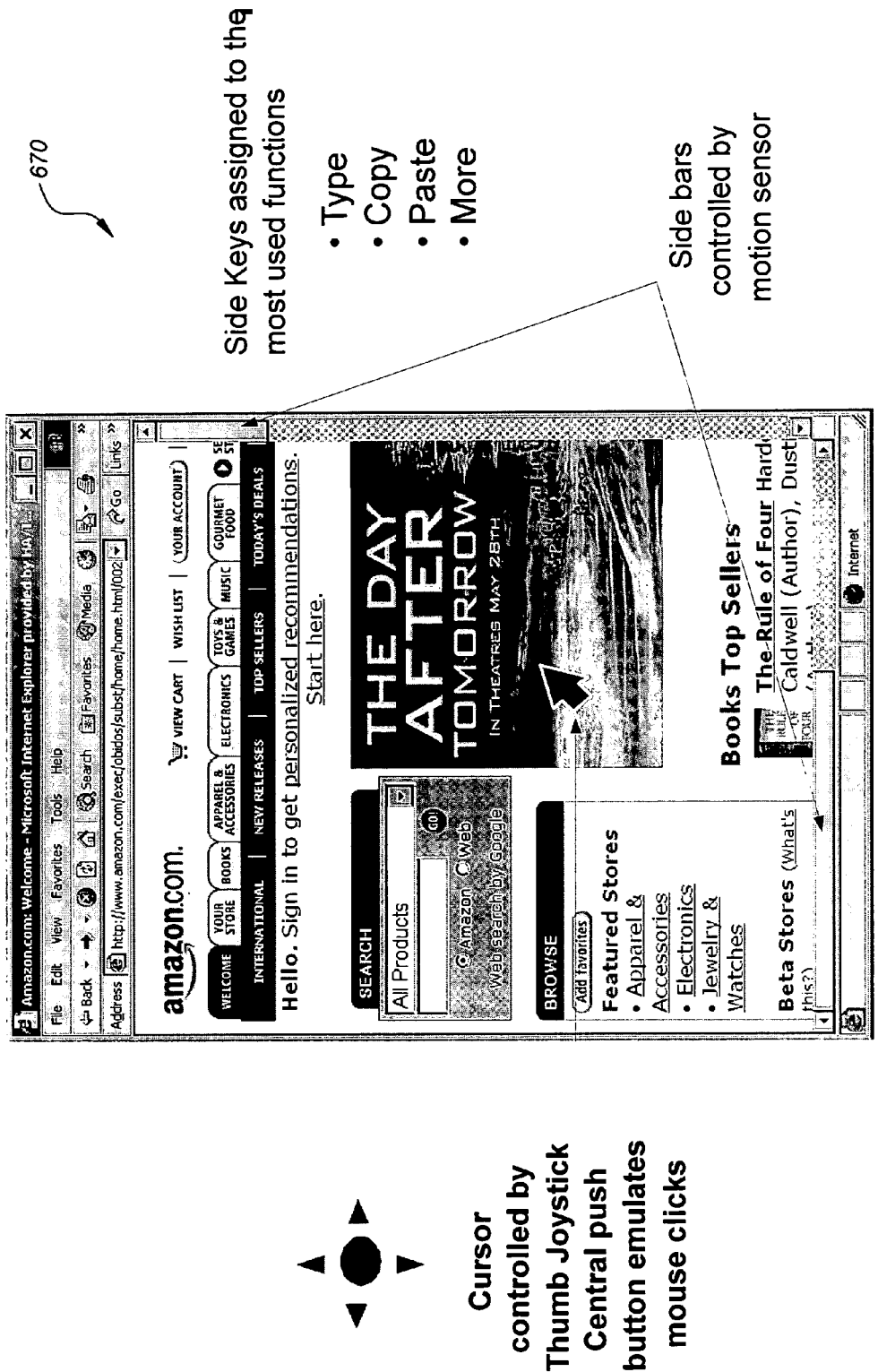
FIG. 44 is a functional diagram illustrating browsing with Internet features of an active keyboard system according to the present invention.

FIG. 44 shows via 670 how an appropriately configured active keyboard system can be used to browse Internet web pages, where movement sensor(s) can control the motion of the display window over an Internet site, a five position thumb joystick selector can emulate mouse cursor and clicks to select an item on the web page, and the keys can be used to effect type, copy, paste, and more functions, and how the side bars can be controlled by movement sensor(s).

Figure 45:
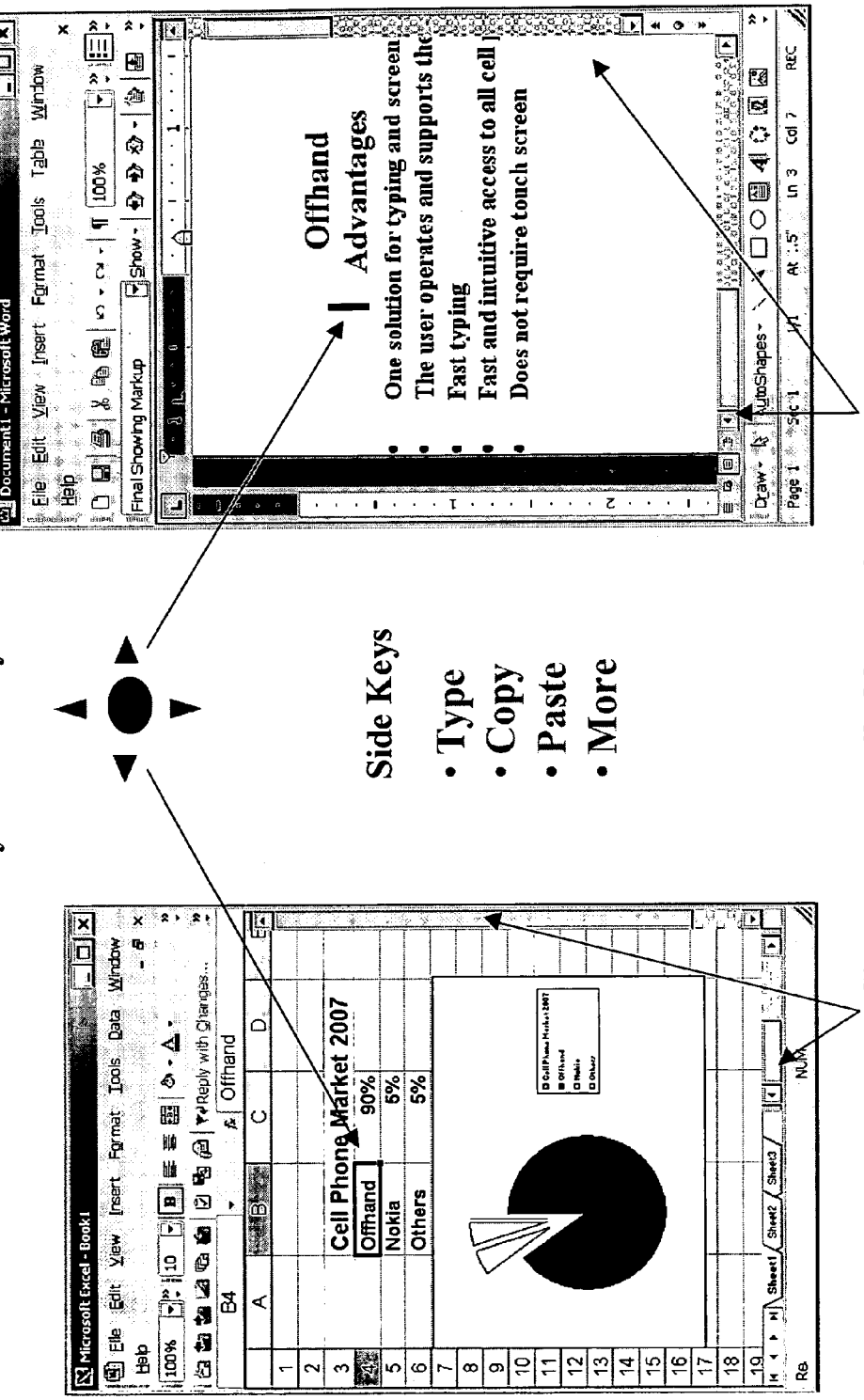
FIG. 45 is a functional diagram illustrating pocket office features of an active keyboard system according to the present invention.
Figure 46:
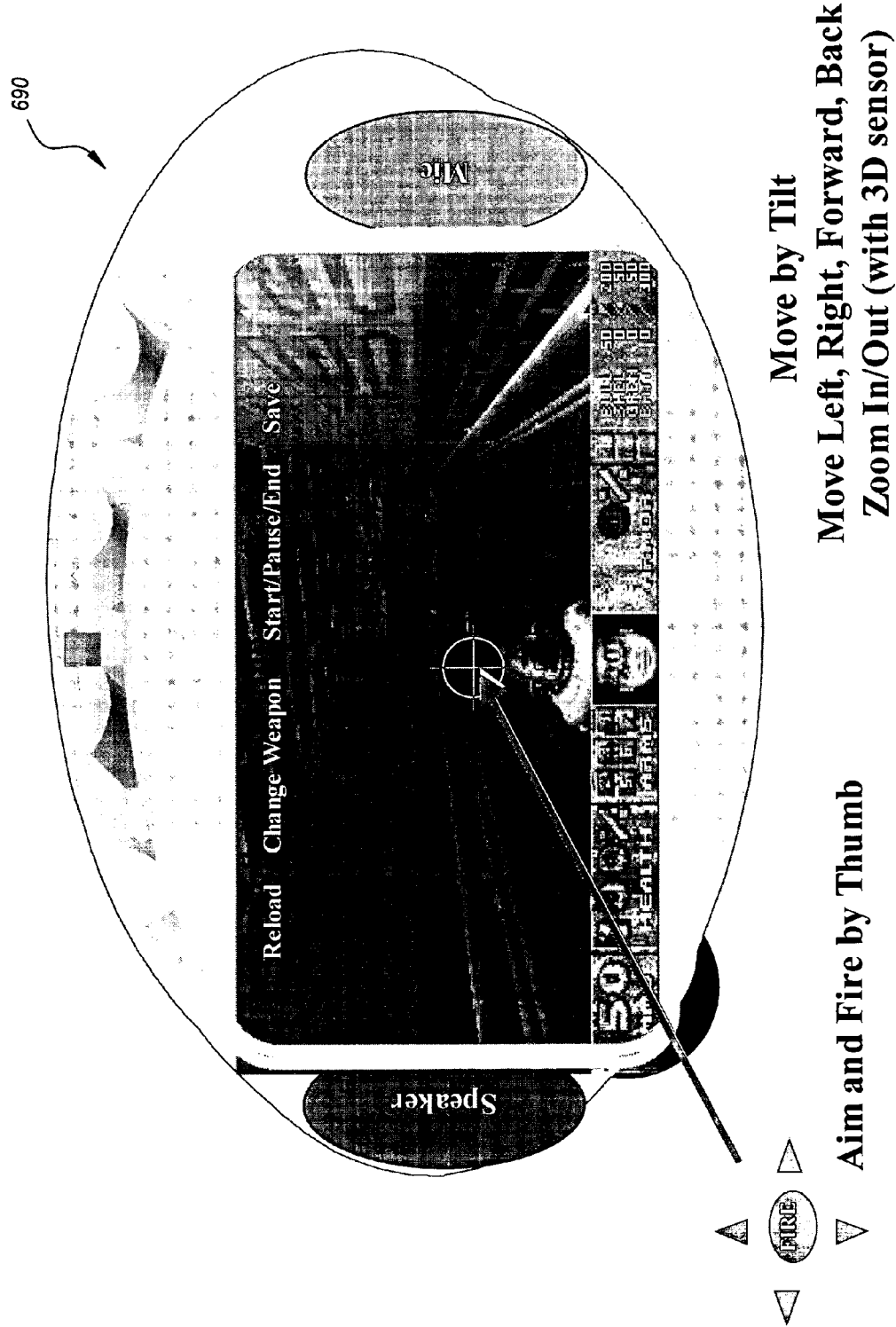
FIG. 46 is a functional diagram illustrating gaming features of an active keyboard system according to the present invention.

FIG. 45 shows via 680 how an appropriately configured active keyboard system can be used to effect a pocket office and control the cursor by the thumb joystick selector, and control type, copy, paste, and more functions by the keys, and how the side bars can be controlled by movement sensor(s). FIG. 46 shows via 690 how an appropriately configured active keyboard system can be used to play a game by using the thumb joystick to effect aiming and firing, and how the position of the site can be moved by tilting the system to move left, right, forward, back, and zoom in/out.

An active keyboard system according to the invention provides a grid with three dimensional presentation of the alphabet, rock-n-scroll up, down, left, and right movement, dual pointing devices for web access, message viewing, and gaming. A sleeve with active keyboard system input means and an optional microcontroller may be used as a plug-in for a traditional handheld device to configure it with active keyboard system functionality. The active keyboard system can provide ambidexterity, external movement compensation (e.g., by a bracelet, a holster, internal dual sensors, etc.), and active keyboard software options including adaptive threshold code, sliding zero code, step motion code, calibration code, step or scroll resolution code, grid presentation code, grid population code, application adapter code, and/or sound code.

An active keyboard system according to the invention provides simple and intuitive controls in the form of a selector, such as a 5-way joystick selector, a movement sensor configured to sense three substantially orthogonal components of movement, and four keys. One hundred and twenty combinations can be effected with one hand without shifting a finger (e.g., the same as a full size QWERTY keyboard only you don't need two hands and a desk and a chair). Unmatched capabilities of two pointing devices independently controlled by thumb and wrist for gaming and screen browsing. Controls are consistent among all applications.

The advantages of the inventive active keyboard system include holding and operating the system with one hand, a comfortable non-obstructive grip, provision of natural wrist/thumb/finger moves, intuitive and consistent controls, and fast access to features and data. The screen of the active keyboard system uses the entire front surface, the keypad is reduced to four buttons located on the side, fingers do not shift, and are always on the keys, and the thumb joystick and movement sensor(s) are controlled by the wrist.

The inventive active keyboard system dynamically presents available choices on a display grouped to effect unambiguous selection of the available choices through use of input means, thereby providing users of the active keyboard system with a consistent set of techniques to perform all commonly used functions including entering alphanumeric text and data into the device using only one hand.

While the invention has been described with references to its preferred embodiment, it will be understood by those skilled in the art that various changes may be made and equivalents may be substituted for elements thereof without departing from the true spirit and scope of the invention.

I claim:

1. An active keyboard system comprising:
   a processor;
   a memory communicatively connected to the processor;
   a display communicatively connected to the processor;
   input means for inputting data into said system, said input means including at least one selector, and a plurality of keys, one of said at least one selector being a set of at least one movement sensor configured to sense motion in different dimensions; and
   active keyboard system software stored on the memory, said active keyboard system software being configured to dynamically present available choices on the display grouped to effect unambiguous selection of the available choices through use of said input means; said active keyboard system software, when executed by the processor, cause the processor to carry out steps comprising:
   creating a grid of value boxes organized into a plurality of vertical columns and horizontal rows;
   enabling a user (1), by using the at least one selector, to select a group of value boxes, and (2), by using the plurality of keys, to select one value from the value boxes from the selected group of value boxes and inputting the value into the memory;
   processing data from the set of at least one movement sensor caused by rotational change in position of the system; and
   moving around the grid of value boxes based on processed data from the at least one selector.

2. The active keyboard system according to claim 1, wherein said plurality of keys is configured to be operated by fingers without obstructing the display.

3. The active keyboard system according to claim 1, wherein one of said at least one selector is a wheel, a track ball, a joystick, a rocker pad, a touch pad, a selector switch, a toggle switch, a key button, an N-state button, or an N-state selector.

4. The active keyboard system according to claim 1, wherein said one of said at least one selector is at least two sets of movement sensors configured to filter out effects of external forces applied to said system.

5. The active keyboard system according to claim 4, wherein said at least two sets of movement sensors are configured to filter out effects of external forces applied to said system by aligning a sensitivity axis of a second set of movement sensors to a first set of movement sensors.

6. The active keyboard system according to claim 1, wherein said at least one selector is at least two selectors.

7. The active keyboard system according to claim 1, wherein said system is configured for ambidextrous use by providing partial or full duplication of said input means on said system.

8. The active keyboard system according to claim 1, wherein said system is configured for ambidextrous use by allowing a user to rotate, reattach, slide, or move parts of said system.

9. The active keyboard system according to claim 1, wherein said plurality of keys are configured to inhibit unintentional engagement.

10. The active keyboard system according to claim 1, wherein said system is configured as a cellular phone, a personal digital assistant, a global positioning receiving device, a remote control, a computer mouse, a pager, a walkie-talkie, a scanner, or a multi-meter.

11. An active keyboard system according to claim 1, wherein some or all components of said system are configured as a sleeve to operatively attach to and be used in combination with a handheld electronic device.

12. The active keyboard system according to claim 11, in combination with a handheld electronic device, said device being configured as a cellular phone, a personal digital assistant, a global positioning receiving device, a remote control, computer mouse, a pager, a walkie-talkie, a scanner, or a multi-meter.

13. An active keyboard system according to claim 1, wherein said system is configured to effect browsing on the Internet, or to work with applications with a single selector.

14. An active keyboard system according to claim 1, wherein said system is configured to effect browsing on the Internet, or to work with applications utilizing two selectors.

15. The active keyboard system according to claim 1, wherein said active keyboard system software comprises presentation code and filter code.

16. The active keyboard system according to claim 15, wherein said presentation code displays a selection pointer controlled by one of said at least one selector.

17. The active keyboard system according to claim 16, wherein said filter code comprises step motion code configured to translate user intentions into precise movement of the selection pointer over a grid, and to allow readjustment of the system between steps.

18. The active keyboard system according to claim 15, wherein said presentation code comprises step or scroll resolution code to enable scrolling.

19. The active keyboard system according to claim 15, wherein said presentation code comprises application adapter code to translate transactions between application code and presentation code.

20. The active keyboard system according to claim 15, wherein said presentation code comprises sound code to provide an audio announcement for a selected choice, a confirmation for completion of an action, and an alarm for failure to complete an action.

21. The active keyboard system according to claim 15, wherein said presentation code comprises feedback code to enhance user interaction with the system.

22. The active keyboard system according to claim 15, wherein said filter code is configured to separate intentional user input from accidental user motion.

23. The active keyboard system according to claim 15, wherein said filter code comprises external forces filter code to separate user input from effects of external forces.

24. The active keyboard system according to claim 15, wherein said filter code comprises sliding zero code to allow a user to change a position while operating the system.

25. The active keyboard system according to claim 15, wherein said filter code comprises adaptive threshold code to optimize operator interaction with the system via feedback.

26. The active keyboard system according to claim 15, wherein said filter code comprises calibration code to effect user and application preferences.

27. The active keyboard system according to claim 26, wherein said single selector is configured and positioned to be operated by a thumb.

28. The active keyboard system according to claim 15, wherein said presentation code comprises grid presentation code to organize available choices on a visual grid and provide the visual grid to the display.

29. The active keyboard system according to claim 28, wherein said grid presentation code configures the visual grid with plural panes.

30. The active keyboard system according to claim 28, wherein said grid presentation code configures the visual grid with three panes.

31. The active keyboard system according to claim 28, wherein said visual grid comprises a plurality of cells and said grid presentation code comprises grid population code to populate each of said plurality of cells with an alphanumeric character, a symbol, a music note, an icon, text, an ideogram, or a logogram.

32. The active keyboard system according to claim 28, wherein said grid presentation code configures the visual grid with at least one pane as a matrix with a plurality of columns and plurality of rows.

33. The active keyboard system according to claim 32, wherein said grid presentation code configures said at least one pane as a matrix with three columns and four rows.

34. The active keyboard system according to claim 32, wherein said grid presentation code configures said at least one pane as a matrix with one column and a plurality of rows.

35. An active keyboard system comprising:
a processor;
a memory communicatively connected to the processor;
a display communicatively connected to the processor;
input means for inputting data into said system, said input means including at least two sets of movement sensors positioned to sense motion in different dimensions; and
active keyboard system software stored on the memory, said active keyboard system software, when executed by the processor, cause the processor to carry out steps comprising:
processing data from at least two movement sensors caused by rotational change in position of the system, and filtering out interference from external forces and undesirable user movements; and
comparing signals from at least two sets of movement sensors and canceling interference from external forces and undesirable user movements.

36. An active keyboard system configured for ambidextrous use, said active keyboard system comprising:
a processor;
a memory communicatively connected to the processor;
a display communicatively connected to the processor;
first input means for inputting data into said system, said first input means including at least one first selector, and a first plurality of keys, one of said at least a first selector being a set of at least one movement sensor configured to sense motion in different dimensions;
second input means for inputting data into said system, said second input means including at least one second selector, and a second plurality of keys, one of said at least a second selector being a set of at least one movement sensor configured to sense motion in different dimensions, said second input means being a partial or full duplication of said first input means to configure said active keyboard system for ambidextrous use; and
active keyboard system software stored on the memory, said active keyboard system software being configured to dynamically present available choices on the display grouped to effect unambiguous selection of the available choices through use of said input means; said active keyboard system software, when executed by the processor, cause the processor to carry out steps comprising:
enabling a user (1), by using one of the at least one first selector and at least one second selector, to select a group of value boxes, and (2), by using the first or second plurality of keys, to select a value contained within one value box from the selected group and inputting the value into the memory.

* * * * *